(12) United States Patent
Kikitsu et al.

(10) Patent No.: US 6,830,824 B2
(45) Date of Patent: Dec. 14, 2004

(54) MAGNETIC RECORDING MEDIUM WITH MULTIPLE MAGNETIC LAYERS CAPABLE OF BEING EXCHANGE COUPLED AT ELEVATED TEMPERATURES AND MAGNETIC RECORDING APPARATUS

(75) Inventors: Akira Kikitsu, Yokohama (JP); Junichi Akiyama, Kawasaki (JP); Katsutaro Ichihara, Yokohama (JP); Tadashi Kai, Kawasaki (JP); Toshihiko Nagase, Kawasaki (JP); Tomoyuki Maeda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 48 days.

(21) Appl. No.: 09/878,384

(22) Filed: Jun. 12, 2001

(65) Prior Publication Data

US 2001/0051287 A1 Dec. 13, 2001

(30) Foreign Application Priority Data

| Jun. 12, 2000 | (JP) | 2000-175507 |
| Mar. 30, 2001 | (JP) | 2001-102452 |
| Jun. 6, 2001 | (JP) | 2001-171411 |

(51) Int. Cl.$^7$ .............. G11B 11/105; G11B 5/66
(52) U.S. Cl. .............. 428/611; 428/668; 428/670; 428/686; 428/336; 428/694 MC; 428/694 RE; 428/694 T; 428/694 TS; 428/694 TM; 428/694 MM; 369/13.38
(58) Field of Search ............. 369/13.38, 13.02, 369/13.11, 13.2, 13.4, 13.41, 13.42, 13.44, 13.45, 13.46, 13.53, 13.55; 428/686, 694 T, 694 TM, 694 TS, 611, 551, 623, 668, 670, 156, 212, 213, 336, 409, 694 ML, 694 MT, 694 RE, 694 MM, 694 EC

(56) References Cited

U.S. PATENT DOCUMENTS

| 5,353,268 A | * | 10/1994 | Hintz .................... 369/13.35 |
| 5,939,187 A | * | 8/1999 | Hirokane et al. ........... 428/332 |
| 6,086,974 A | * | 7/2000 | Thiele et al. .............. 428/65.3 |
| 6,141,297 A | * | 10/2000 | Kim ...................... 369/13.42 |
| 6,143,436 A | | 11/2000 | Nakajima et al. |
| 6,436,524 B1 | * | 8/2002 | Ishida et al. ............... 428/332 |
| 6,493,164 B1 | * | 12/2002 | Kikitsu et al. ............. 360/59 |
| 6,493,183 B1 | * | 12/2002 | Kasiraj et al. ............. 360/126 |
| 6,551,728 B1 | * | 4/2003 | Acharya et al. ........ 428/694 TS |
| 2002/0192506 A1 | * | 12/2002 | Coffey et al. ......... 428/694 TM |
| 2003/0128635 A1 | * | 7/2003 | Ruigrok et al. .......... 369/13.55 |

FOREIGN PATENT DOCUMENTS

| JP | 10-289434 | 10/1998 |
| JP | 2000-200411 | 7/2000 |

OTHER PUBLICATIONS

"The Future of Data Storage Technologies", Esener S. and Kryder, M., cochairs, published by NIST, Jun. 1999, pp. 1–8).*

"Magnetic Disk Drive Technology Status" article, published Jun. 1999 by WTEC Hyper–Librarian (http://www.wtec.org/loyola/hdmem/02_03).*

* cited by examiner

*Primary Examiner*—Paul Thibodeau
*Assistant Examiner*—Kevin Bernatz
(74) *Attorney, Agent, or Firm*—Oblon, Spivak, McClelland, Maier & Neustadt, P.C.

(57) ABSTRACT

A magnetic recording medium has a substrate, a base layer formed on the substrate and including a magnetic material, a switching layer formed on the base layer and including a nonmagnetic material, and a recording layer formed on the switching layer and having a structure comprising magnetic particles and a nonmagnetic wall buried between the magnetic particles. The medium meets the condition of TcB>Tsw, where TcB is a Curie temperature of the base layer, and Tsw is a temperature at which the recording layer and the base layer begin to exert exchange coupling interaction.

32 Claims, 25 Drawing Sheets

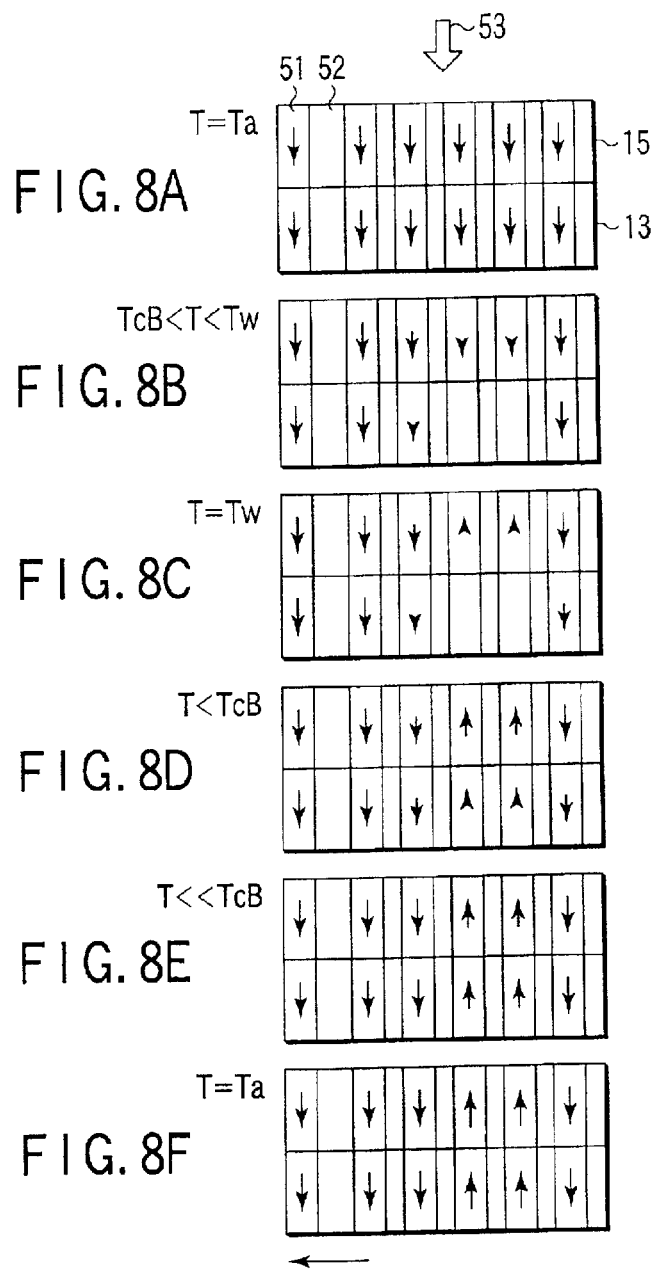
FIG. 8A T=Ta
FIG. 8B TcB<T<Tw
FIG. 8C T=Tw
FIG. 8D T<TcB
FIG. 8E T<<TcB
FIG. 8F T=Ta
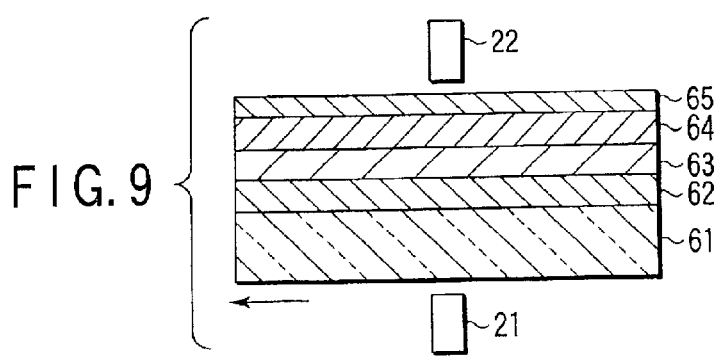
FIG. 9

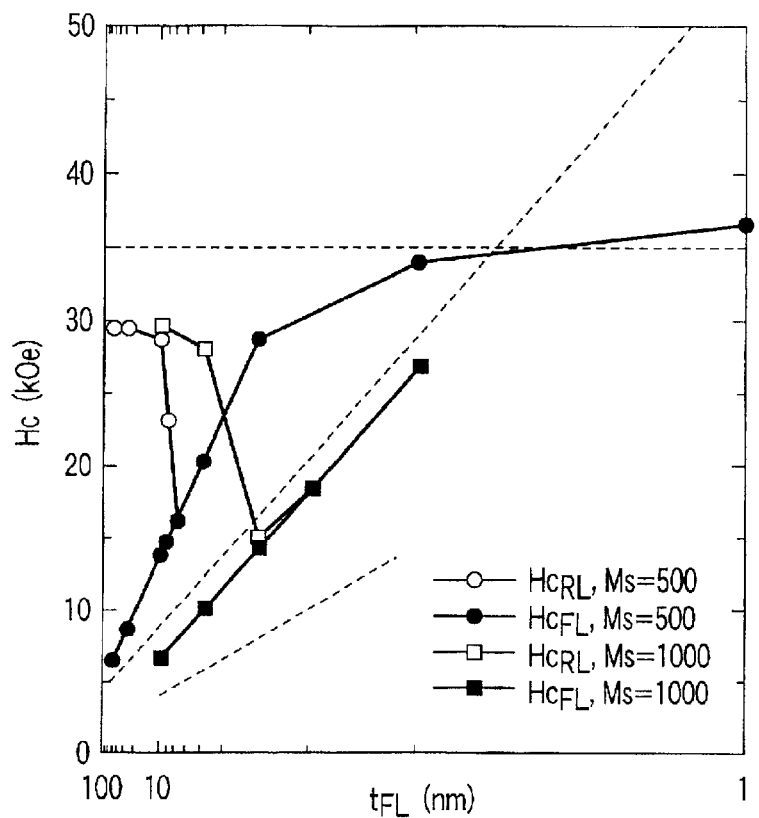
F I G. 28
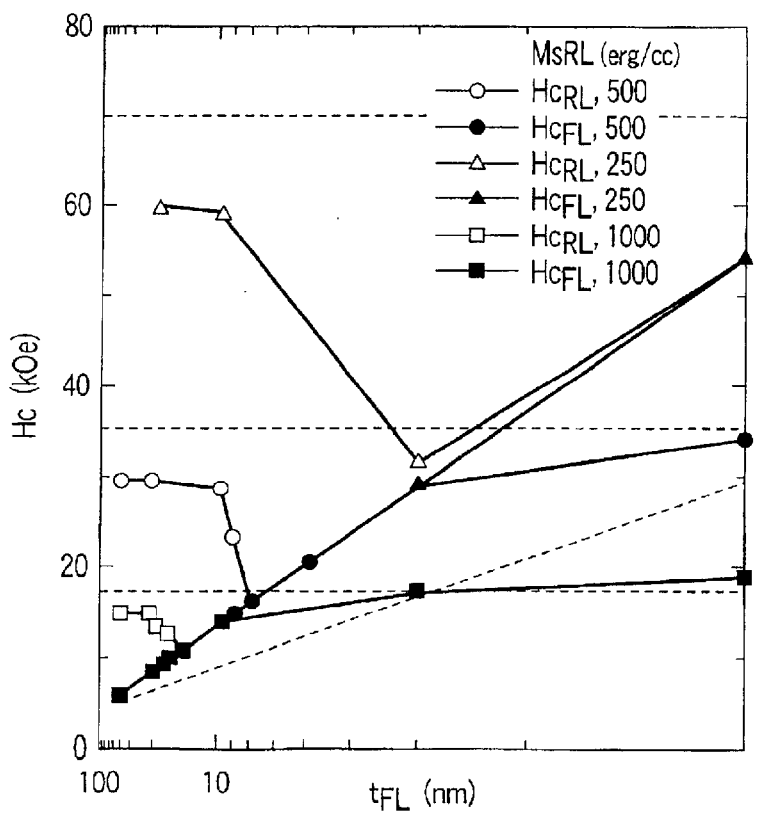
F I G. 29

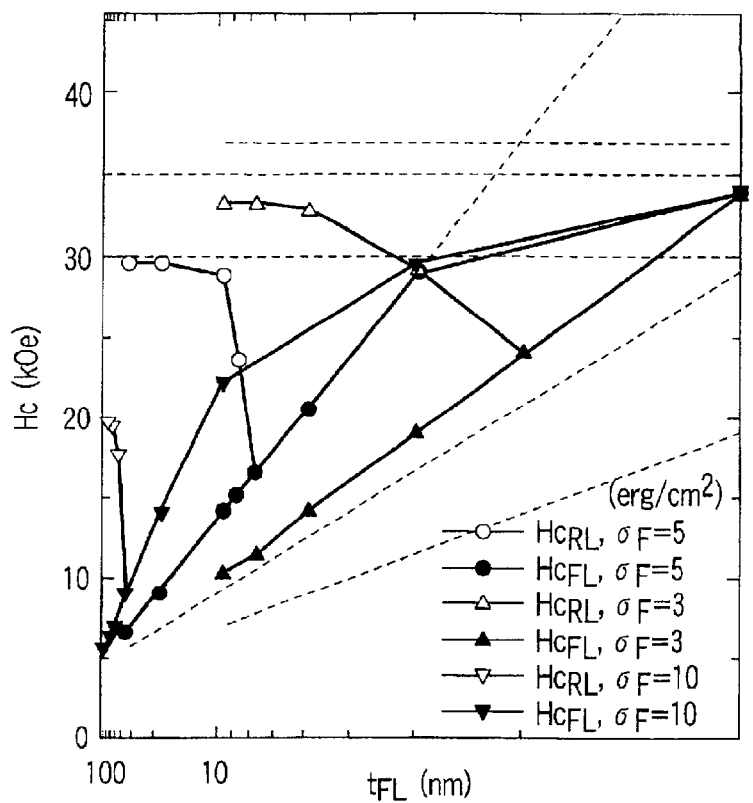
F I G. 32
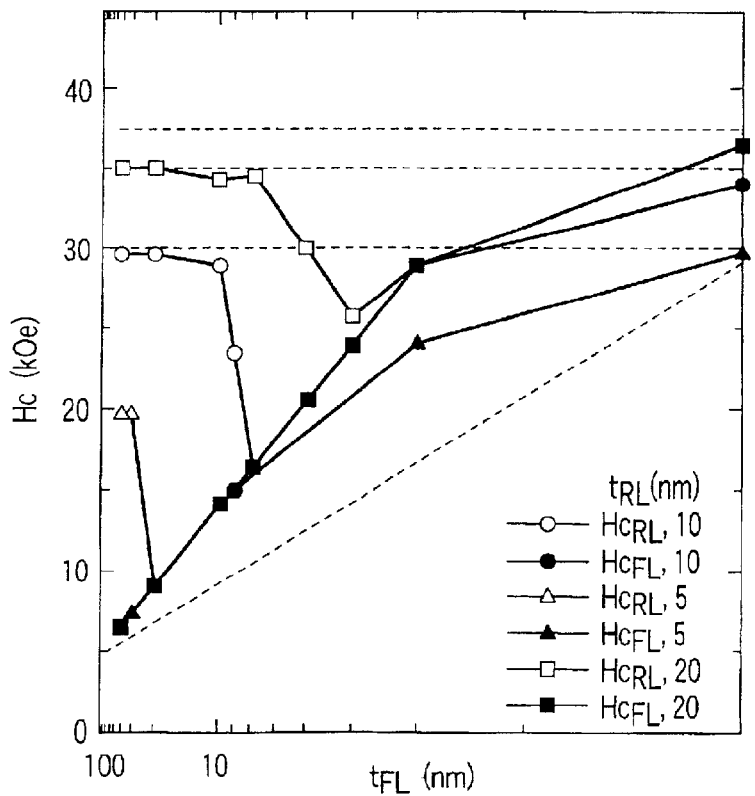
F I G. 33

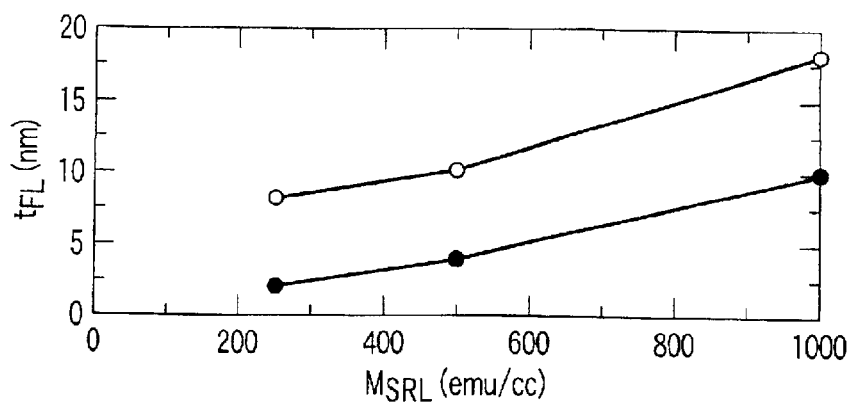
F I G. 34A
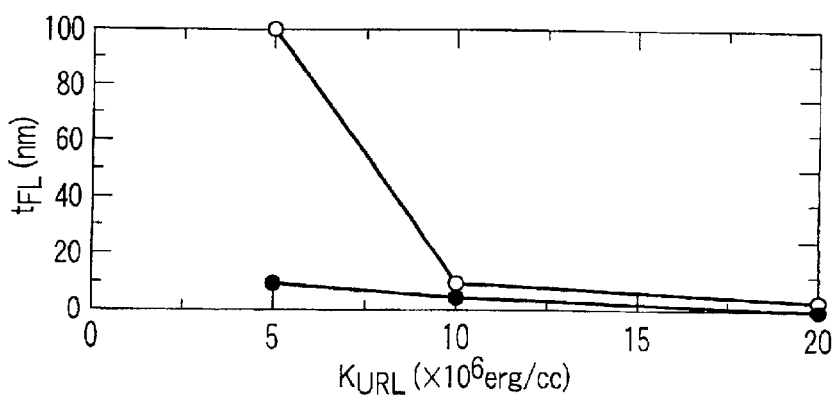
F I G. 34B
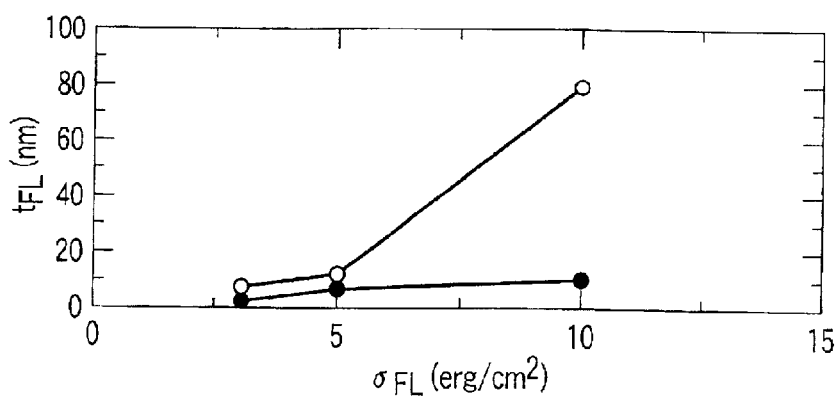
F I G. 34C
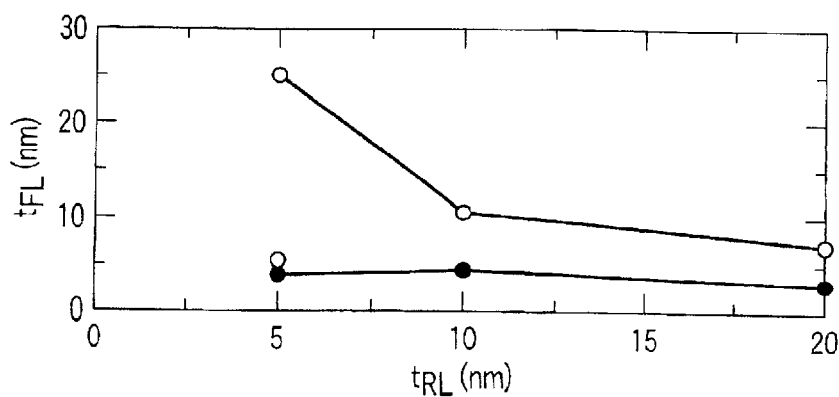
F I G. 34D

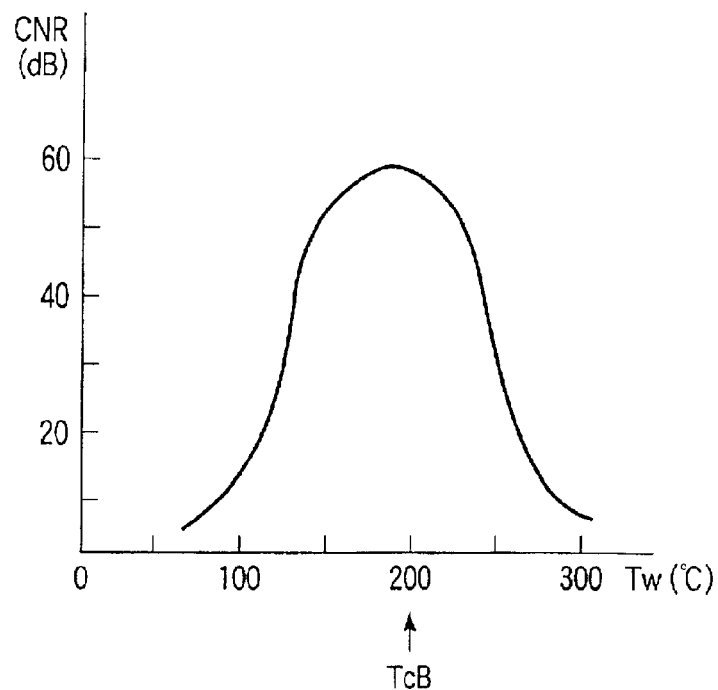
F I G. 40
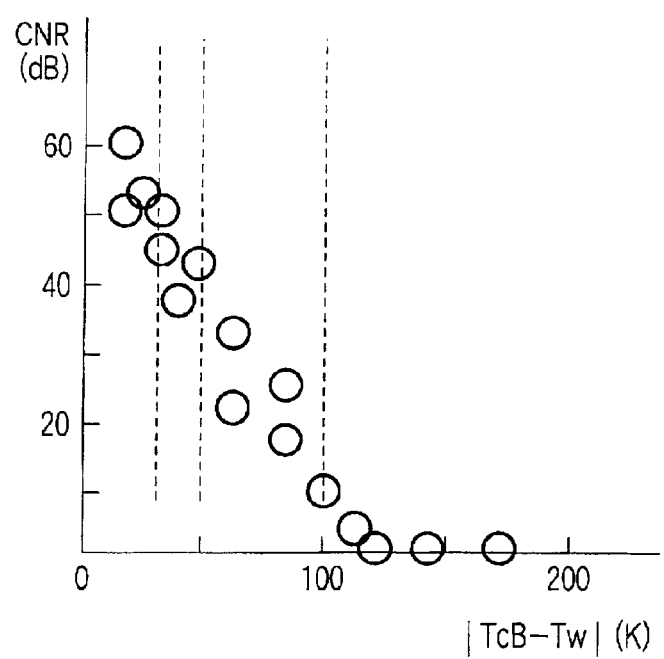
F I G. 41

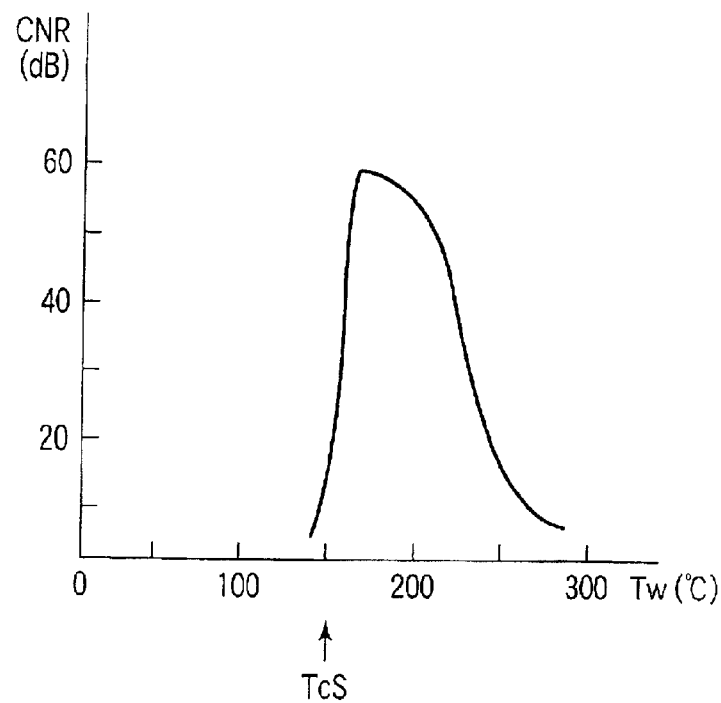
F I G. 42
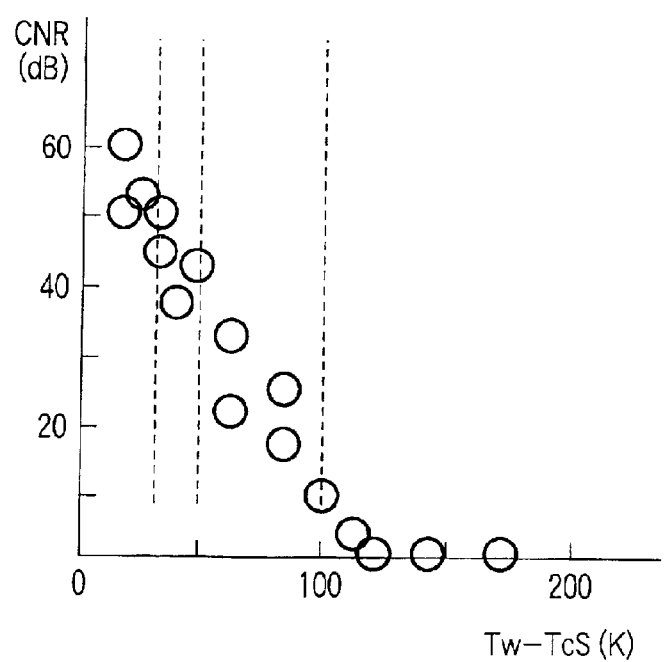
F I G. 43

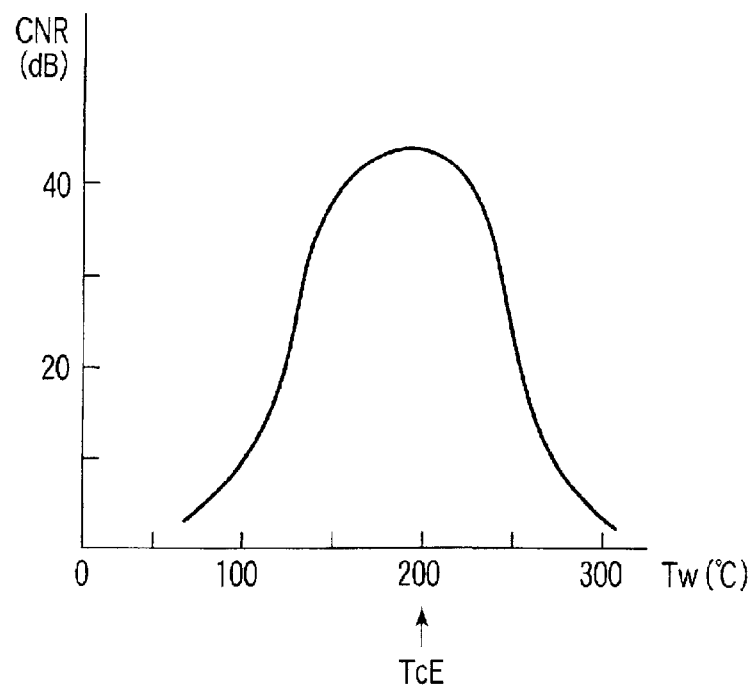
F I G. 44
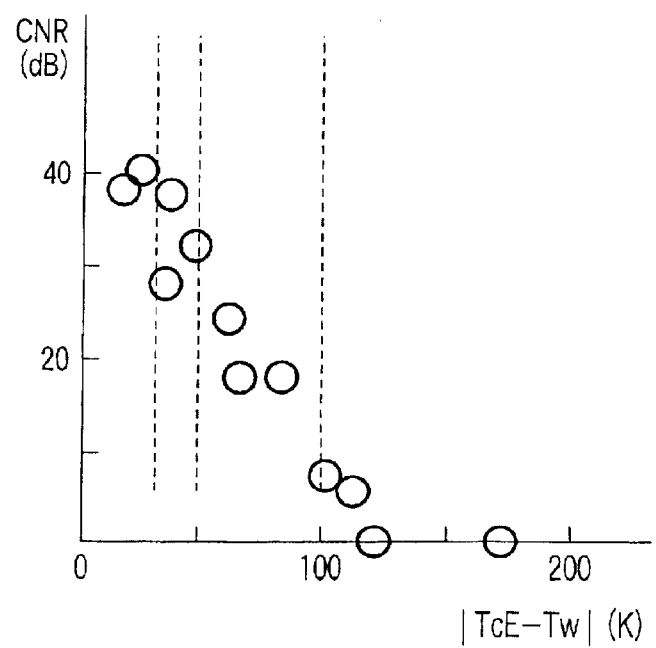
F I G. 45

MAGNETIC RECORDING MEDIUM WITH MULTIPLE MAGNETIC LAYERS CAPABLE OF BEING EXCHANGE COUPLED AT ELEVATED TEMPERATURES AND MAGNETIC RECORDING APPARATUS

CROSS-REFERENCE TO RELATED APPLICATIONS

This application is based upon and claims the benefit of priority from the prior Japanese Patent Applications No. 2000-175507, filed Jun. 12, 2000; No. 2001-102452, filed Mar. 30, 2001; and No. 2001-171411, filed Jun. 6, 2001, the entire contents of all of which are incorporated by reference.

BACKGROUND OF THE INVENTION

The present invention relates to a magnetic recording medium and a magnetic recording apparatus.

With improvement in the processing speed of the electronic computer achieved in recent years, a high speed and high-density recording is required for the magnetic recording apparatus (HDD) performing the storing and reproducing functions of information and data. However, the improvement in the recording density is the to be physically limited, and it is doubtful whether it is possible to continue to satisfy the request.

In the case of an HDD apparatus, the magnetic recording medium for recording information comprises a magnetic layer including an aggregate of fine magnetic particles. For performing a high-density recording, it is necessary to diminish magnetic domains recorded in the magnetic layer. In order to discriminate the small recording domains, it is necessary for domain boundaries to be smooth. For making the domain boundaries smooth, it is necessary to miniaturize the magnetic particles contained in the magnetic layer. Also, if the magnetization reversal proceeds to reach the adjacent magnetic particle, the domain boundaries are disturbed. Therefore, in order to prevent an exchange coupling interaction from being produced between the magnetic particles, it is necessary for the magnetic particles to be magnetically separated from each other by a nonmagnetic material. Also, for achieving a high-density recording, it is necessary to diminish the thickness of the magnetic layer in view of the magnetic interaction between a magnetic head and the magnetic recording medium. Under the circumstances, it is necessary to further diminish the volume of the magnetization reversal unit, which is substantially equal to the magnetic particle, in the magnetic layer. However, if the magnetization reversal unit is diminished, magnetic anisotropy energy of the unit, i.e., the product of magnetic anisotropy energy density Ku and magnetization reversal unit volume Va, is rendered smaller than the thermal fluctuation energy, resulting in failure to maintain the magnetic domains. This is the thermal fluctuation phenomenon, which is a main cause of the physical limit of the recording density called thermal fluctuation limit.

In order to prevent the magnetization reversal caused by the thermal fluctuation, it is considered effective to increase the magnetic anisotropy energy density Ku. However, in the case of the HDD medium described above, it is impossible to achieve the recording by the magnetic field that can be produced by the recording head widely used nowadays because the coercive force $H_{CW}$ when the magnetization reversal operation is performed at a high speed, i.e., the recording is performed, is substantially proportional to Ku.

In order to overcome the problems described above, proposed is an idea called thermally assisted magnetic recording. To be more specific, it is proposed to perform the magnetic recording by heating the recording layer in the recording step so as to locally diminish the value of Ku. In this system, the magnetization reversal is made possible by the recording magnetic field that can be produced by the magnetic head widely used nowadays even if the value of Ku of the recording layer is large under the environment in which the recording medium is used, i.e., under ambient temperature in general.

However, since the adjacent track is somewhat heated during the recording step, produced is a cross erase phenomenon that the thermal fluctuation is accelerated in the adjacent track so as to erase the recording domains. Also, since the recording medium is heated to some extent at the time when the head magnetic field is eliminated immediately after the recording, the thermal fluctuation is also accelerated, with the result that it is possible for the domains once formed to disappear.

In order to overcome the problems described above, it is necessary to use a material having as sharp change in Ku relative to temperature as possible in the vicinity of the recording temperature. However, the change in Ku relative to temperature of the CoCr-based and CoPt-based magnetic thin films, which are developed nowadays, is substantially linear, failing to satisfy the requirement pointed out above. It follows that much improvement in track density or linear recording density cannot be expected in the conventional magnetic recording medium.

It is conceivable to increase the value of Va in order to prevent the magnetization reversal caused by the thermal fluctuation. However, if the value of Va is increased by increasing the size of the magnetic particles within the plane of the magnetic recording medium, it is impossible to achieve high-density recording. Also, if the value of Va is increased by increasing the thickness of the recording layer, the head magnetic field fails to reach sufficiently the lower portion of the recording layer. As a result, the magnetization reversal does not take place, resulting in failure to achieve high-density recording.

BRIEF SUMMARY OF THE INVENTION

An object of the present invention is to provide a magnetic recording medium and a magnetic recording apparatus capable of achieving high-density recording exceeding the thermal fluctuation limit.

According to a first aspect of the present invention, there is provided a magnetic recording medium, comprising a substrate; a base layer formed on the substrate and comprising a magnetic material; a switching layer formed on the base layer and comprising a nonmagnetic material; and a recording layer formed on the switching layer and comprising magnetic particles and a nonmagnetic wall buried between the magnetic particles; wherein the medium meets the following condition: TcB>Tsw, where TcB is a Curie temperature of the base layer, and Tsw is a temperature at which the recording layer and the base layer begin to exert exchange coupling interaction.

The magnetic recording apparatus using the magnetic recording medium according to the first aspect of the present invention comprises the first magnetic recording medium, a heater locally heating a part of the magnetic recording medium, and a magnetic head applying a magnetic field to the magnetic recording medium.

It is preferable to perform heating and magnetic field application using the apparatus according to the first aspect of the present invention in a manner to meet the conditions of Tw>Tsw and TcB>Tsw, where Tw denotes a recording temperature of the locally heated recording layer, TcB denotes a Curie temperature of the base layer, and Tsw denotes a temperature at which exchange coupling interaction begins to be exerted between the recording layer and the base layer.

According to a second aspect of the present invention, there is provided a magnetic recording medium, comprising a substrate; a base layer formed on the substrate and comprising a material that is nonmagnetic under an ambient temperature and becomes ferromagnetic at higher temperature; and a recording layer formed on the base layer and comprising magnetic particles and a nonmagnetic wall buried between the magnetic particles; wherein the transition temperature Tf from nonmagnetic to of the base layer is made to be higher than a reproducing temperature.

The magnetic recording apparatus using the magnetic recording medium according to the second aspect of the present invention comprises the second magnetic recording medium, a heater locally heating a part of the magnetic recording medium, and a magnetic head applying a magnetic field to the magnetic recording medium.

It is preferable to perform heating and magnetic field application using the apparatus according to the second aspect of the present invention in a manner to meet the condition of Tw>Tf, where Tw denotes a recording temperature of the locally heated recording layer, and Tf denotes a nonmagnetic-to-ferromagnetic transition temperature of the base layer.

According to a third aspect of the present invention, there is provided a magnetic recording medium, comprising a substrate; a base layer formed on the substrate and comprising a magnetic material; and a recording layer formed on the base layer and comprising magnetic particles and a nonmagnetic wall buried between the magnetic particles; the base layer and the recording layer being stacked to exert exchange coupling interaction, wherein structures of the base layer and the recording layer are set to meet the following condition: |TcB−Tw|<100K, where Tw is a recording temperature of the locally heated recording layer, and TcB is a Curie temperature of the base layer.

The magnetic recording apparatus using the magnetic recording medium according to the third aspect of the present invention comprises the third magnetic recording medium, a heater locally heating a part of the magnetic recording medium, and a magnetic head applying a magnetic field to the magnetic recording medium.

It is preferable to perform heating and magnetic field application using the apparatus according to the third aspect of the present invention in a manner to meet the condition of |TcB−Tw|<100K, where Tw denotes a recording temperature of the locally heated recording layer, and TcB denotes a Curie temperature of the base layer.

According to a fourth aspect of the present invention, there is provided a magnetic recording medium, comprising a substrate; a base layer formed on the substrate and comprising a magnetic material; a switching layer formed on the base layer and comprising a magnetic material; and a recording layer formed on the switching layer and comprising magnetic particles and a nonmagnetic wall buried between the magnetic particles; the base layer, the switching layer and the recording layer being stacked to exert exchange coupling interaction, wherein structures of the base layer, the switching layer and the recording layer are set to meet the following condition: TcS<TcB, where TcS is a Curie temperature of the switching layer, and TcB is a Curie temperature of the base layer.

The magnetic recording apparatus using the magnetic recording medium according to the fourth aspect of the present invention comprises the fourth magnetic recording medium, a heater locally heating a part of the magnetic recording medium, and a magnetic head applying a magnetic field to the magnetic recording medium.

It is preferable to perform heating and magnetic field application using the apparatus according to the fourth aspect of the present invention in a manner to meet the conditions of TcS<TcB and 0<Tw−TcS<100K, where Tw denotes a recording temperature of the locally heated recording layer, TcS denotes a Curie temperature of the switching layer, and TcB denotes a Curie temperature of the base layer.

According to a fifth aspect of the present invention, there is provided a magnetic recording medium, comprising a substrate; a functional layer formed on the substrate and comprising an antiferromagnetic or ferrimagnetic material; and a recording layer formed on the functional layer and comprising magnetic particles and a nonmagnetic wall buried between the magnetic particles; the functional layer and the recording layer being stacked to exert exchange coupling interaction under an ambient temperature, wherein the magnetic recording medium meets the following condition: TcR>TcE, where TcR is a Curie temperature of the recording layer, and TcE is a temperature at which exchange coupling interaction between the functional layer and the recording layer disappears.

The magnetic recording apparatus using the magnetic recording medium according to the fifth aspect of the present invention comprises the fifth magnetic recording medium, a heater locally heating a part of the magnetic recording medium, and a magnetic head applying a magnetic field to the magnetic recording medium.

It is preferable to perform heating and magnetic field application using the apparatus according to the fifth aspect of the present invention in a manner to meet the conditions of TcR>TcE and |TcE−Tw|<100K, where Tw denotes a recording temperature of the locally heated recording layer, TcR denotes a Curie temperature of the recording layer, and TcE denotes a temperature at which exchange coupling interaction between the functional layer and the recording layer disappears.

According to a sixth aspect of the present invention, there is provided a magnetic recording medium, comprising a substrate; a functional layer formed on the substrate and comprising an antiferromagnetic or ferrimagnetic material; and a recording layer formed on the functional layer and comprising magnetic particles and a nonmagnetic wall buried between the magnetic particles; the functional layer and the recording layer being stacked to exert exchange coupling interaction under an ambient temperature, wherein the magnetic recording medium meets the following condition: TcR<TcE, where TcR is a Curie temperature of the recording layer, and TcE is a temperature at which exchange coupling interaction between the functional layer and the recording layer disappears.

The magnetic recording apparatus using the magnetic recording medium according to the sixth aspect of the present invention comprises the sixth magnetic recording medium, a heater locally heating a part of the magnetic recording medium, and a magnetic head applying a magnetic field to the magnetic recording medium.

According to a seventh aspect of the present invention, there is provided a magnetic recording medium, comprising a substrate; a functional layer formed on the substrate and comprising an antiferromagnetic or ferrimagnetic material; a switching layer formed on the functional layer and comprising a magnetic material; and a recording layer formed on the switching layer and comprising magnetic particles and a nonmagnetic wall buried between the magnetic particles; the functional layer, the switching layer and the recording layer being stacked to exert exchange coupling interaction under an ambient temperature, wherein the magnetic recording medium meets the following condition: TcR>TcE, where TcR is a Curie temperature of the recording layer, and TcE is a temperature at which exchange coupling interaction between the switching layer and the recording layer disappears.

The magnetic recording apparatus using the magnetic recording medium according to the seventh aspect of the present invention comprises the seventh magnetic recording medium, a heater locally heating a part of the magnetic recording medium, and a magnetic head applying a magnetic field to the magnetic recording medium.

It is preferable to perform heating and magnetic field application using the apparatus according to the seventh aspect of the present invention in a manner to meet the conditions of TcR>TcE and |TcE−Tw|<100K, where Tw denotes a recording temperature of the locally heated recording layer, TcR denotes a Curie temperature of the recording layer, and TcE denotes a temperature at which exchange coupling interaction between the functional layer and the recording layer disappears.

According to an eight aspect of the present invention, there is provided a magnetic recording medium, comprising a substrate; a functional layer formed on the substrate and comprising a magnetic material; and a recording layer formed on the functional layer and comprising magnetic particles and a nonmagnetic wall buried between the magnetic particles; the functional layer and the recording layer being stacked to exert a ferromagnetic exchange interaction under an ambient temperature, wherein the magnetic anisotropic energy density $Ku_{RL}$ of the recording layer is not lower than $5 \times 10^6$ erg/cc and higher than the magnetic anisotropic energy density $Ku_{FL}$ of the functional layer.

In the magnetic recording medium of the eighth aspect of the present invention, it is possible to use a recording layer having a multi-layered structure in which nonmagnetic layers comprising at least one element selected from the group consisting of Pt and Pd and having a thickness of not larger than 2 nm and magnetic layers are alternately stacked.

The magnetic recording apparatus using the magnetic recording medium according to the eighth aspect of the present invention comprises the eighth magnetic recording medium, and a magnetic head applying a magnetic field to the magnetic recording medium. The magnetic recording apparatus is not for performing thermally assisted magnetic recording.

BRIEF DESCRIPTION OF THE SEVERAL VIEWS OF THE DRAWING

FIGS. 8A to 8F are drawings showing that magnetizations of a recording layer and a base layer forming a magnetic recording medium according to the fourth embodiment of the present invention are changed depending on medium temperature;

FIG. 9 is a cross sectional view schematically showing a structure of a magnetic recording medium according to another embodiment of the present invention;

FIG. 28 is a drawing showing a result of calculation of inversion magnetic field of the exchange coupled two-layered film;

FIG. 29 is a drawing showing a result of calculation of inversion magnetic field of the exchange coupled two-layered film;

FIG. 32 is a drawing showing a result of calculation of inversion magnetic field of the exchange coupled two-layered film;

FIG. 33 is a drawing showing a result of calculation of inversion magnetic field of the exchange coupled two-layered film;

FIGS. 34A to 34D are drawings showing magnetic properties of a magnetic layer of a magnetic recording medium according to an embodiment of the present invention;

FIG. 40 is a graph showing recording temperature dependency of CNR in respect of the magnetic recording medium in Example 6;

FIG. 41 is a graph showing a relationship between CNR and |TcB−Tw| in respect of the magnetic recording medium in Example 6;

FIG. 42 is a graph showing recording temperature dependency of CNR in respect of the magnetic recording medium in Example 7;

FIG. 43 is a graph showing a relationship between CNR and Tw−TcS in respect of the magnetic recording medium in Example 7;

FIG. 44 is a graph showing recording temperature dependency of CNR in respect of the magnetic recording medium in Example 8;

FIG. 45 is a graph showing a relationship between CNR and |TcE−Tw| in respect of the magnetic recording medium in Example 8;

DETAILED DESCRIPTION OF THE INVENTION

Figure 1:
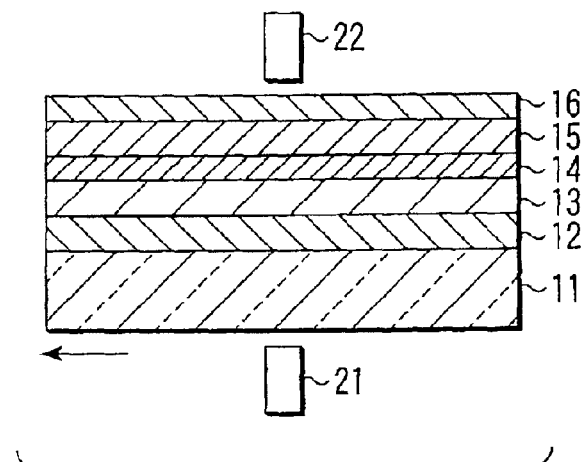
FIG. 1 is a cross sectional view schematically showing a structure of a magnetic recording medium according to a first embodiment of the present invention.

The present invention will now be described in detail. First of all, let us describe the structures of the magnetic recording medium and the magnetic recording apparatus common with all the embodiments of the present invention.

The schematic structure of the magnetic recording medium of the present invention will now be described. Each of the magnetic recording mediums according to the embodiments of the present invention has a base layer and/or a switching layer and/or a functional layer that are interposed between a nonmagnetic substrate and a magnetic recording layer. In the case of performing thermally assisted magnetic recording, used is a base layer, a switching layer or a functional layer whose magnetic properties are changed depending on temperature. It is possible to arrange an underlayer for controlling the performance of the recording layer etc., as required. It is also possible to arrange a protective layer consisting of carbon, $SiO_2$ or the like on the recording layer, as required.

The substrate is generally in the shape of a disk and is made of a hard material. The materials used for forming the substrate include, for example, a metal, glass, and a ceramic material.

The recording layer has a structure, for example, in which magnetic particles are dispersed in a nonmagnetic material. Magnetic particles having a large saturation magnetization Is and a large magnetic anisotropy are suitable for use for forming the recording layer. In this viewpoint, it is desirable to use, as a magnetic metal material, an alloy comprising a magnetic element selected from the group consisting of Co, Fe and Ni and a metal selected from the group consisting of Pt, Sm, Cr, Mn, Bi and Al. It is more desirable to use a Co alloy having a large crystal magnetic anisotropy, particularly, alloys based on CoPt, SmCo, CoCr and ordered alloys such as FePt and CoPt. To be more specific, it is desirable to use alloys such as Co—Cr, Co—Pt, Co—Cr—Ta, Co—Cr—Pt, Co—Cr—Ta—Pt, $Fe_{50}$—$Pt_{50}$, $Fe_{50}$—$Pd_{50}$ and $Co_3$—$Pt_1$. It is also possible to use, as a magnetic material, rare earth (RE)-transition metal (TM) alloys such as Tb—Fe, Tb—Fe—Co, Tb—Co, Gd—Tb—Fe—Co, Gd—Dy—Fe—Co, Nd—Fe—Co, Nd—Tb—Fe—Co, a multi-layered film comprising a magnetic layer and a noble metal layer such as Co/Pt and Co/Pd, semi-metals such as PtMnSb, and magnetic oxides such as Co ferrite and Ba ferrite. Further, in order to improve the magnetic properties of the magnetic materials described above, it is possible to add, for example, Cr, Nb, V, Ta, Ti, W, Hf, In, Si, B or a compound between these elements and at least one element selected from the group consisting of oxygen, nitrogen, carbon and hydrogen. It is possible for the magnetic anisotropy of the magnetic particles to be a longitudinal magnetic anisotropy utilized in the conventional HDD, a perpendicular magnetic anisotropy utilized in the magneto-optical recording or a mixture of these longitudinal and perpendicular magnetic anisotropy.

A method of separating the magnetic particles by a nonmagnetic material is not particularly limited in the present invention. For example, it is possible to employ a method of forming a film by adding a nonmagnetic element to a magnetic material so as to precipitate nonmagnetic materials such as Cr, Ta, B, an oxide such as $SiO_2$ and a nitride between the magnetic particles. It is also possible to employ a method of forming fine pores in a nonmagnetic material by utilizing lithography technology and burying magnetic particles in the pores thus formed. It is also possible to employ a method of allowing a diblock copolymer such as PS-PMMA to be self-organized so as to remove one polymer and forming fine pores in a nonmagnetic material with the other polymer used as a mask, followed by burying magnetic particles in the pores. Further, it is possible to employ the processing method utilizing particle beam irradiation.

The thickness of the recording layer is not particularly limited. However, it is desirable for the thickness of the recording layer to be not larger than 100 nm in view of the high-density recording, preferably not larger than 50 nm, and more preferably not larger than 20 nm. It should be noted, however, that it is undesirable for the thickness of the recording layer to be not larger than 0.1 nm because it is difficult to form a film.

The underlayer, that is arranged as desired, may be made of a magnetic material or a nonmagnetic material. The thickness of the underlayer is not particularly limited. However, it is undesirable for the thickness of the underlayer to be larger than 500 nm because the manufacturing cost is increased in this case.

It is desirable for the underlayer made of a magnetic material to be magnetically coupled with the domain within the recording layer and the recording/reproducing head via exchange interaction or magnetostatic interaction in order to perform efficiently the recording/reproducing in the recording layer. For example, in the case of using a perpendicular magnetization film as the recording layer, it is possible to achieve high-density recording by using a soft magnetic layer as the underlayer and by performing recording by means of a single magnetic pole head. In the case of using a longitudinal magnetization film as the recording layer, it is possible to achieve a high-density recording by arranging a soft magnetic layer on or below the recording layer and by applying a magnetic field having intensity high enough to saturate the soft magnetic layer in the reproducing step. In this case, the resistance to the thermal fluctuation can also be improved.

The underlayer made of a nonmagnetic material is intended to control the crystal structure of the magnetic or nonmagnetic material in the recording layer or to prevent migration of impurities from the substrate. For example, in the case of using an underlayer having a lattice interval close to the lattice interval of a desired crystal orientation of the magnetic material, it is possible to control the crystal orientation of the magnetic material. Also, in the case of using an amorphous underlayer having an appropriate surface energy, it is possible to control the crystallinity or amorphous properties of a magnetic material or a nonmagnetic material of the recording layer. It is possible to form an additional underlayer having another function below the underlayer described above. In this case, two underlayers can share functions, making it possible to control easily the desired effect. For example, it is known to the art that a seed layer having a small particle size is formed on the substrate and an underlayer for controlling the crystallinity of the recording layer is formed on the seed layer in an attempt to diminish the crystal grains in the recording layer as much as possible. In order to prevent migration of impurities from the substrate, it is desirable to use a film having small lattice interval or a dense film as the underlayer.

Further, it is possible for the underlayer to have the functions described above. For example, it is possible for the magnetic underlayer to have a function of controlling the crystallinity of the magnetic material contained in the recording layer. In this case, synergetic effects are produced by the effect in terms of the recording/reproducing characteristics and the effect on the crystallinity and, thus, it is more desirable to use the particular underlayer, compared with the use of an underlayer having a single function alone. Also, it is possible to use as the underlayer a surface modified layer of the substrate produced by, for example, ion plating, doping within an ambient gas and neutron beam irradiation. In this case, the process of depositing a thin film can be omitted and, thus, it is desirable to use the particular surface modified layer in terms of the manufacturing process of the magnetic recording medium.

The magnetic recording apparatus of the present invention for performing thermally assisted magnetic recording comprises a heater locally heating a part of the magnetic recording medium and a magnetic head applying a magnetic field to the magnetic recording medium. On the other hand, the magnetic recording apparatus of the present invention, in which thermally assisted magnetic recording is not performed, does not comprise a heater locally heating a part of the magnetic recording medium, though comprises a magnetic head applying a magnetic field to the magnetic recording medium.

It is possible for the heater heating the magnetic recording medium to be of the type that the entire region of the disk is uniformly heated or the disk is locally heated as far as the portion heated to reach a recording temperature is local. In general, it is desirable to heat locally a part of the medium while keeping the most portion of the medium at temperatures not higher than ambient temperature in view of the record retaining characteristics (archiving characteristics) and the power used. The heating means capable of rapid and local heating is considered to include, for example, a laser, an induction heating means, a probe having the distance from the medium surface held variable and heated by, for example, an electric heating wire, and an electron beam emission probe. Also, the method for performing more local heating includes, for example, a system in which a laser light is drawn on the medium surface with a lens, a system in which a laser light is converted into a near field light by using a micro aperture or a solid immersion lens (SIL), a system in which a fine antenna is formed at the tip of a probe for performing induction heating, a method in which the shape of that portion of a heating probe which faces the medium is made as sharp as possible or the distance from the medium surface is shortened, and a method in which the shape of that portion of an electron beam emission probe which faces the medium is made as sharp as possible. It is possible to arrange the heating means on the side of the recording layer of the medium or on the opposite side.

It is possible for the magnetic head applying a magnetic field to the magnetic recording medium to be of the type that a magnetic circuit comprising an induction coil and a magnetic pole is mounted to the edge surface of a floating slider as used in the ordinary HDD. It is also possible to arrange a permanent magnet as the magnetic head. It is also possible to add a magnetic layer to the medium so as to generate a magnetization distribution by the temperature distribution or the light irradiation, thereby generating a magnetic field instantly and locally. Further, it is possible to utilize a leakage magnetic field generated from the magnetic layer itself performing information recording. Where a permanent magnet is arranged, it is possible to apply a magnetic field of high-density at a high speed by taking measures such that a distance from the medium is made variable or the magnet is miniaturized.

The magnetic recording medium according to a first embodiment of the present invention, the magnetic recording apparatus using the particular magnetic recording medium and the magnetic recording method applied to the particular magnetic recording medium will now be described. The magnetic recording medium according to the first embodiment of the present invention comprises at least a nonmagnetic substrate, a base layer comprising a magnetic material, a switching layer comprising a nonmagnetic material, and a recording layer comprising magnetic particles and a nonmagnetic wall buried between the magnetic particles.

FIG. 1 shows the magnetic recording medium according to the first embodiment of the present invention, a magnetic field applying means and a heating means. The magnetic recording medium according to the first embodiment of the present invention comprises a substrate 11. As shown in the drawing, an underlayer 12, a base layer 13 comprising a magnetic material, a switching layer 14 comprising a non-magnetic material, a recording layer 15 and a protective layer 16 are formed in the order mentioned on the substrate 11. A transparent substrate such as glass is used as the substrate 11 of the magnetic recording medium. A laser 21 is arranged as a heating means on the side of the substrate 11. It is possible to arrange a lens (not shown) between the laser 21 and the substrate 11. A recording head 22 is arranged as a magnetic field applying means over the magnetic recording medium. The medium is rotated so as to move from, for example, the right to the left in the drawing, as denoted by an arrow. It is possible to form a fine magnetization reversal in the recording layer 15 by a local heating performed by the laser 21 and by a local magnetic field application performed by the recording head 22. The remaining portion (not shown) is substantially equal to the conventional HDD apparatus. Incidentally, it is possible to make the laser 21 integral with the recording head 22 so as to be arranged over the magnetic recording medium.

The switching layer 14 is made of a nonmagnetic material and performs the function of separating exchange coupling interaction between the recording layer 15 and the base layer 13 at ambient temperature. This layer is capable of switching between the state that the exchange coupling interaction is exerted between the recording layer and the base layer and the state that the particular interaction does is not exerted depending on the temperature as described herein later and, thus, is called the switching layer. The type of the switching layer 14 is not particularly limited. For example, it is possible for the effect of cutting the exchange coupling interaction to be obtained by the mixing of materials at the interface or by the interface effect even if the switching layer 14 is not in the form of a continuous thin film. The thickness of the switching layer 14 is set to, for example, 5 nm or less. The lower limit of the thickness of the switching layer 14 is not particularly limited. However, the thickness of 0.3 nm or less is not desirable because it is substantially impossible to form an interface. It is possible for the switching layer 14 to be capable of also performing the function of the underlayer and of controlling the magnetic properties of the recording layer 15.

The base layer 13 is not particularly limited as far as it comprises a magnetic material. Also, the thickness of the base layer 13 is not particularly limited. However, it is not desirable for the thickness to be 1000 nm or more because it takes a long time to prepare the base layer and the deterioration of the characteristics and peeling tend to be caused by the film stress. Also, the thickness of 1 nm or less is not desirable because it is difficult to form the film.

The present inventors have studied in detail the temperature dependency of the exchange coupling taking between the base layer and the recording layer separated from each other by a thin nonmagnetic film. It has been found that it is possible to control by temperature the presence or absence of the exchange coupling between the base layer and the recording layer. Such being the situation, the nonmagnetic layer noted above is called the switching layer.

Figure 2:
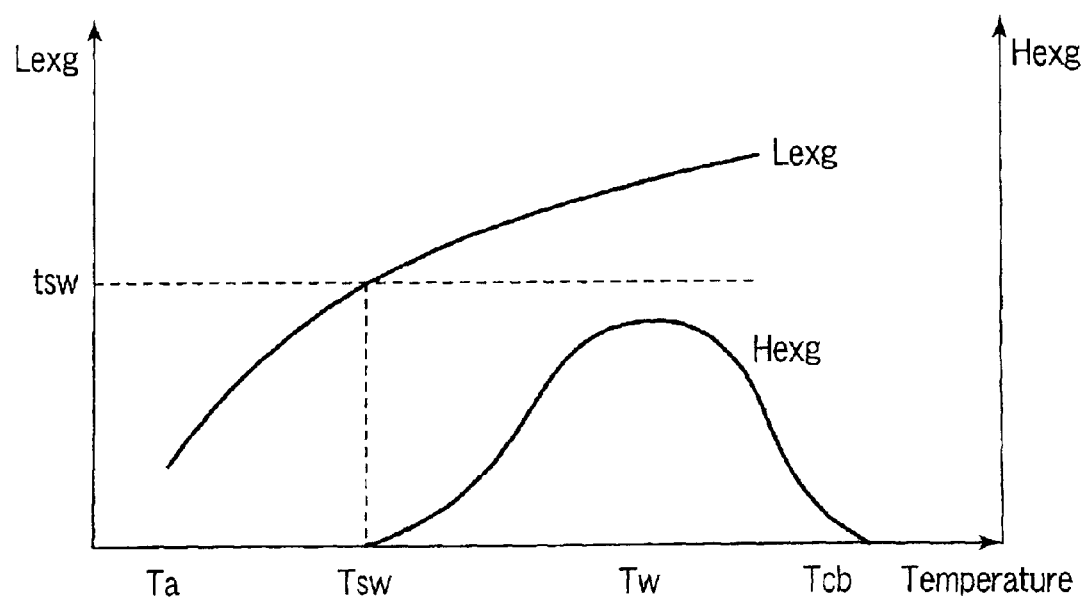
FIG. 2 is a graph showing temperature dependency of distance Lexg over which exchange coupling interaction is exerted and exchange force Hexg in a magnetic recording medium according to the first embodiment of the present invention.

FIG. 2 is a graph schematically showing the temperature dependency of each of intensity Hexg, in terms of a magnetic field, of the exchange coupling interaction exerted between the recording layer and the base layer, and the distance Lexg over which the exchange coupling is exerted from the interface of the recording layer toward the base layer. In the graph of FIG. 2, tsw denotes a thickness of the switching layer, Tsw denotes a temperature at which recording layer and the base layer begin to exert the exchange coupling interaction (where tsw=Lexg), Ta denotes ambient temperature, Tw denotes a recording temperature, i.e., the recording temperature of the locally heated recording layer, and TcB denotes a Curie temperature of the base layer. Incidentally, Tw is set at 100° C. or more in view of an HDD mounted to a motor car in order to prevent the recording magnetization from being reversed again within a motor car room in which it is possible for the temperature to be elevated to 80° C. As shown in FIG. 2, if the temperature of the recording layer is higher than Tsw, the distance Lexg over which the exchange coupling is exerted is rendered larger than the thickness tsw of the switching layer, with the result that the exchange coupling interaction is exerted between the base layer and the recording layer. The present inventors have found that it is possible to achieve a high-density magnetic recording that was difficult to achieve in the past because of the thermal fluctuation. The situation will now be described in detail.

As described above, if the magnetic anisotropy energy Ku of the magnetic particle is increased in an attempt to overcome the thermal fluctuation limit, the recording coercive force Hcw is increased. However, since the magnetic anisotropy energy is lowered with temperature, it is possible to lower Hcw to the level at which recording can be performed with the head widely used nowadays if the medium is heated in the recording step. This is the basic idea of the thermally assisted magnetic recording. However, in the thermally assisted magnetic recording studied in the past, the thermal fluctuation deterioration immediately after the recording and the cross erase were the problems to be solved. This is because the medium is in a heated state immediately after recording is performed, the thermal fluctuation deterioration tends to take place more easily. In other words, even if a reversal domain is formed by the head magnetic field, it is impossible to achieve recording if the domain is collapsed by thermal fluctuation immediately after the head passes through so as to allow the magnetic field to cease to be applied. Also, since the temperature distribution is generated without fail by the heating means, the adjacent track is also heated during the recording operation, with the result that the thermal fluctuation phenomenon is accelerated by the temperature elevation so as to bring about the deterioration even if Ku and Va are controlled so as not to bring about the thermal fluctuation at ambient temperature.

These problems can be overcome by the first embodiment of the present invention as described below. Specifically, the degree of the thermal fluctuation is determined by the ratio of the magnitude of the magnetic anisotropy energy (=Ku×Va) to the thermal fluctuation energy, and the re-reversal of the domain is unlikely to take place if the product KuVa is decreased. The present inventors have newly introduced the quantity of magnetic anisotropy energy density Kuw at the recording time and paid attentions to the dependency of Kuw on temperature. The Ku value itself is an essential physical quantity of a magnetic material and is not changed depending on the manner of change in the magnetic field. In general, the magnetization reversal process due to, for example, VSM is utilized in many cases for estimating Ku, and the Ku value is calculated by physical quantities such as Hc estimated at that time. The influence of the thermal fluctuation is included in the estimation and the effect thereof is large in, particularly, a material having small value of KuVa. However, it is difficult to estimate accurately the influence of the thermal fluctuation. Such being the situation, the method of obtaining Ku by using Hc estimated on the assumption that there is no thermal fluctuation is employed in many cases. In the case of using this method, the value of Ku is changed by the reversal rate of the magnetic field. In this specification, Ku thus estimated is used as Kuw for the sake of convenience. The value of Kuw is substantially proportional to the recording coercive force Hcw coping with the rapid change in the magnetization during the recording operation.

Figure 3:
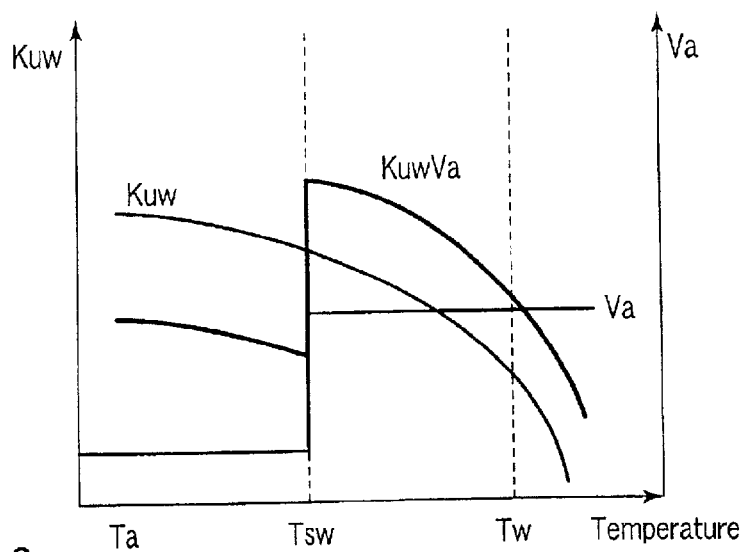
FIG. 3 is a graph showing changes with temperature in magnetic anisotropy energy Kuw, activation volume Va and the product KuwVa in a recording step in a magnetic recording medium according to the first embodiment of the present invention.

In the first embodiment, the structure of the magnetic recording medium is controlled and the heating and the magnetic field application are performed so as to satisfy the temperature dependency of each of Lexg and Hexg shown in FIG. 2. FIG. 3 is a graph showing the temperature dependency of each of Kuw, Va and KuwVa of the magnetic recording medium.

As shown in FIG. 3, if the medium temperature exceeds Tsw, exchange coupling is achieved between the recording layer and the base layer, with the result that the magnitude Va of the magnetization reversal unit is rapidly increased and KuwVa is also increased together with the increase in Va. It follows that it is possible for KuwVa to have a value large enough to suppress the magnetic re-reversal even in the vicinity of the recording temperature Tw. On the other hand, the coercive force Hcw in this stage remains to be small, making it possible to perform recording easily. Therefore, magnetic re-reversal due to thermal fluctuation does not take place even if the thermally assisted magnetic recording is performed, making it possible to achieve high-density magnetic recording. Also, cross erase can be suppressed. To be more specific, when the temperature elevation is small in the adjacent track, the reduction in KuVa is small and, thus, the thermal fluctuation deterioration does not take place. When the temperature elevation is large, Va is increased so as to also suppress the thermal fluctuation deterioration.

Figure 4:
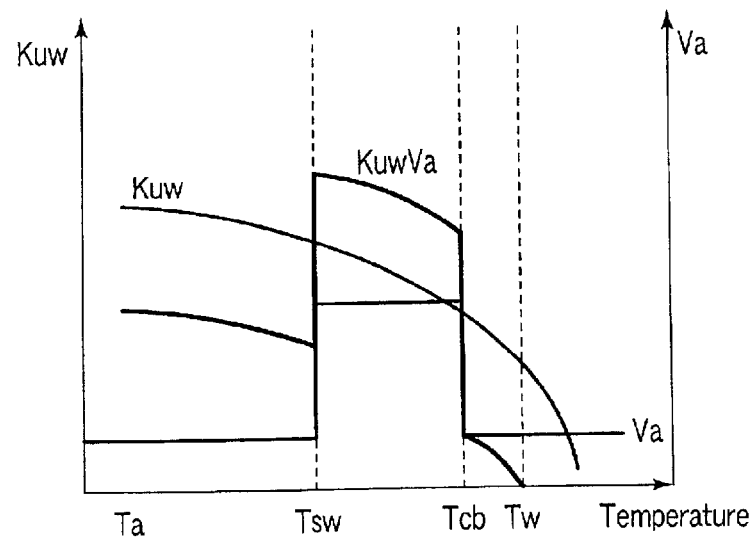
FIG. 4 is a graph showing changes with temperature in magnetic anisotropy energy Kuw, activation volume Va and the product KuwVa in a recording step in a magnetic recording medium according to the first embodiment of the present invention.

The description given above is on the premise that the Curie temperature TcB of the base layer is higher than the recording temperature Tw. However, it is possible for TcB to be lower than Tw. FIG. 4 is a graph showing the temperature dependency of each of Kuw, Va and KuwVa of the magnetic recording medium, covering the case where TcB is lower than Tw. As shown in FIG. 4, KuwVa is once increased by the increase of Va under temperature higher than Tsw. However, KuwVa is lowered again under temperatures higher than TcB. The recording is performed under the state that KuwVa is markedly diminished. However, the magnetic re-reversal is suppressed because Va is increased in the cooling step immediately after recording. The function of suppressing the cross erase is equal to that described above. In this case, it is possible to improve recording resolution because Va in the recording step is small so as to obtain the merit that the recording can be achieved at high density. It should be noted, however, that there is a defect that a margin for controlling the recording temperature relative to TcB is narrow. It follows that the relationship between TcB and Tw should be set in accordance with the requirements of the system using the medium.

In the magnetic recording medium according to the first embodiment of the present invention, it is possible to use suitably a ferrimagnetic material for forming the base layer. If the base layer is formed of a ferrimagnetic material, the magnetization can be rendered substantially zero at ambient temperature or an arbitrary temperature so as to prevent a signal from the base layer from being detected as a noise in the reproducing step. It is also desirable to use an amorphous rare earth-transition metal (RE-TM) alloy as the ferrimagnetic material because the exchange coupling between the recording layer and the base layer can be performed without depending to the nonuniformity in the magnetic particle size in the recording layer. Also, the RE-TM alloy is desirable because the value of magnetization at ambient temperature can be controlled easily by controlling the ratio of the rare earth element to the transition metal so as to facilitate the design and manufacture of the magnetic recording medium. The RE-TM alloy used in a magneto-optical recording medium such as TbFeCo, GdTbFeCo and DyTbFeCo are also desirable because it is possible to control easily the Curie temperature by controlling the ratio of Fe to Co.

In the first embodiment of the present invention, it is desirable for the length d [nm] of the portion of the non-magnetic material serving to separate the magnetic particles in the recording layer to be larger than ½ of the thickness tsw of the switching layer. In this case, the exchange coupling is not exerted between the magnetic particles when the medium temperature is higher than Tsw so as to increase Lexg, making it possible to form the magnetization transition low in transition noise. It should be noted, however, that the amount of magnetization is decreased if the distance between the adjacent magnetic particles is rendered unduly large, leading to a defect that the signal is diminished. It is desirable to set the relationship between the distance between the adjacent magnetic particles and the thickness of the switching layer in accordance with the requirements of the system of the magnetic recording apparatus.

Let us describe the magnetic recording medium according to the second embodiment of the present invention, the magnetic recording medium using the particular medium, and the magnetic recording method applied to the particular medium. The magnetic recording medium according to the second embodiment of the present invention comprises at least a nonmagnetic substrate, a base layer comprising a material that is nonmagnetic under the environment of use and becomes ferromagnetic at higher temperature, and a recording layer comprising magnetic particles and a nonmagnetic wall buried between the magnetic particles.

Figure 5:
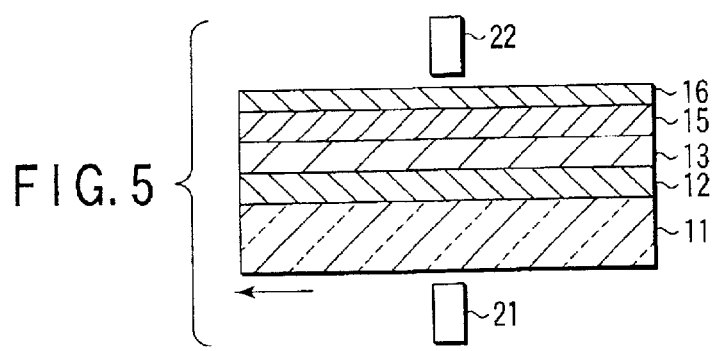
FIG. 5 is a cross sectional view schematically showing a structure of a magnetic recording medium according another embodiment of the present invention.

FIG. 5 schematically shows the magnetic recording medium according to the second embodiment of the present invention, a magnetic field applying means and a heating means. As shown in the drawing, magnetic recording medium comprises a substrate 11. An underlayer 12, a base layer 13, a recording layer 15 and a protective layer 16 are formed in the order mentioned on the substrate 11. The base layer 13 is formed of a material that is nonmagnetic under the environment of use (generally at ambient temperature) and becomes ferromagnetic when heated. A laser 21 as a heating means is arranged on the side of the substrate 11 of the magnetic recording medium. Also, a recording head 22 acting as a magnetic field applying means is arranged on the side of the protective layer 16 of the magnetic recording medium. Incidentally, it is possible to make the laser 21 integral with the recording head 22 so as to be arranged over the magnetic recording medium.

The magnetic recording medium according to the second embodiment of the present invention is equal to the magnetic recording medium according to the first embodiment of the present invention described previously in the conditions that should be satisfied by each of the layers of the medium except the base layer 13.

In the magnetic recording medium according to the second embodiment of the present invention, the material of the base layer 13 is not particularly limited as far as the material exhibits nonmagnetic properties under ambient temperature and is converted into a material exhibiting ferromagnetic properties when heated. The thickness of the base layer 13 is not particularly limited. However, the thickness of 1,000 nm or more is not desirable because it takes much time to prepare the base layer 13, and the base layer 13 tends to incur deterioration of characteristics and tends to be peeled off by the film stress. It is also undesirable for the thickness to be 1 nm or less because it is difficult to form the base layer 13.

As far as the research conducted by the present inventors is concerned, it is impossible to find a single material that exhibits nonmagnetic properties under ambient temperature and is converted into a material exhibiting ferromagnetic properties when heated. However, as a result of extensive research, the present inventors have found that there are composite materials exhibiting the particular properties including, for example, a thin film constructed such that magnetic particles having a size that exhibits superparamagnetic properties under ambient temperature are dispersed in a nonmagnetic material. In a thin film of the particular structure, it is possible to utilize the phenomenon that Lexg is increased with elevation of the temperature, if the distance between the adjacent magnetic particles is rendered smaller than Lexg as shown in FIG. 2 under high temperatures, though lower than the Curie temperature. The base layer formed of such a thin film exhibits paramagnetism as a whole under ambient temperature because the ferromagnetic particles are small and, thus, the magnetic anisotropy energy is rendered completely smaller than the thermal fluctuation energy. However, if the temperature is elevated, ferromagnetism is exhibited because of the effect that Lexg is rendered larger than the interval between the adjacent magnetic particles and, thus, the activation volume Va is increased.

The function of the magnetic recording medium using the particular base layer is equal to that of the magnetic recording medium according to the first embodiment of the present invention, which has a stacked structure comprising a base layer, a switching layer and a recording layer. In other words, it is possible to apply the description relating to FIGS. 2 to 4 if Tsw is replaced by Tf (paramagnetic-to-ferromagnetism transition temperature of the base layer). The other conditions of the recording method are equal to those relating to the first embodiment.

In the magnetic recording medium according to the second embodiment of the present invention, the structures of the base layer and the recording layer are controlled to satisfy the condition of Tw>Tf where Tw denotes the recording temperature of the locally heated recording layer, and Tf denotes the nonmagnetic-to-ferromagnetic transition temperature of the base layer. It is desirable to set Tw at 100° C. or more in this case, too, in view of the HDD for a motor car. It is desirable for the average distance between the adjacent magnetic particles to be 5 nm or less. It is undesirable for the distance noted above to exceed 5 nm because, in this case, Lexg is not increased in an amount large enough to bring about a sufficient exchange coupling under temperatures not higher than Curie temperature. On the other hand, it is undesirable for the distance in question to be 0.5 nm or less because, in this case, the base layer is made into a substantially continuous film.

The material of the base layer included in the magnetic recording medium according to the second embodiment of the present invention will now be described in detail. The materials of the magnetic particles are not particularly limited, though it is desirable to use the ferromagnetic material used for forming the recording layer in view of the ease in the manufacture. The nonmagnetic material is not particularly limited, either, though it is desirable to use an amorphous material that easily forms the matrix structure surrounding the magnetic particles. Such a nonmagnetic material includes, for example, a material represented by a general formula M-G, where M represents at least one element selected from the group consisting of Si, Al, Zr, Ti, In, Sn and B, and G represents at least one element selected from the group consisting of oxygen, nitrogen and carbon. To be more specific, it is desirable to use, for example, Si—O, Al—O, Zr—O, Ti—O, Si—N, Al—N, Zr—N, Ti—N, B—N, Si—C, Ti—C, B—C, SiAl—ON, Si—ON, AlTi—OC, or In—Sn—O. It is also desirable to use as the nonmagnetic material carbon allotropes such as diamond, amorphous carbon and diamond-like carbon.

Incidentally, it is possible to use a material corresponding to the base layer included in the magnetic recording medium according to the second embodiment of the present invention as a switching layer included in the magnetic recording medium according to the first embodiment of the present invention, which includes a stacked structure comprising a base layer, a switching layer and a recording layer.

Let us describe the magnetic recording medium according to a third embodiment of the present invention, the magnetic recording apparatus using the particular medium and the magnetic recording method applied to the particular medium. The magnetic recording medium according to the third embodiment of the present invention comprises at least a nonmagnetic substrate, a base layer comprising a magnetic material, and a recording layer comprising magnetic particles and a nonmagnetic wall buried between the magnetic particles. The base layer and the recording layer are stacked one upon the other in a manner to exert exchange coupling interaction.

The magnetic recording medium according to the third embodiment of the present invention has a stacked structure similar to that of the magnetic recording medium according to the second embodiment of the present invention, which is shown in FIG. 5.

It is possible for the magnetic anisotropy of the recording layer to be perpendicular direction to the surface or in-plane direction. The thickness of the recording layer is similar to that described previously in conjunction with the magnetic recording medium according to the first embodiment of the present invention.

The material of the base layer is not particularly limited as far as the base layer comprises a magnetic material. Also, it is possible for the magnetic anisotropy of the base layer to be in-plane direction or perpendicular direction, though it is desirable to use a base layer exhibiting a perpendicular magnetic anisotropy because a large change in Ku can be obtained in this case. The thickness of the base layer is equal to that described previously in conjunction with the magnetic recording medium according to the first embodiment of the present invention.

In order to allow the base layer and the recording layer to exert an exchange coupling interaction, these layers are formed consecutively without breaking vacuum. Theoretically speaking, it is possible for a nonmagnetic layer or a surface modified layer to be interposed between the base layer and the recording layer because the exchange coupling interaction is exerted even if there is a clearance of about 1 nm between them. It is also possible for a plurality of magnetic layers to be present between the base layer and the recording layer because it is also possible to control the exchange coupling force by interposing another magnetic layer between them.

In the magnetic recording medium according to the third embodiment of the present invention, attentions are paid to the Curie temperature of the base layer. It should be noted that the Curie temperature of a magnetic material can be examined on the basis of the temperature dependency of magnetization M or coercive force Hc. However, in the case of measuring the magnetic characteristics with, for example, VSM, the measurement takes a long time, making it necessary to maintain a heated state for at least 10 minutes. In addition, since it is impossible to shorten the time for the temperature elevation, it is necessary for the heated state to be maintained for about one hour in measuring the magnetic characteristics. In the case of a thin film magnetic material, it is possible for an irreversible change in the fine structure to take place if the magnetic material is held under high temperatures for a long time, resulting in failure to evaluate accurately the magnetic characteristics. In the case of an amorphous rare earth-transition metal alloy used as a magneto-optical recording medium, such a change is relatively unlikely to take place. However, in the case of a CoCrPt-based magnetic alloy used as an HDD medium, it is possible for the change in the fine structure to take place at about 200° C. Even in this case, however, it is possible to estimate Tc if the change in the magnetic characteristics from ambient temperature or lower to the temperature at which change in structure takes place is extrapolated toward the high temperature side. It suffices for Tc of the base layer included in the magnetic recording medium according to the third embodiment of the present invention to be the temperature at which Ku is substantially diminished and at which value of, for example, M or Hc is not larger than about ⅕ or less, preferably about ¹/₂₀ or less, of the value at ambient temperature.

Figure 6:
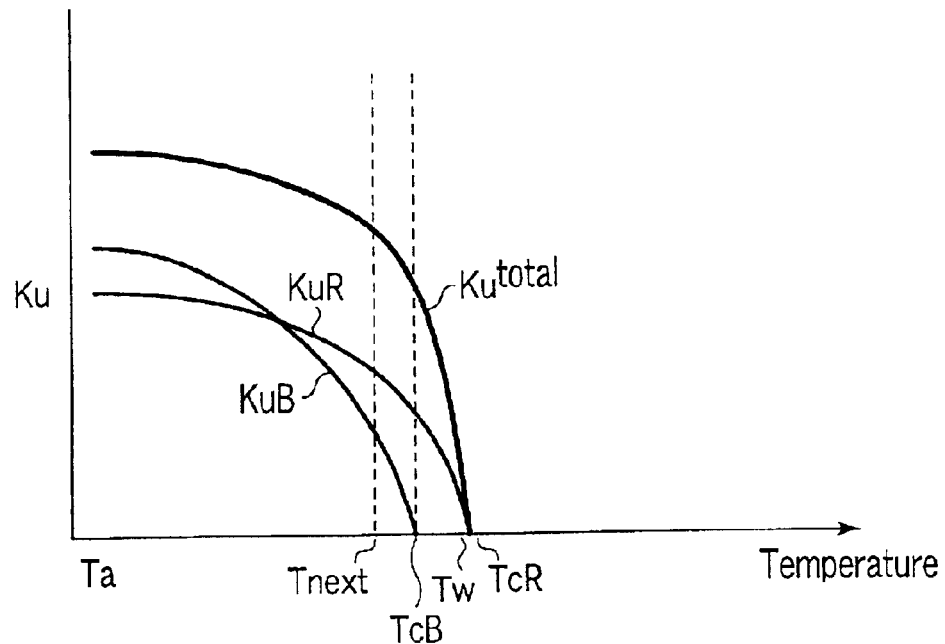
FIG. 6 is a graph showing temperature dependency of magnetic anisotropy energy density Ku in each layer in a magnetic recording medium according to a third embodiment of the present invention.

FIG. 6 is a graph showing the temperature dependency of the magnetic anisotropy KuR of the recording layer and the magnetic anisotropy KuB of the base layer included in the magnetic recording medium according to the third embodiment of the present invention. Since an exchange coupling is achieved between the recording layer and the base layer, the magnetic anisotropy as a whole is changed as denoted by $Ku^{total}$ in FIG. 6 (the depicted magnitude of Ku does not show quantitative relationship). To be more specific, if the recording layer and the base layer have a volume of the magnetization reversal unit large enough not to receive the thermal fluctuation, $Ku^{total}$ exhibits a value subjected to a weighted average in accordance with the magnetic characteristics of the recording layer and the base layer. Also, where, for example, the magnetic particles in the recording layer are small and receive the thermal fluctuation to some extent, $Ku^{total}$ has a value larger than the value of the weighted average because the volume of the magnetization reversal unit is increased. If the temperature is elevated to reach the Curie temperature TcB of the base layer, the base layer looses its magnetic properties, with the result that the effect of the exchange coupling is lost. At this stage, $Ku^{total}$ is rapidly lowered. If the recording layer has the volume of the magnetization reversal unit large enough not to receive the influence of the thermal fluctuation at this temperature, $Ku^{total}$ is lowered to the value of Ku at its original single recording layer. If the recording layer receives the influence of the thermal fluctuation, $Ku^{total}$ is more lowered. In any case, it is possible to obtain a rapid change in Ku that cannot be obtained in the single recording layer in the vicinity of TcB. Also, $Ku^{total}$ has a large value because of the function of the exchange coupling under temperatures slightly lower than TcB.

It is possible to overcome the problems of the cross erase and the domain disappearance, which were the problems in the thermally assisted magnetic recording, by setting small the difference between the Curie temperature TcB of the base layer and the recording temperature Tw by utilizing the manner of change in $Ku^{total}$ described above. To be more specific, even if there is a temperature elevation denoted by Tnext as shown in, for example, FIG. 6, deterioration of the recording caused by the thermal fluctuation does not take place because $Ku^{total}$ is sufficiently large. Also, since $Ku^{total}$ is large even under relatively high temperatures, $Ku^{total}$ is rapidly restored immediately after recording. It follows that it is possible to suppress the thermal fluctuation deterioration after recording.

As a result of experiments of recording in the magnetic recording medium according to the third embodiment of the present invention, the present inventors have found that the function and the effect described above are generated in the case where the condition of $|TcB-Tw|<100K$ is satisfied. Also, in order to perform the recording in higher density by ensuring a broader margin and allowing the manufacturing conditions of the medium and the apparatus to have an allowance, it is more desirable to satisfy the condition of $|TcB-Tw|<50K$, and further more desirably to satisfy the condition of $|TcB-Tw|<20K$.

The above description is on the premise that the Curie temperature TcB of the base layer is lower than the recording temperature Tw. However, it is possible for TcB to be higher than Tw. It should be noted in this connection that KuB is very small in the vicinity of the Curie temperature and, thus, it is possible to obtain the function and effect equal to those described above. Also, FIG. 6 shows that the Curie temperature TcR of the recording layer is higher than Tw. However, it is possible for TcR to be lower than Tw. It should be noted in this connection that, even under the state that the recording layer looses its magnetization, the recording layer is magnetized again during the application of the recording magnetic field from the head, with the result that the recording (magnetization reversal) is made possible. It should be noted that TcR, TcB and Tw are set appropriately in accordance with the requirements of the system, the medium materials used, etc.

Let us describe the magnetic recording medium according to a fourth embodiment of the present invention, the magnetic recording apparatus using the particular medium, and the magnetic recording method applied to the particular medium. The magnetic recording medium according to the fourth embodiment of the present invention comprises at leas a substrate, a base layer comprising a magnetic material, a switching layer comprising a magnetic material, and a recording layer comprising magnetic particles and a non-magnetic wall buried between the magnetic particles. The base layer and the switching layer are stacked one upon the other in a manner to exert exchange coupling interaction.

The magnetic recording medium according to the fourth embodiment of the present invention has a stacked structure similar to that of the magnetic recording medium according to the first embodiment of the present invention, which is shown in FIG. 1. It should be noted, however, that the recording layer included in the magnetic recording medium according to the fourth embodiment can be magnetized substantially perpendicular at ambient temperature. The magnetic recording medium according to the fourth embodiment also differs from the magnetic recording medium according to the first embodiment in the functions of the base layer and the switching layer. Also, the magnetic recording medium according to the fourth embodiment is constructed such that a switching layer is interposed between the base layer and the recording layer included in the magnetic recording medium according to the third embodiment of the present invention. The Curie temperature TcS of the switching layer is set lower than the Curie temperature TcB of the base layer. Also, the conditions for allowing the recording layer, the switching layer and the base layer to produce exchange coupling interaction are equal to those described previously in conjunction with the magnetic recording medium according to the third embodiment of the present invention.

Figure 7:
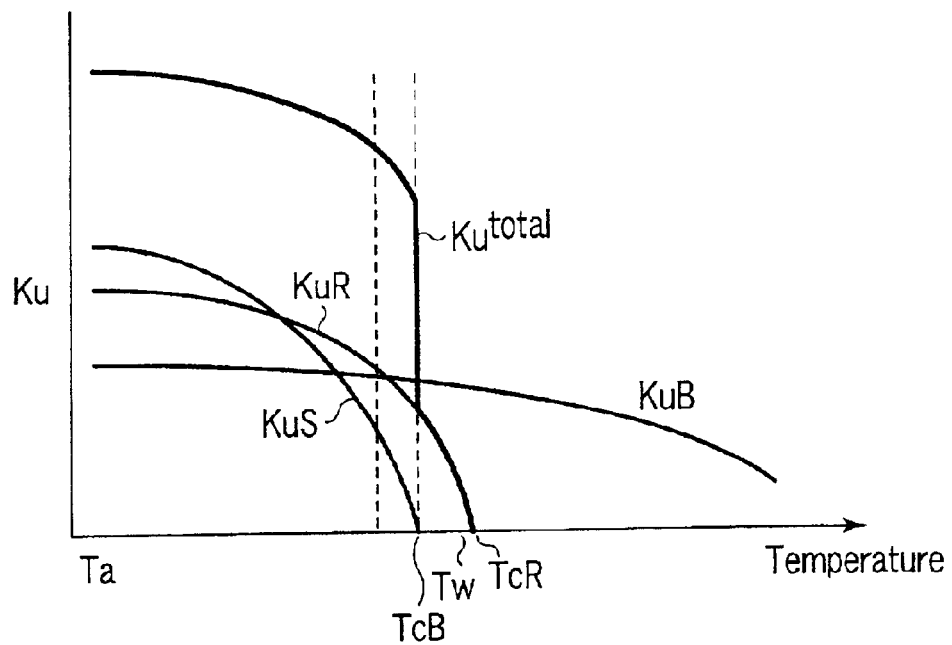
FIG. 7 is a graph showing temperature dependency of magnetic anisotropy energy density Ku in each layer in a magnetic recording medium according to a fourth embodiment of the present invention.

FIG. 7 is a graph showing the temperature dependency of the magnetic anisotropy KuR of the recording layer, the magnetic anisotropy KuS of the switching layer, and the magnetic anisotropy KuB of the base layer included in the magnetic recording, medium according to the fourth embodiment of the present invention. Since exchange coupling is achieved among the recording layer, the switching layer and the base layer, the magnetic anisotropy as a whole is changed as denoted by $Ku^{total}$ in FIG. 7 (the depicted magnitude of Ku does not show quantitative relationship). To be more specific, if the recording layer, the switching layer and the magnetic layer have a volume of the magnetization reversal unit large enough not to receive the thermal fluctuation, $Ku^{total}$ exhibits a value subjected to a weighted average in accordance with the magnetic characteristics of the recording layer, the switching layer and the base layer. Also, where, for example, the magnetic particles in the recording layer are small and receive the thermal fluctuation to some extent, $Ku^{total}$ has a value larger than the value of the weighted average because the volume of the magnetization reversal unit is increased. If the temperature is elevated to reach the Curie temperature TcS of the switching layer, the switching layer looses its magnetic properties, with the result that the effect of the exchange coupling between the recording layer and the base layer is lost. At this stage, $Ku^{total}$ is rapidly lowered. If the recording layer has the volume of the magnetization reversal unit large enough not to receive the influence of the thermal fluctuation at this temperature, $Ku^{total}$ is lowered to the value of Ku at its original single recording layer. If the recording layer receives the influence of the thermal fluctuation, $Ku^{total}$ is more lowered. In any case, it is possible to obtain a rapid change in Ku that cannot be obtained in the single recording layer in the vicinity of TcS. Also, $Ku^{total}$ has a large value because of the function of the exchange coupling under temperatures slightly lower than TcS.

It is possible to overcome the problems of the cross erase and the domain disappearance, which were the problems in the thermally assisted magnetic recording, by setting small the difference between the Curie temperature TcS of the switching layer and the recording temperature Tw in the magnetic recording medium according to the fourth embodiment of the present invention. The function is equal to that described previously with reference to FIG. 6 in conjunction with the magnetic recording medium according to the third embodiment of the present invention. It should be noted, however, that it is necessary to satisfy the condition of Tw>TcS. This is because the exchange coupling between the recording layer and the base layer is present as far as the magnetic properties of the switching layer remain, resulting in failure to obtain a rapid decrease of Ku. It should also be noted that, if the condition of TcB>TcS is not satisfied, it is impossible to obtain a rapid change in Ku when the medium temperature has arrived at TcS. The relationship between TcB and TcR may be arbitrarily set. However, it is desirable for TcB to be higher than TcR (TcB>TcS) in order to increase the manufacturing margin of the medium or to ensure a margin for the recording condition.

As a result of experiments of recording in the magnetic recording medium according to the fourth embodiment of the present invention under various conditions, the present inventors have found that the function and the effect described above are generated in the case where the condition of 0<(Tw−TcS)<100K is satisfied. Also, in order to perform the recording in a higher density by ensuring a broader margin and allowing the manufacturing conditions of the medium and the apparatus to have an allowance, it is more desirable to satisfy the condition of 0<(TcB−Tw)<50K, and further more desirably to satisfy the condition of 0<(TcB−Tw)<20K.

In the magnetic recording medium according to the fourth embodiment of the present invention, it is desirable for the switching layer to be formed of a thin film of an amorphous rare earth (RE)-transition metal (TM) alloy. In this case, RE is at least one element selected from the group consisting of Tb, Gd, Ho, Nd and Dy. On the other hand, the transition metal TM is at least one element selected from the group consisting of Fe, Co and Ni. The thin film of the amorphous rare earth-transition metal alloy is widely used in a magneto-optical recording medium and is featured in that a perpendicular magnetization film having a squareness of 1 can be obtained easily. Also, it is possible to control the temperature dependency of the saturation magnetization Ms and the coercive force Hc by controlling the ration of RE to TM so as to control easily the state of the exchange coupling between the base layer and the recording layer such as the reversal magnetic field in each layer under a certain temperature. Where an alloy containing at least Fe and Co is used as TM, it is possible to set arbitrarily the Curie temperature by controlling the amount of Fe relative to Co so as to control easily the switching temperature.

In the magnetic recording medium according to the third and fourth embodiments of the present invention, it is desirable for the base layer to be formed of a thin film of an amorphous rare earth (RE)-transition metal (TM) alloy. The effects similar to those described above can be obtained in this case, too.

In the magnetic recording medium according to the third embodiment of the present invention, it is desirable for the base layer to have a structure in which magnetic particles are dispersed in a nonmagnetic material. Since the particular base layer has a fine structure similar to that of the recording layer, it is possible to obtain the merits that it is possible to improve the crystallinity of the recording layer and that it is possible to control easily the morphology. Also, depending on the manufacturing method, it is possible to make the base layer and the recording layer substantially equal to each other in the crystal grain size. In this case, it is possible to switch ON and OFF of exchange coupling force from the base layer in the magnetization transition position with resolution corresponding to one to several particles so as to make it possible to achieve high-density recording.

Figure 48:
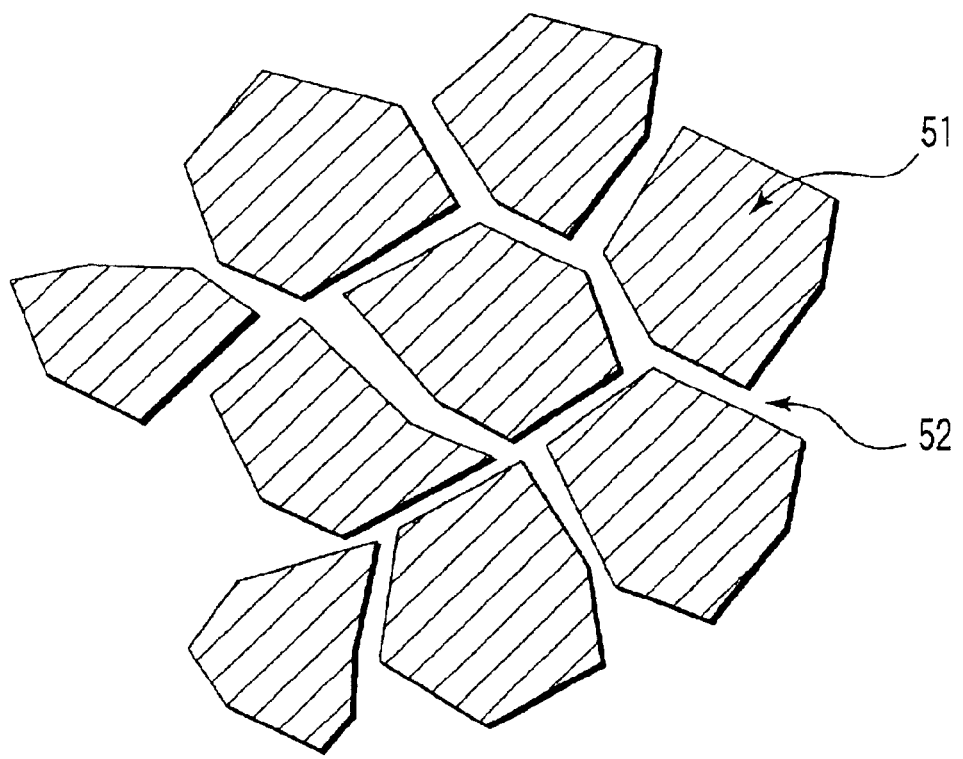
FIG. 48 is a plan view of a magnetic recording layer of a magnetic recording medium according to an embodiment of the present invention.

FIGS. 8A to 8F, which are directed to the recording operation in the magnetic recording medium of the structure described above, schematically shows the magnetization reversal in the recording layer 15 and the base layer 13. A reference numeral 51 shown in the drawing denotes the magnetic particle, the arrow in the magnetic particle 51 denotes the direction of the magnetization, the size of the arrow schematically shows the magnitude of the magnetization, and a reference numeral 52 denotes the nonmagnetic material interposed between the magnetic particles. FIG. 48 shows a plan view of the recording layer. As shown in FIG. 48, magnetic particles 51 are dispersed in a nonmagnetic material on the surface of the recording layer 15. As the initial state, all the magnetization is set to direct downward. By applying a thermally assisted magnetic recording to the medium, the magnetization transition is formed in the position denoted by an arrow 53. The medium is moving from the right to the left in the drawing. It follows that the magnetic particles on the right side relative to the arrow 53 are reversed. The time proceeds from FIG. 8A to FIG. 8F in the order mentioned so as to perform the recording.

FIG. 8A shows the state that the medium temperature T is equal to ambient temperature Ta. The recording is performed in this case by continuously irradiating a laser light collected on, for example, two particles so as to generate a magnetic field in an upward direction in the magnetic head arranged to conform with the irradiating position of the laser light. FIG. 8B shows the state that the medium temperature T in the heated portion is higher than the Curie temperature TcB of the base layer 13 but is slightly lower than the recording temperature Tw. The magnetization is erased in the base layer 13. In the recording layer 15, the magnetization and the recording coercive force are lowered by the decrease of Ku. However, the magnetization is not lost and, thus, the recording cannot be performed. FIG. 8C denotes the state immediately after the medium temperature T has reached the recording temperature Tw and a head magnetic field has been applied. Since Ku of the recording layer 15 is further diminished, the recording coercive force is lowered to the level at which recording can be performed by the head magnetic field. As a result, the magnetization of the recording layer 15 is reversed to the upward direction. At this stage, the magnetization transition is formed in the position of the arrow 53. If the base layer 13 is not formed, the thermal fluctuation takes place in the gradual cooling process after passage of the laser light, with the result that the magnetization once reversed is reversed again, or the magnetization transition is decayed. However, the magnetization is generated in the base layer 13 at the time when the medium temperature T in the heated portion immediately after the recording is rendered lower than TcB, as shown in FIG. 8D. In this stage, the magnetization of the base layer 13 is turned upward by the exchange magnetic field generated from the recording layer 15. Also, the thermal fluctuation phenomenon does not take place at this stage because $Ku^{total}$ and the activation volume Va as a whole film are rapidly increased. FIG. 8E denotes the state that the cooling further proceeds to make the medium temperature T considerably lower than TcB. Since the size of the magnetic crystal particles in the base layer 13 is substantially equal to that in the recording layer 15, the magnetization transition position is scarcely moved, and the magnetization is rendered stable at ambient temperature. FIG. 8F denotes the state after the recording. As described above, the magnetization transition is formed with resolution substantially equal to the size of the magnetic particles in the recording layer 15 and the base layer 13.

For convenience, the above description is on the basis that the relationship TcB<Tw<TcR is satisfied. However, the present invention is not limited to the particular relationship as described previously. Also, the size and the arrangement of the magnetic particles in the recording layer 15 and the base layer 13 need not meet the relationship shown in FIGS. 8A to 8F.

In the magnetic recording medium according to the fourth embodiment of the present invention, it is desirable for the switching layer as well as the base layer to have a structure in which magnetic particles are dispersed in a nonmagnetic material. The particular function and the effect described above can also be obtained in this case, too.

Let us describe a magnetic recording medium according to a fifth embodiment of the present invention, the magnetic recording apparatus using the particular medium, and the magnetic recording method applied to the particular medium. The magnetic recording medium according to the fifth embodiment of the present invention comprises at least a nonmagnetic substrate, a functional layer comprising an antiferromagnetic or ferrimagnetic material, and a recording layer comprising magnetic particles and a nonmagnetic wall buried between the magnetic particles. The functional layer and the recording layer are stacked one upon the other in a manner to exert exchange coupling interaction under the environment of use, i.e., at ambient temperature in general.

FIG. 9 schematically shows the magnetic recording medium according to the fifth embodiment of the present invention, a magnetic field applying means and a heating means. As shown in the drawing, the magnetic recording medium for the fifth embodiment comprises a substrate 61. An underlayer 62, a functional layer 63 comprising an antiferromagnetic or ferrimagnetic material, a recording layer 64, and a protective layer 65 are formed on the substrate 61 in the order mentioned. Further, a laser 21 acting as a heating means is arranged on the side of the substrate 61 of the magnetic recording medium, and a recording head 22 acting as a magnetic field applying means is arranged on the side of the protective layer 65 of the magnetic recording medium. Incidentally, it is possible to make the laser 21 integral with the recording head 22 so as to be arranged over the magnetic recording medium.

The functional layer 63 is not particularly limited as far as the functional layer 63 exhibits antiferromagnetic or ferrimagnetic properties. It is possible for the magnetic anisotropy of the functional layer 63 to be either a longitudinal magnetic anisotropy or a perpendicular magnetic anisotropy. It is also possible for the magnetic anisotropy of the functional layer 63 to be a mixture of the longitudinal magnetic anisotropy and the perpendicular magnetic anisotropy. The thickness of the functional layer 63 is not particularly limited. However, it is desirable for the thickness of the functional layer 63 not to exceed 1,000 nm because, if the thickness exceeds 1,000 nm, it takes a long time to prepare the functional layer 63 and the functional layer 63 tends to incur deterioration of the characteristics and to peel off because of the film stress. It is also undesirable for the thickness of the functional layer 63 to be less than 0.1 nm because, if the thickness is less than 0.1 nm, it is substantially impossible to form a film.

An antiferromagnetic thin film having the Neel temperature higher than ambient temperature can be used for forming the functional layer exhibiting the antiferromagnetic properties. For example, it is possible to use Mn—Ni, Mn—Pd, Mn—Pt, Cr—Pd, Cu—Mn, Au—Mn, Au—Cr, Cr—Mn, Cr—Re, Cr—Ru, Fe—Mn, Co—Mn, Fe—Ni—Mn, Co—Mn—Fe, and Ir—Mn for forming the functional layer. It is also possible to use ordered alloys such as AuMn, ZnMn, ReRh, FeRhIr, $Au_2Mn$, $Au_5Mn_{12}$, $Au_4Cr$, NiMn, PdMn, PtMn, PtCr, $PtMn_3$, and $RhMn_3$. Further, it is possible to use, for example, $Mn_3Pt$—N, CrMnPt, PdPtMn, NiO and CoO for forming the functional layer.

The functional layer exhibiting the ferrimagnetic properties can be formed of a ferrimagnetic thin film. To be more specific, it is possible to use, for example, a thin film of an amorphous rare earth (RE)-transition metal (TM) alloy such as Tb—Fe, Tb—Fe—Co, Tb—Co, Gd—Tb—Fe—Co, Gd—Dy—Fe—Co, Nd—Fe—Co, and Nd—Tb—Fe—Co and ordered alloys such as $CrPt_3$.

Also, as described herein later in detail, it is possible to use a multi-layered film exhibiting antiferromagnetic or ferrimagnetic properties for forming the functional layer. For example, it is possible for the functional layer to be of a multi-layered film comprising a magnetic layer consisting of Co, Ni, Fe, or an alloy thereof and a nonmagnetic layer consisting of, for example, Ru, Re, Rh, Ir, Tc, Au, Ag, Cu, Mn, Si, Cr, an alloy thereof or an oxide thereof. The thickness of the nonmagnetic layer should be thinner than 5 nm, preferably thinner than 1 nm. It is known that exchange coupling interaction is exerted in the antiferromagnetic direction among the magnetic layers in the particular multi-layered film so as to allow the multi-layered film to act as an antiferromagnetic material as a whole. It is also known that the particular multi-layered film acts as a ferrimagnetic material in the case where the magnetic layers differ from each other in the thickness and the moment.

For allowing the functional layer 63 and the recording layer 64 to exert exchange coupling interaction, it is known to the art that these films are formed successively without breaking vacuum in the general manufacturing process of the medium by, for example, a sputtering method. Theoretically speaking, it is possible for a nonmagnetic layer or a surface modified layer to be interposed between the functional layer 63 and the recording layer 64 because exchange coupling interaction is exerted even if the functional layer 63 and the recording layer 64 are apart from each other by several nanometers. It is also possible for a plurality of magnetic layers to be interposed between the functional layer 63 and the recording layer 64 because the exchanging coupling force can be controlled by interposing another magnetic layer between the functional layer 63 and the recording layer 64.

It is possible to examine the temperature TcE at which exchange coupling interaction disappears between the functional layer 63 and the magnetic layer 64 on the basis of the temperature dependency of the hysteresis loop using, for example, VSM.

Where the functional layer 63 exhibits the ferrimagnetic properties, the magnetization from the functional layer 63 can be detected with VSM. Under temperatures lower than TcE, the hysteresis loop exhibits a single stage loop like the magnetic characteristics of a single magnetic layer, or a multi-stage loop. Where a multi-stage loop is exhibited, the minor loop is shifted from the point where the applied magnetic field H is zero (H=0) toward the H-axis, if the minor loop is examined in each stage. The shift is derived from the exchange coupling between the functional layer 63 and the recording layer 64, and the shift amount is the exchange magnetic field Hexg. Under temperatures higher than TcE, the hysteresis loop is rendered to be of multi-stage except the case where the functional layer 63 and the recording layer 64 are equal to each other in the coercive force. However, unlike the case where the temperature is not higher than TcE, the shift toward the H-axis is not observed even if the minor loop is examined. This is because the loop is a simple overlapping of each layer. It follows that, if the temperature dependency of the coercive force is examined, a discontinuous change is exhibited before and after TcE, making it possible to estimate TcE.

Where the functional layer 63 exhibits antiferromagnetic properties, a multi-stage hysteresis loop does not appear. Where the functional layer 63 has a relatively large magnetic anisotropy, the shift of the hysteresis loop toward the H-axis takes place as in the case of the multi-stage hysteresis loop described above, making it possible to estimate Hexg. If Hexg is plotted relative to the temperature, it is possible to estimate TcE by actually measuring the temperature at which Hexg becomes zero (Hexg=0) or by extrapolation. Where the magnetic anisotropy of the functional layer 63 is small, the magnetization reversal is brought about in the functional layer 63 under temperatures not higher than TcE simultaneously with the magnetization reversal in the recording layer 64, resulting in failure to obtain the characteristic hysteresis loop. However, the presence of the functional layer 63 permits magnetization reversal under the magnetic field weaker than the coercive force owned originally by the recording layer 64 under temperatures not higher than TcE and also permits magnetization reversal under the magnetic field equal to the coercive force of the single layer of the recording layer 64 under temperatures higher than TcE. It follows that, if the temperature dependency of the coercive force is examined, a discontinuous change is exhibited before and after TcE, making it possible to estimate TcE.

It should be noted, however, that it is not absolutely necessary to know the accurate value of TcE. In the magnetic recording medium according to the fifth embodiment of the present invention, it is possible to understand that TcE is effectively exceeded, if the value of Hexg is about 1/20 of the value at ambient temperature. It is also possible to estimate TcE by evaluating the Curie temperature Tc of the recording layer 64 and, at the same, by extrapolating the result of the measurement under low temperatures toward the higher temperature side.

FIGS. 10A to 10F, which are directed to the recording operation performed by the magnetic recording medium according to the fifth embodiment of the present invention, schematically shows the magnetization reversal in the functional layer 63 and the recording layer 64. A reference numeral 71 shown in the drawing represents the magnetic particles present in the recording layer 64, an arrow in the magnetic particle 71 denotes the direction of the magnetization, the magnitude of the arrow schematically shows the magnitude of the magnetization, and a reference numeral 72 denotes the nonmagnetic layer interposed between the magnetic particles 71. FIGS. 10A to 10F show for the sake of convenience in the description that each of the functional layer 63 and the recording layer 64 consists of magnetic particles and a nonmagnetic material interposed between adjacent magnetic particles for separating the magnetic particles. In other words, it is possible for the functional layer 63 to be of another type. For example, it is possible for the functional layer 63 to be a consecutive film or to be of a three dimensional granular structure. Also, a perpendicular magnetic recording medium is taken up as an example in the drawing for the simplicity of the description. However, the description given below can also be applied as it is to the longitudinal medium or a medium intermediate between the perpendicular medium and the longitudinal medium.

In the initial state, the magnetizations of all the magnetic particles 71 in the recording layer 64 are set downward. On the other hand, the magnetization of the functional layer 63 is set in the direction opposite to that in the recording layer 64. These indicate the portions where the spins of the functional layer 63 perform antiferromagnetic coupling with the spins of the recording layer 64. For example, where the ferromagnetic coupling is achieved between the functional layer 63 and the recording layer 64 to allow the functional layer 63 to exhibit ferrimagnetic properties, the arrow of the functional layer 63 denotes the direction of the minor spin, e.g., the direction of the spin of the rare earth element in the case where, for example, the functional layer 63 is formed of an alloy of an amorphous rare earth-transition metal. Also, where an antiferromagnetic coupling is achieved between the functional layer 63 and the recording layer 64 to allow the functional layer 63 to exhibit antiferromagnetic properties, and the substance is constructed to permit the direction of the spin to be reversed for every atomic layer in the thickness direction of the film, the arrow of the functional layer 63 denotes the direction of the spin of the atomic layer closest to the recording layer 64.

A thermally assisted magnetic recording is applied to the medium. Specifically, an upward magnetic field is applied from the magnetic head under the state that the region denoted by a reference numeral 74 in FIG. 10A is heated so as to form a recording domain having an upward spin. The magnetization transition is formed in the position denoted by the reference numeral 73. The medium is being moved from the right to the left in the drawing. It follows that the magnetic particles on the right side relative to the arrow 73 are reversed. The time proceeds from FIGS. 10A to 10F so as to achieve recording.

FIG. 10A denotes the state that the medium temperature is equal to ambient temperature Ta. FIG. 10B denotes the state that the medium temperature T in the heated portion is higher than ambient temperature but is lower than the temperature TcE at which exchange coupling disappears. Under this state, magnetization of each of the functional layer 63 and the recording layer 64 is decreased by the reduction of Ku. FIG. 10C denotes the state that the medium temperature T in the heated portion has reached TcE. In order to indicate that exchange coupling between the functional layer 63 and the recording layer 64 has disappeared, the drawing shows as if magnetization disappears. However, it is not absolutely necessary for the magnetic moment of the functional layer 63 to be eliminated. For example, where the distance between the functional layer 63 and the recording layer 64 is longer than the interatomic distance of the functional layer 63 (or the distance between antiferromagnetically coupled moments), the interlayer coupling between the functional layer 63 and the recording layer 64 is cut away under temperatures at which coupling between the moments within the functional layer 63 is cut away. In this case, each of the functional layer 63 and the recording layer 64 has magnetization (moment). However, exchange coupling interaction is not generated between the two. Also, there is a state that, although there is some exchange coupling interaction, the interaction is not practically generated. For example, where the recording magnetic field or the coercive force of the recording layer is on the order of 100 Oe, the exchange coupling force Hexg is negligible if the exchange coupling force Hexg is on the order of 0.1 Oe. FIG. 10D denotes the state that the medium temperature T at the heated portion has reached the recording temperature Tw and an upward magnetic field has been applied by the recording head. The recording coercive force of the recording layer 64, which is substantially proportional to Ku, is lowered, with the result that the magnetization of the recording layer 64 is reversed upward. In this stage, the magnetization transition is formed at the position denoted by a reference numeral 73. If the functional layer 63 is not arranged, the thermal fluctuation takes place in the gradual cooling process after the passage of the laser light, with the result that the magnetization once reversed is reversed again, or the magnetization transition is decayed. However, at the time when the medium temperature T of the heated portion immediately after the recording is made lower than TcE, the exchange coupling interaction between the functional layer 63 and the recording layer 64 is restored. At this stage, the magnetization of the functional layer 63 is turned downward by the exchange magnetic field from the recording layer 64. Since the volume Va of the magnetization reversal unit is rendered equal to the sum of the volumes of the recording layer 64 and the functional layer 63 at this stage, the thermal fluctuation stabilization index KuV/kBT is rapidly increased so as to make it possible to suppress the thermal fluctuation phenomenon to a low level. The position of the magnetization transition is scarcely moved even if the cooling further proceeds. FIG. 10F denotes the state after the recording. As described above, the magnetization transition is formed with resolution substantially equal to the size of the magnetic particles contained in the recording layer 64.

Figure 11:
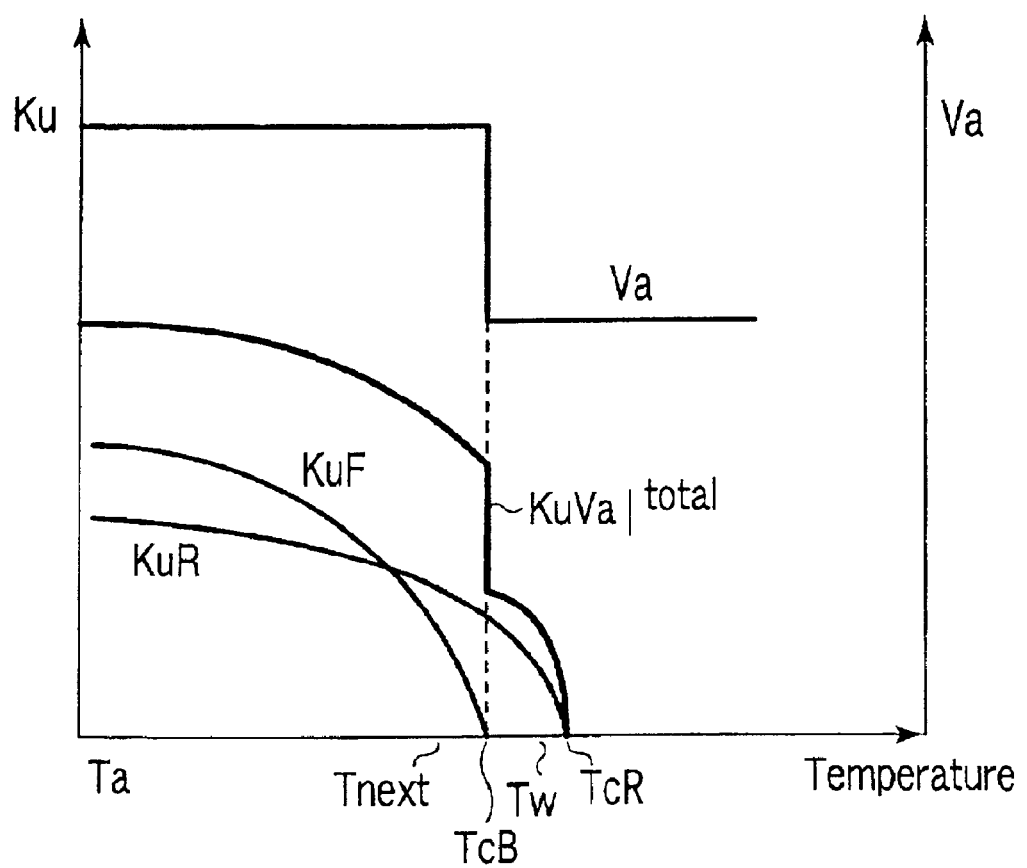
FIG. 11 is a graph showing changes with temperature in magnetic anisotropy energy Ku, activation volume Va and the product KuVa in a recording step in a magnetic recording medium according to the fifth embodiment of the present invention.

FIG. 11 is a graph schematically showing the changes with temperature in the magnetic anisotropy energy density Ku and the volume Va of the magnetization reversal unit in the recording process described above. In the graph of FIG. 11, KuR denotes the magnetic anisotropy energy density of the recording layer, KuF denotes the magnetic anisotropy energy density of the functional layer, and $KuVa|^{total}$ denotes the size of the apparent KuVa of the entire medium. As shown in the graph, Va is changed discontinuously and rapidly before and after TcE and, thus, $KuVa|^{total}$ is also changed rapidly.

By the function described above, it is possible to overcome the problems of the cross erase and the domain erasure immediately after the recording, which were the problems to be solved in the thermally assisted magnetic recording. To be more specific, even if there is a temperature elevation in the track adjacent to the recording track to the extent denoted by, for example, Tnext in FIG. 11, deterioration of the recording caused by the thermal fluctuation does not take place because $KuVa|^{total}$ is sufficiently large. Also, since $KuVa|^{total}$ is rapidly increased immediately after the recording, it is also possible to suppress thermal fluctuation deterioration after the recording.

As a result of the recording experiments in the exchange coupled two-layered film under various conditions, it has been confirmed that the particular function and effect described above can be obtained if the condition of |TcE−Tw|<100K is satisfied. Also, in order to ensure a wide margin and to allow the manufacturing conditions of the medium and the apparatus to have an allowance, it is desirable to satisfy the condition of |TcB−Tw|<50K and, more desirably, the condition of |TcB−Tw|<20K.

It is possible for the magnetic recording process described above with reference to FIGS. 10A to 10F to take place in the case where the functional layer exhibits ferromagnetic properties. It should be noted, however, that, if the total magnetization of the functional layer is large, a large leakage magnetic field is generated so as to inhibit improvement in recording density and, thus, it is undesirable for the total magnetization noted above to be large. For example, in the case of the longitudinal magnetic recording, a large diamagnetic field is generated at a magnetization transition so as to enlarge the transition. Also, in the case of the perpendicular magnetic recording, the antimagnetic field in the central portion of the recording domain is increased so as to generate a reverse domain, with the result that the medium noise is increased.

Let us describe a magnetic recording medium according to a sixth embodiment of the present invention, a magnetic recording apparatus using the particular medium, and the magnetic recording method applied to the particular medium. The magnetic recording medium according to the sixth embodiment of the present invention comprises at least a nonmagnetic substrate, a functional layer comprising an antiferromagnetic or ferrimagnetic material, and a recording layer comprising magnetic particles and a nonmagnetic wall buried between the magnetic particles. The functional layer and the recording layer are stacked one upon the other in a manner to exert an exchange coupling interaction under the environment of use, i.e., at ambient temperature in general. It follows that the structure of the magnetic recording medium according to the sixth embodiment of the present invention is equal to that of the magnetic recording medium according to the fifth embodiment, which is shown in FIG. 9, though the sixth embodiment differs from the fifth embodiment in that the Curie temperature TcR of the recording layer is lower than TcE.

FIGS. 12A to 12E show the recording operation of the magnetic recording medium according to the sixth embodiment of the present invention. The reference numerals shown in FIGS. 12A to 12E are equal to those shown in FIGS. 10A to 10E.

Figure 12A:
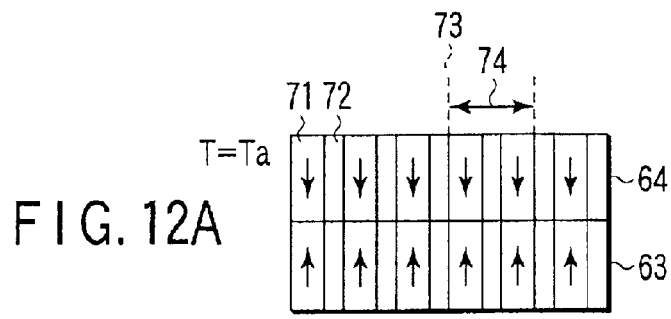
FIGS. 12A to 12E are drawings showing that magnetizations of a functional layer and a recording layer forming a magnetic recording medium according to a sixth embodiment of the present invention are changed depending on medium temperature.
Figure 12B:
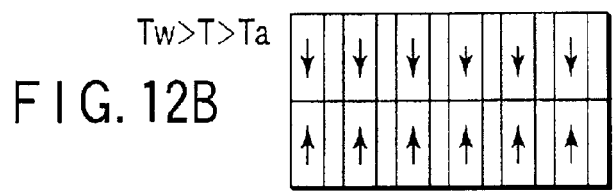
Figure 12C:
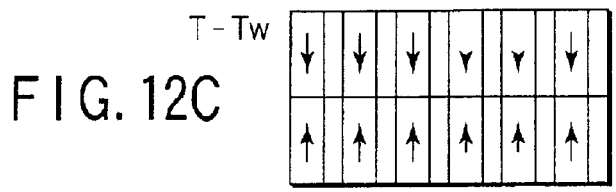
Figure 12D:
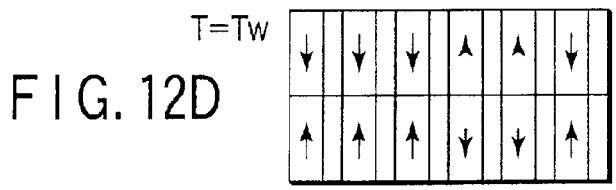
Figure 12E:
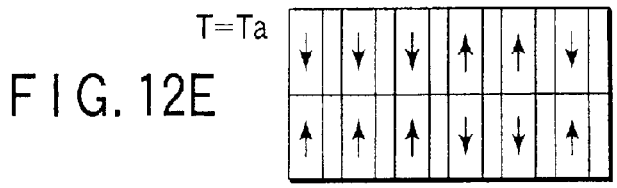

FIG. 12A denotes the state that the medium temperature T is equal to ambient temperature Ta. FIG. 12B denotes the state that the medium temperature T in the heated portion is higher than ambient temperature but is lower than the recording temperature Tw. Under this state, magnetization of each of the functional layer 63 and the recording layer 64 is decreased by the reduction of Ku. FIG. 12C denotes the state that the medium temperature T in the heated portion is slightly lower than Tw. The reduction in Ku of the recording layer 64 is large so as to permit recording with the head magnetic field. The exchange coupling between the functional layer 63 and the recording layer 64 is present even in this stage. FIG. 12D denotes the state that the medium temperature T at the heated portion has reached the recording temperature Tw and an upward magnetic field has been applied by the recording head. The magnetization of the recording layer 64 is reversed upward, and the magnetization of the functional layer 63, which forms an exchange coupling with the recording layer 64, is also reversed. At this stage, the magnetization transition is formed at the position denoted by a reference numeral 73 in FIG. 12A. If the functional layer 63 is not formed, the thermal fluctuation takes place in the gradual cooling process after passage of the laser light, with the result that the magnetization once reversed is reversed again or the magnetization transition is decayed. It should be noted, however, that, since the volume Va of the magnetization reversal unit is equal to the sum of the volumes of the recording layer 64 and the functional layer 63, the thermal fluctuation stability index $KuV/k_BT$ is sufficiently large so as to make it possible to suppress the thermal fluctuation phenomenon to a low level. The position of the magnetization transition is scarcely moved even if the cooling further proceeds. FIG. 12E denotes the state after the recording. As described above, the magnetization transition is formed with resolution substantially equal to the size of the magnetic particles contained in the recording layer 64.

By the function described above, it is possible to overcome the problems of the cross erase and the domain erasure immediately after the recording, which were the problems inherent in the thermally assisted magnetic recording.

The function and effect described above can be obtained by simply satisfying the condition of TcR<TcE. It follows that there is no particular limitation relating to the recording temperature Tw, and it suffices to set Tw in accordance with the capacity of the recording head. For example, where the writing capacity of the head is poor, Tw should be set in the vicinity of TcR, e.g., within 30K of TcR. In this case, however, the thermal fluctuation is increased. By contraries, when the head has a high writing capacity or when it comes to a magnetic recording apparatus having a relatively low density, in which Ku at ambient temperature need not be set at a high value, there is a case where recording can be achieved even if Tw is set at a level lower by several hundred K than TcR. Such a case is desirable because the influence of the thermal fluctuation acceleration is diminished.

Let us describe a magnetic recording medium according to a seventh embodiment of the present invention, a magnetic recording apparatus using the particular medium and the magnetic recording method applied to the particular medium. The magnetic recording medium according to the seventh embodiment of the present invention comprises at least a nonmagnetic substrate, a functional layer comprising an antiferromagnetic or ferrimagnetic material, a switching layer comprising a magnetic material, and a recording layer comprising magnetic particles and a nonmagnetic wall buried between the magnetic particles. The functional layer, the switching layer and the recording layer are stacked one upon the other in a manner to exert an exchange coupling interaction under the environment of use, i.e., at ambient temperature in general.

Figure 13:
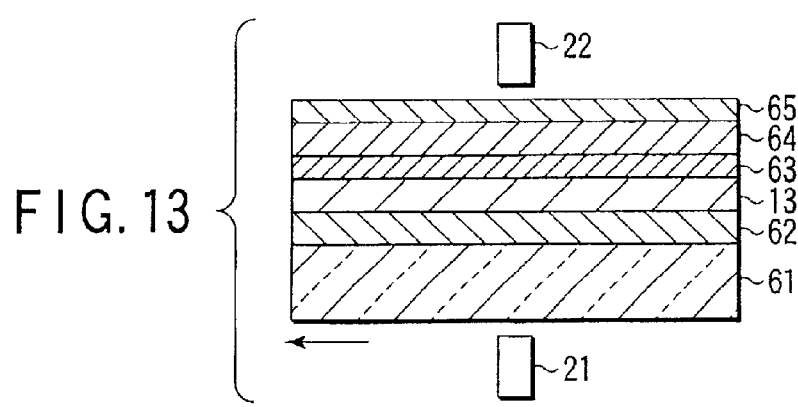
FIG. 13 is a cross sectional view schematically showing a structure of a magnetic recording medium according to another embodiment of the present invention.

FIG. 13 schematically shows the magnetic recording medium according to the seventh embodiment of the present invention, a magnetic field applying means and a heating means. The magnetic recording medium shown in FIG. 13 comprises a substrate 61. An underlayer 62, a functional layer 63 comprising an antiferromagnetic or ferrimagnetic material, a switching layer 66 comprising a magnetic material, a recording layer 64, and a protective layer 65 are formed in the order mentioned on the substrate 61. A laser 21 used as a heating means is arranged on the side of the substrate 61 of the magnetic recording medium, and a recording head 22 used as a magnetic field applying means is arranged on the side of the protective layer 65 of the magnetic recording medium. Incidentally, it is possible for the laser 21 to be made integral with the recording head 22 and for the integral structure to be arranged over the magnetic recording medium.

The conditions that must be satisfied by the members of the magnetic recording medium other than the switching layer 66 are equal to those described previously. The switching layer 66 is involved in only ON and OFF of exchange coupling between the functional layer 63 and the recording layer 64. The thickness of the switching layer 66 is not particularly limited, though the thickness of at least 1 nm is required for cutting without fail the exchange coupling between the functional layer 63 and the recording layer 64. The upper limit of the thickness is not particularly limited, though it is desirable for the thickness to be small in terms of cost. To be more specific, it is desirable for the upper limit in the thickness of the switching layer to be 50 nm or less, preferably 10 nm or less, and more preferably 5 nm or less.

FIGS. 14A to 14F show the recording operation of the magnetic recording medium according to the seventh embodiment of the present invention. As shown in FIGS. 14A to 14F, the switching layer 66 is interposed between the functional layer 63 and the recording layer 64. The other reference numerals shown in FIGS. 14A to 14F are equal to those shown in FIGS. 10A to 10F.

Figure 14A:
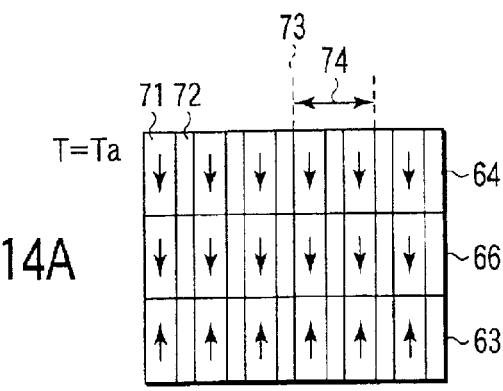
FIGS. 14A to 14F are drawings showing that magnetizations of a functional layer, a switching layer and a recording layer forming a magnetic recording medium according to a seventh embodiment of the present invention are changed depending on medium temperature.
Figure 14B:
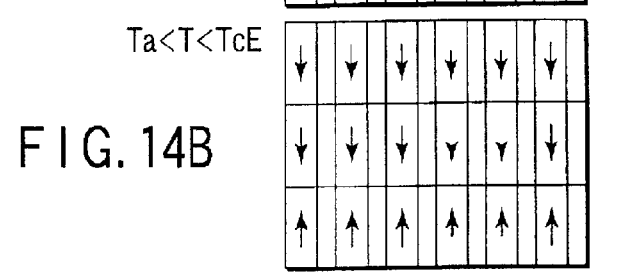
Figure 14C:
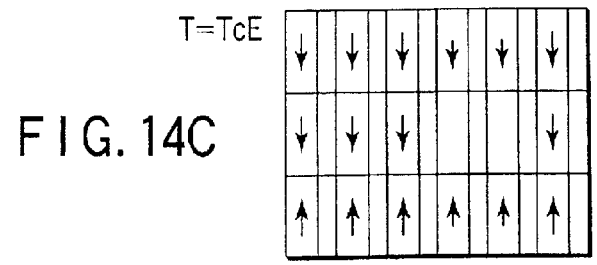
Figure 14D:
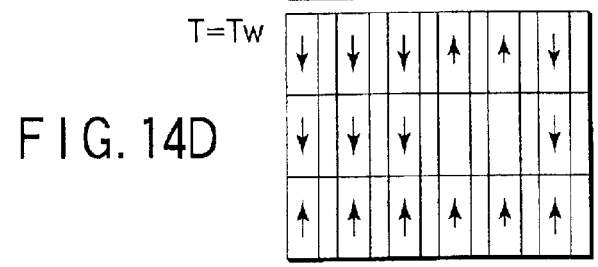
Figure 14E:
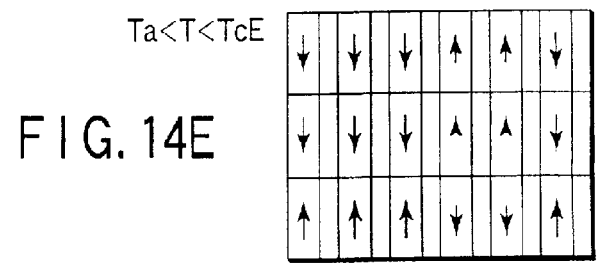
Figure 14F:
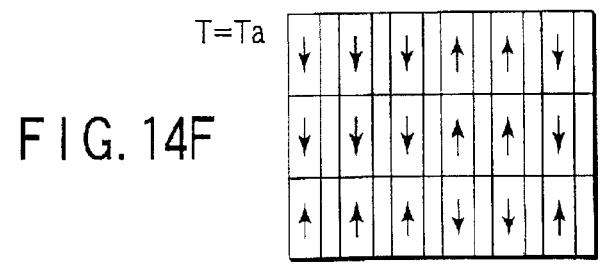

FIG. 14A denotes the state that the medium temperature T is equal to ambient temperature Ta. In this drawing, the moment of the switching layer 66 is depicted to form a ferromagnetic coupling with the recording layer 64 and to form an antiferromagnetic coupling with the functional layer 63. However, the combination of the couplings is not particularly limited. If the exchange coupling between the functional layer 63 and the recording layer 64 is maintained, the direction of the magnetic anisotropy of the switching layer 66 may be arbitrary. FIG. 14B denotes the state that the medium temperature T in the heated portion is higher than ambient temperature but is lower than the temperature TcE at which exchange coupling between the switching layer 66 and the recording layer 64 disappears. Under this state, the magnetization of any of the functional layer 63, the switching layer 66 and the recording layer 64 is lowered by the reduction of Ku. FIG. 14C denotes the state that the medium temperature T in the heated portion has reached TcB. In order to indicate that the exchange coupling between the switching layer 66 and the recording layer 64 has been erased, the drawing shows that the magnetization of the switching layer 66 has disappeared. However, it is not absolutely necessary for the magnetic moment of the switching layer 66 to disappear. For example, where the distance between the switching layer 66 and the recording layer 64 is longer than the atomic distance of the switching layer 66 (or the distance between antiferromagnetically coupled moments), the interlayer coupling between the switching layer 66 and the recording layer 64 is cut away under temperatures at which coupling between the moments within the switching layer 66 is cut away. In this case, each of the switching layer 66 and the recording layer 64 has magnetization (moment). However, exchange coupling interaction is not generated between the two. Also, there is a state that, although there is some exchange coupling interaction, the interaction is not practically generated. For example, where the recording magnetic field or the coercive force of the recording layer 64 is on the order of 100 Oe, exchange coupling force Hexg is negligible if exchange coupling force Hexg is on the order of 0.1 Oe. FIG. 14D denotes the state that the medium temperature T at the heated portion has reached the recording temperature Tw and an upward magnetic field has been applied by the recording head. The recording coercive force of the recording layer 64, which is substantially proportional to Ku, is lowered, with the result that the magnetization of the recording layer 64 is reversed upward. In this stage, the magnetization transition is formed at the position denoted by a reference numeral 73. If the functional layer 63 is not arranged, the thermal fluctuation takes place in the gradual cooling process after the passage of the laser light, with the result that the magnetization once reversed is reversed again, or the magnetization transition is decayed. However, at the time when the medium temperature T of the heated portion immediately after the recording is made lower than TcE, exchange coupling interaction between the recording layer 64 and the switching layer 66 and further the functional layer 63 is restored, as shown in FIG. 14E. At this stage, by the exchange magnetic field from the recording layer 64, the magnetization of the switching layer 66 is turned upward, and the magnetization of the functional layer 63 is turned downward. Since the volume Va of the magnetization reversal unit is rendered equal to the sum of the volumes of the recording layer 64, the switching layer 66 and the functional layer 63 at this stage, the thermal fluctuation stabilization index $KuV/k_BT$ is rapidly increased so as to make it possible to suppress the thermal fluctuation phenomenon to a low level. The position of the magnetization transition is scarcely moved even if the cooling further proceeds. FIG. 14F denotes the state after the recording. As described above, the magnetization transition is formed with resolution substantially equal to the size of the magnetic particles contained in the recording layer 64.

Figure 15:
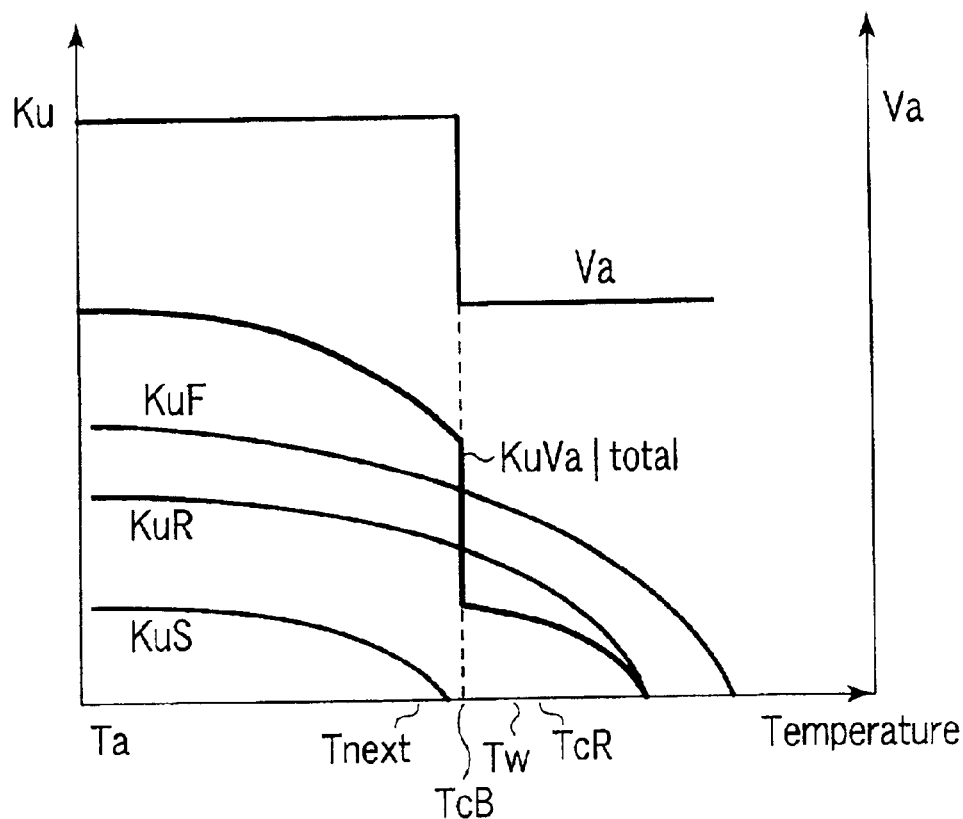
FIG. 15 is a graph showing changes with temperature in magnetic anisotropy energy Ku, activation volume Va and the product KuVa in a recording step in a magnetic recording medium according to the seventh embodiment of the present invention.

FIG. 15 is a graph schematically showing the changes with temperature in magnetic anisotropy energy density Ku and volume Va of the magnetization reversal unit in the recording process described above. In the graph of FIG. 11, KuS denotes magnetic anisotropy energy density of the switching layer, and the other reference numerals are equal to those shown in FIG. 11. As shown in the graph, Va is changed discontinuously and rapidly before and after TcE and, thus, $KuVa|^{total}$ is also changed rapidly.

The magnetic recording medium shown in FIG. 13 is more complex in the layer structure than the medium shown in FIG. 9. However, the layer structure shown in FIG. 13 is desirable because the magnetic characteristics of the functional layer 63 can be set arbitrarily so as to increase the degree of freedom in selecting the material. Also, it is possible to increase the width of change in Va, i.e., in the width of change in $KuVa|^{total}$, making it possible to achieve a thermally assisted magnetic recording of a higher stability.

By the function described above, it is possible to overcome the problems of the cross erase and the domain erasure immediately after the recording, which were the problems inherent in the thermally assisted magnetic recording. To be more specific, even if there is a temperature elevation in the track adjacent to the recording track to the extent denoted by, for example, Tnext in FIG. 15, deterioration of recording caused by the thermal fluctuation does not take place because $KuVa|^{total}$ is sufficiently large. Also, since $KuVa|^{total}$ is rapidly increased immediately after recording, it is also possible to suppress deterioration due to the thermal fluctuation after the recording.

As a result of the recording experiments in the exchange coupled two-layered film under various conditions, it has been confirmed that the particular function and effect described above can be obtained if the condition of |TcE−Tw|<100K is satisfied. Also, in order to ensure a wide margin and to allow the manufacturing conditions of the medium and the apparatus to have an allowance, it is desirable to satisfy the condition of |TcB−Tw|<50K and, more desirably, the condition of |TcB−Tw|<20K.

It is possible for the magnetic recording process described above with reference to FIG. 14 to take place in the case where the functional layer exhibits ferromagnetic properties. It should be noted, however, that, if the total magnetization of the functional layer is large, a large leakage magnetic field is generated so as to inhibit improvement in the recording density and, thus, it is undesirable for the total magnetization noted above to be large. For example, in the case of the longitudinal magnetic recording, a large diamagnetic field is generated with a large magnetization transition so as to enlarge the transition. Also, in the case of the perpendicular magnetic recording, the antimagnetic field in the central portion of the recording domain is increased so as to generate a reverse domain, with the result that the medium noise is increased.

As described above, it is known that antiferromagnetic coupling takes place between the adjacent magnetic layers in a multi-layered structure in which a plurality of magnetic layers are stacked one upon the other several nanometers apart from each other. It is possible to employ such a multi-layered film as a functional layer in the magnetic recording medium according to any of the firth to seventh embodiments of the present invention. It is possible for the magnetic layer to be a continuous film of a magnetic material or to be a composite film comprising a magnetic film and a film of another material. In the case of employing a magnetic layer having a large magnetic anisotropy, it is possible to obtain an antiferromagnetic film having a large anisotropy. On the other hand, in the case of employing a magnetic layer having a small magnetic anisotropy, obtained is an antiferromagnetic film having a small anisotropy.

Figure 10:
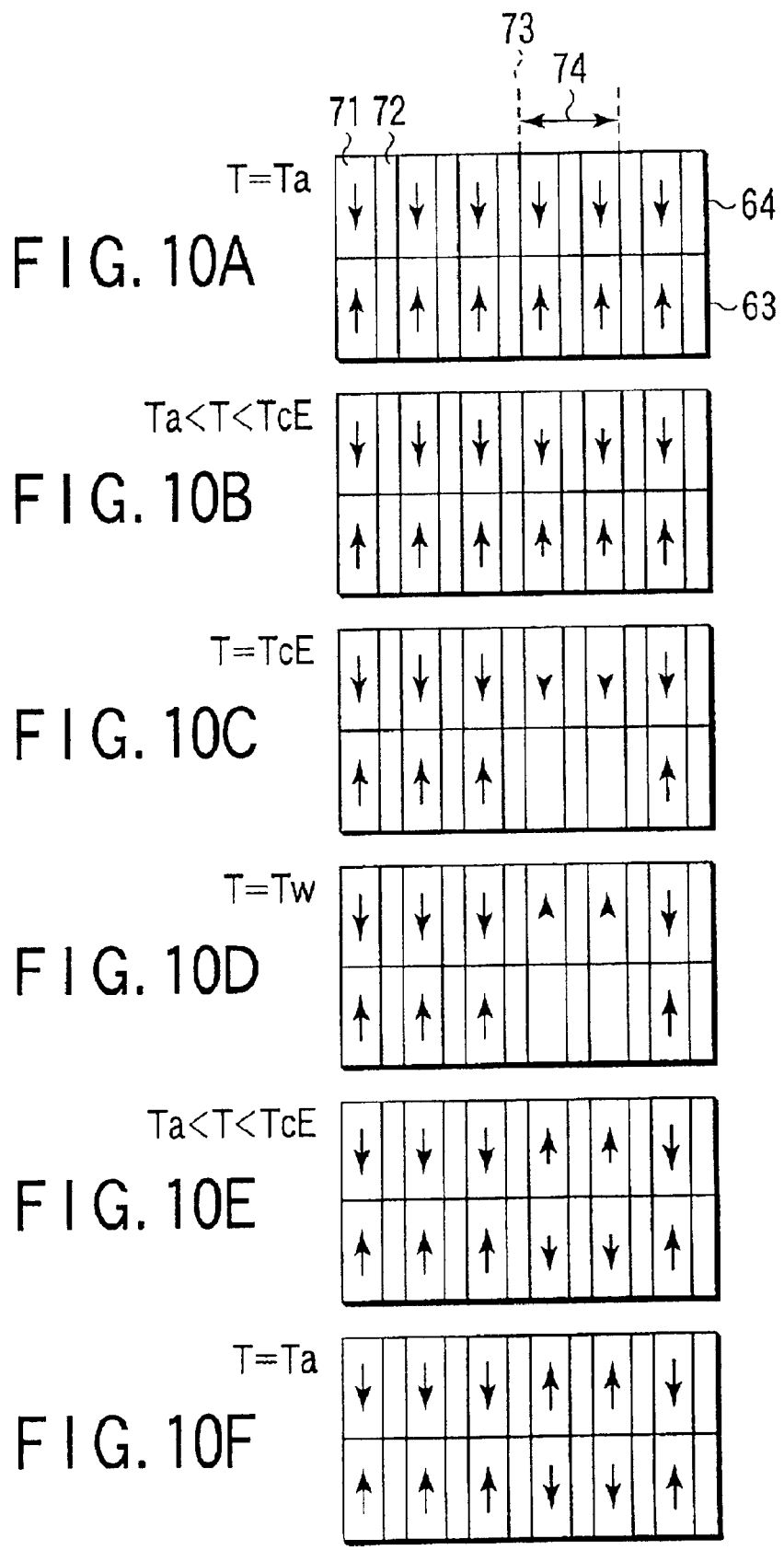
FIGS. 10A to 10F are drawings showing that magnetizations of a recording layer and a base layer forming a magnetic recording medium according to a fifth embodiment of the present invention are changed depending on medium temperature.

In the recording process described with reference to each of FIGS. 10, 12 and 14, the recording layer is reversed and, then, the functional layer is also reversed in accordance with reversal of the recording layer. It follows that it is desirable for the reversal magnetic field (coercive force) of the functional layer to be small. However, it is also possible to use the functional layer having a large magnetic anisotropy and a large anisotropic magnetic field Hk, which is substantially proportional to the coercive force Hc, by the reasons given below.

Suppose exchange coupling is formed between two layers of a layer A and a layer B. It should be noted that the reversal magnetic field $Hr_A$ of layer A and the reversal magnetic field $Hr_B$ of layer B can be represented as given below:

$$Hr_A = Hc_A - \sigma_w/2/Ms_A/t_A$$

$$Hr_B = Hc_B + \sigma_w/2/Ms_B/t_B$$

$Hr_A = Hr_B$ (where an interfacial domain wall is not formed)

where $t_A$ denotes the thickness of layer A, $Ms_A$ denotes the saturation magnetization of layer A, $Hc_A$ denotes the coercive force of layer A, $t_B$ denotes the thickness of layer B, $Ms_B$ denotes the saturation magnetization of layer B, and $\sigma_w$ denotes the interfacial domain wall energy density, and where it is assumed that the magnetic anisotropy of layer A is larger than that of layer B ($Hc_A > Hc_B$).

To be more specific, the reversal magnetic fields given above assume the values distributed between $Hc_A$ and $Hc_B$ by the ratio determined by the relationship in magnitude between $Ms_A t_A$ and $Ms_B t_B$. It follows that it is possible for even the functional film having a large anisotropy to exhibit desired properties if the value of Mws is adjusted in view of the recording layer.

The magnetic layers included in the multi-layered film are formed of Co, Ni, Fe or an alloy thereof. It is possible for these magnetic layers to be formed of the same material or different materials. The multi-layered film including magnetic layers differing from each other in the value of magnetization has as a whole the differential magnetization and exhibits ferrimagnetic properties. The thickness of the magnetic layer is not particularly limited. However, it is undesirable for the thickness to be smaller than 0.2 nm because, in this case, it is difficult to form a film. On the other hand, it is also undesirable for the thickness to exceed 100 nm because, in this case, the medium cost is increased.

The material of the nonmagnetic layer included in the multi-layered film is not particularly limited. However, it is desirable for the nonmagnetic layer to be formed of at least one material selected from the group consisting of Ru, Re, Rh, Ir, Tc, Au, Ag, Cu, Mn, Si, Cr, an alloy thereof and an oxide thereof. The thickness of the nonmagnetic layer is an important parameter deeply relating to the aspect as to whether the multi-layered film brings about antiferromagnetic coupling and to the intensity of the coupling. However, since the antiferromagnetic coupling in the multi-layered film also depends on a material, a fine structure, a state of the formed film and a state of the ferromagnetic layer, it is difficult to define clearly the suitable thickness of the nonmagnetic layer. Incidentally, if the thickness of the nonmagnetic layer is larger than 5 nm, the coupling between the adjacent magnetic layers is rendered very weak and, thus, the thickness larger than 5 nm is not practical. It is desirable for the thickness of the nonmagnetic layer to be smaller than 1 nm.

Examples of the functional layer comprising a multi-layered film will now be described with reference to FIGS. 16 to 20.

Figure 16:
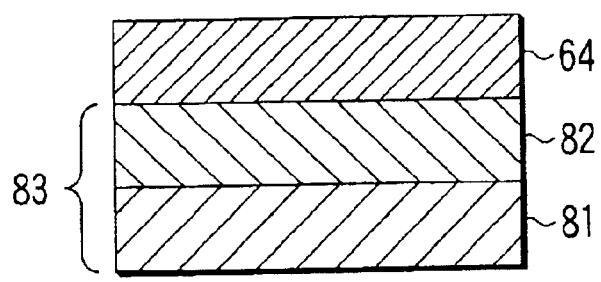
FIG. 16 is a cross sectional view showing a structure of a functional layer according to one embodiment of the present invention.

A functional layer 83 shown in FIG. 16 comprises a unit of a magnetic layer 81 and a nonmagnetic layer 82, and a recording layer 64 is formed on the functional layer 83. In the case of the structure shown in FIG. 16, it is possible to achieve a ferromagnetic coupling between the magnetic layer 81 and the recording layer 64 by suitably designing the nonmagnetic layer 82. In this case, the functional layer 83 is coupled with a part of the recording layer 64 so as to exhibit ferrimagnetic properties.

Figure 17:
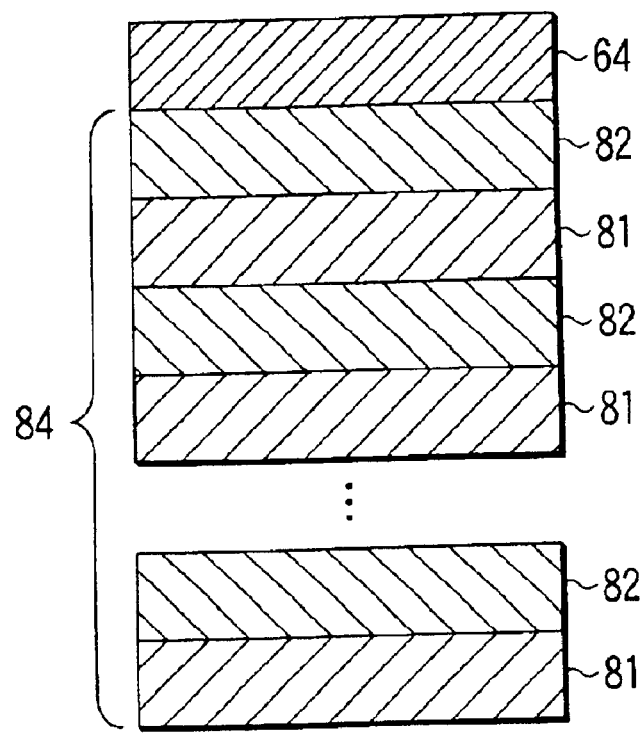
FIG. 17 is a cross sectional view showing a structure of a functional layer according to another embodiment of the present invention.

A functional layer 84 shown in FIG. 17 comprises a unit of a magnetic layer 81 and a nonmagnetic layer 82, the unit corresponding to the functional layer 83 shown in FIG. 16, and the particular unit is repeatedly stacked several times. Also, a recording layer 64 is formed on the functional layer 84. In the case of the structure shown in FIG. 17, it is possible to regard the functional layer 84 itself, which is prepared by laminating several times the unit of the magnetic layer 81 and the nonmagnetic layer 82, as an antiferromagnetic or ferrimagnetic material. The number of times of lamination of the unit of the magnetic layer 81 and the nonmagnetic layer 82 is not particularly limited. However, the number of times of lamination exceeding 30 simply results in an increased manufacturing cost.

Figure 18:
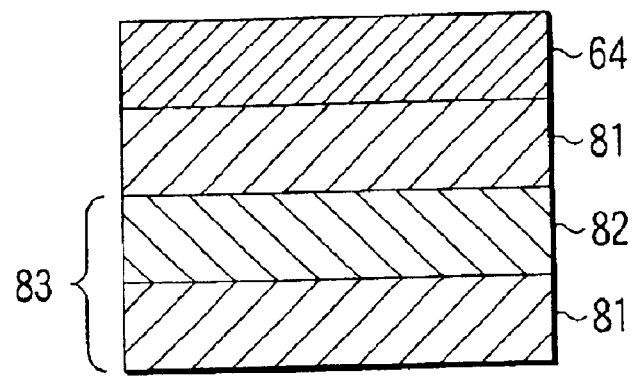
FIG. 18 is a cross sectional view showing a structure of a functional layer according to another embodiment of the present invention.

A functional layer 83 shown in FIG. 18 comprises a single lamination unit of a magnetic layer 81 and a nonmagnetic layer 82. Also, a recording layer 64 is formed on the functional layer 83 with a magnetic layer 82 equal to that included in the lamination unit noted above interposed therebetween. In the case of the structure shown in FIG. 18, a ferromagnetic coupling is formed between the recording layer 64 and the magnetic layer 81 contiguous to the recording layer 64. It follows that the particular magnetic layer 81 can be regarded as a part of the recording layer 64. In this case, the coupling between the functional layer 83 and the recording layer 64 is provided by the coupling between the magnetic layers 81 forming the lamination unit. It follows that the number of layers is increased, compared with the structure shown in FIG. 16. However, the structure shown in FIG. 18 is advantageous in that the design and the manufacturing conditions are rendered easier than those for the structure shown in FIG. 16.

Figure 19:
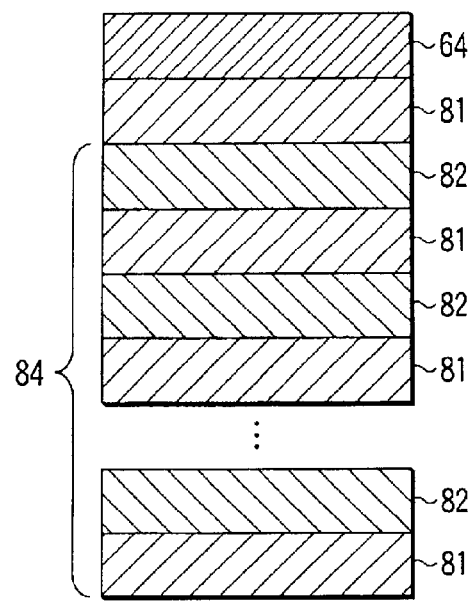
FIG. 19 is a cross sectional view showing a structure of a functional layer according to another embodiment of the present invention.

A functional layer 84 shown in FIG. 19 is prepared by laminating several times the lamination unit of a magnetic layer 81 and a nonmagnetic layer 82, and a recording layer 64 is formed on the functional layer 84 with an additional magnetic layer 81 interposed therebetween. The conditions that should be satisfied by the functional layer 84 in the structure shown in FIG. 19 are equal to those in the structure shown in FIG. 17.

Figure 20:
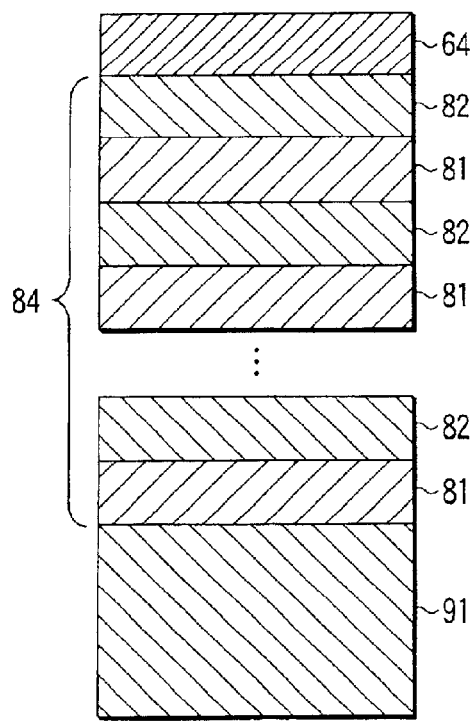
FIG. 20 is a cross sectional view showing a structure of a functional layer according to still another embodiment of the present invention.

Further, a functional layer shown in FIG. 20 comprises a first functional layer 84 prepared by laminating several times the lamination unit of a magnetic layer 81 and a nonmagnetic layer 82 and a second functional layer 91 comprising an antiferromagnetic material or a ferrimagnetic material. The first functional layer 84 and the second functional layer 91 are stacked one upon the other in a manner to exert exchange coupling at ambient temperature. FIG. 20 shows that the second functional layer 91, the first functional layer 84 and the recording layer 64 are formed in the order mentioned. Alternatively, it is possible to form the first functional layer 84, the second functional layer 91 and the recording layer 64 in the order mentioned.

As described above, it is conceivable to use a magnetic layer having a large anisotropy in the case where it is desired to increase the magnetic anisotropy energy in the functional layer formed of a multi-layered film. In addition, it is also possible to utilize the exchange coupling with the second functional layer 91 formed of an antiferromagnetic material as shown in FIG. 20. The conditions that should be satisfied by the antiferromagnetic body forming the second functional layer 91 are equal to those described previously in conjunction with the functional layer. For example, an antiferromagnetic material such as NiO has an anisotropy in the direction of the crystal axis. It follows that, if it is possible to orient the crystal axis in an arbitrary direction, it is possible to obtain a functional layer having an axis of anisotropy in the particular direction.

In the magnetic recording medium for performing thermally assisted magnetic recording according to each of the embodiments of the present invention described above, a magnetic field is applied under the condition that the distance between the magnetic recording medium and the magnetic head applying a magnetic field to the magnetic recording medium is smaller than 100 nm. The magnetic recording medium of the present invention is advantageous over the conventional HDD apparatus in the case where it is intended to obtain a high linear density, e.g., a recording density of 100 Gb/in$^2$. In order to obtain resolution at such a recording density, it is desirable for the distance from the recording medium to be smaller than 100 nm, preferably not larger than 50 nm, and most preferably not larger than 30 nm.

Let us describe a magnetic recording medium according to an eighth embodiment of the present invention and a magnetic recording apparatus using the particular medium.

The magnetic recording medium according to the eighth embodiment of the present invention comprises at least a nonmagnetic substrate, a functional layer comprising a magnetic material, and a recording layer formed on the functional layer and comprising magnetic particles and a nonmagnetic wall buried between the magnetic particles.

Note that the recording layer may have a multi-layered structure comprising a magnetic layer and a nonmagnetic layer that are stacked one upon the other, the nonmagnetic layer containing at least one element selected from the group consisting of Pt and Pd and having a thickness not larger than 2 nm.

Figure 21:
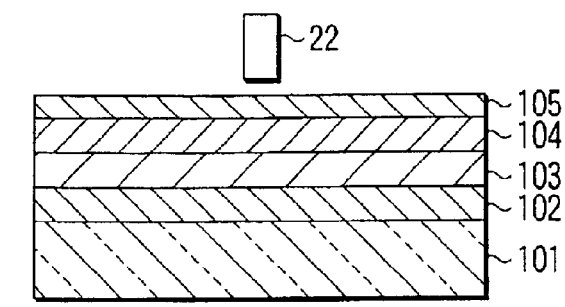
FIG. 21 is a drawing schematically showing a magnetic recording medium according to another embodiment of the present invention.

FIG. 21 shows the magnetic recording medium according to the eighth embodiment of the present invention and a magnetic field applying means. The magnetic recording medium shown in FIG. 21 comprises a substrate 101. An underlayer 102, a functional layer 103 comprising a magnetic material, a recording layer 104 and a protective layer 105 are formed on the substrate 101 in the order mentioned. A recording head 22 acting as a magnetic field applying means is arranged over the magnetic recording medium.

The functional layer 103 and the recording layer 104 are stacked one upon the other in a manner to exert a ferromagnetic exchange interaction under the environment of use. Also, the magnetic anisotropy energy density $Ku_{RL}$ of the recording layer 104 is not lower than $5 \times 10^6$ erg/cc and is higher than the magnetic anisotropy energy density KuFL of the functional layer 103.

It is possible for the functional layer 103 to exhibit any of the ferromagnetic properties, the antiferromagnetic properties and the ferrimagnetic properties. It is also possible for the magnetic anisotropy of the functional layer 63 to be any of the longitudinal magnetic anisotropy, the perpendicular magnetic anisotropy and a mixture of both the longitudinal magnetic anisotropy and the perpendicular magnetic anisotropy. The thickness of the functional layer 103 is not particular limited. However, it is not desirable for the thickness to exceed 1000 nm because, if the thickness exceeds 1000 nm, deterioration of the characteristics and peeling of the film tend to be generated easily by the film stress. It is also undesirable for the thickness of the functional layer 103 to be smaller than 0.1 nm because, if the thickness is smaller than 0.1 nm, it is substantially impossible to form a film.

For forming the functional layer exhibiting the ferromagnetic properties, it is possible to use the materials equal to those used for forming the recording layer. It should be noted, however, that, where the functional layer is not utilized for the recording of information, it is possible for the magnitudes of the magnetic anisotropy and the magnetization for the functional layer to be smaller than those for the recording layer, leading to a broader range of selection of the materials. Also, it is possible for the functional layer exhibiting the ferromagnetic properties to be of the structure in which magnetic particles are dispersed in a nonmagnetic material.

It is possible to use a thin film of an antiferromagnetic material having the Neel temperature higher than ambient temperature as the functional layer exhibiting the antiferromagnetic properties. It is possible to use a thin film of a ferrimagnetic material as a functional layer exhibiting the ferrimagnetic properties. It is also possible to use a multi-layered film exhibiting the antiferromagnetic properties or the ferrimagnetic properties as a functional layer. For forming the functional layer exhibiting the antiferromagnetic or ferrimagnetic properties, it is possible to use the materials similar to those described previously in conjunction with the functional layer 63 included in the magnetic recording medium according to the fifth embodiment of the present invention, which is shown in FIG. 9.

In the magnetic recording medium according to the eighth embodiment of the present invention, the functional layer 103 and the recording layer 104 are stacked one upon the other in a manner to exert a ferromagnetic exchange interaction under the environment of use. For forming the functional layer 103 and the recording layer 104 in a manner to exert an exchange coupling interaction, employed is a method of consecutively forming these layers without breaking vacuum in the general medium manufacturing process utilizing, for example, a sputtering method.

It is possible for a substantially nonmagnetic layer to be present between the functional layer and the recording layer if the thickness of the nonmagnetic layer is not lager than 5 nm. The term "substantially nonmagnetic material" noted above implies a material that exhibits nonmagnetic properties when present independently and does not exhibit the properties that magnetic properties are induced in the interface or within the film when the film is stacked on a magnetic layer. The substantially nonmagnetic material includes, for example, Cr, Mn, Pd and Pt. Where the layer interposed between the functional layer and the recording layer is not a substantially nonmagnetic layer, the interposed layer is not particularly limited as far as the ferromagnetic exchange interaction brings about the function of the present invention. It is also possible to control the exchange coupling force by interposing another magnetic layer between the functional layer and the recording layer. It follows that it is possible for a plurality of magnetic layers and nonmagnetic layers to be present between the functional layer and the recording layer. The clearance between the functional layer and the recording layer need not be in the form of a film. It is possible for the clearance in question to be a defect, a void, an oxide film/particles formed partially or a surface modified portion.

The magnetic recording medium according to the eighth embodiment of the present invention will now be described more in detail.

Figure 22:
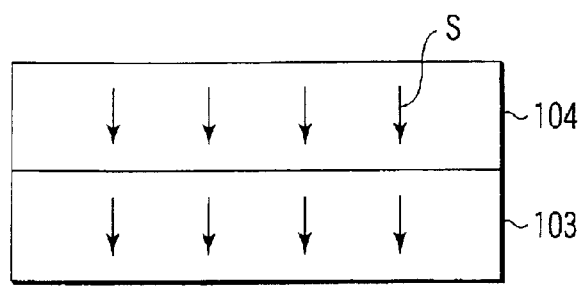
FIG. 22 is a drawing showing the functional layer and the recording layer included in the magnetic recording medium shown in FIG. 21.

FIG. 22 schematically shows the direction of the moment (spin) S in respect of the functional layer 103 and the recording layer 104 shown in FIG. 21. For facilitating the description, the following description covers the case where each of these functional layer 103 and recording layer 104 is a perpendicular magnetization film. The ferromagnetic exchange coupling interaction denotes the exchange coupling interaction in which the energy is rendered lowest and stable when the directions of the spins are the same as shown in FIG. 23.

Extensive researches have already been made in respect of the magnetization reversal (hysteresis loop) of an exchange coupled two-layered film as shown in FIG. 22. For example, the magnetization reversal is analyzed in respect of the exchange coupled two-layered perpendicular magnetization film. This literature teaches that the shape of the hysteresis loop is changed in accordance with the exchange coupled energy area density σ and the magnetic characteristics of each layer.

Figure 23:
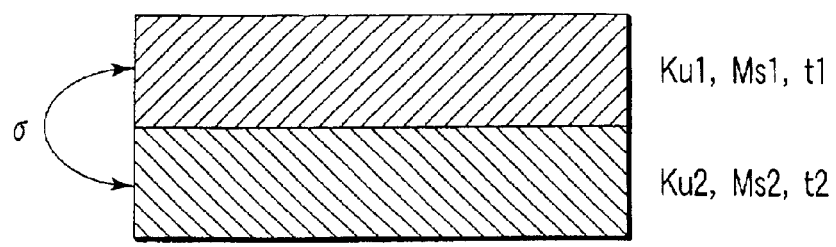
FIG. 23 is a drawing schematically showing an exchange coupled two-layered film.

Let us consider the exchange coupled two-layered film of two layers (layer 1 and layer 2) shown in FIG. 23. Magnetic anisotropy energy density, saturation magnetization and a film thickness are given by $Ku_1$, $Ms_1$, $t_1$ for layer 1, and by $Ku_2$, $Ms_2$, $t_2$ for layer 2, respectively. In the magnetic recording medium according to each of the eighth embodiment of the present invention, $Ku_1$ is larger than $Ku_2$ ($Ku_1 > Ku_2$).

If the values of Ms for these two layers are assumed to be the same, the coercive force Hc (=2Ku·Ms) for layer 1 is larger than that for layer 2. In this case, the exchange coupling energy performs the function of aligning the spins of these two layers. The function is equivalent to the case where an exchange magnetic field Hw (=σ/2Mst) is applied to each layer. If Hc of each layer is larger than Hw, the spins of both layers are allowed to oppose each other so as to generate a stable state in energy (metastable condition).

Figure 24:
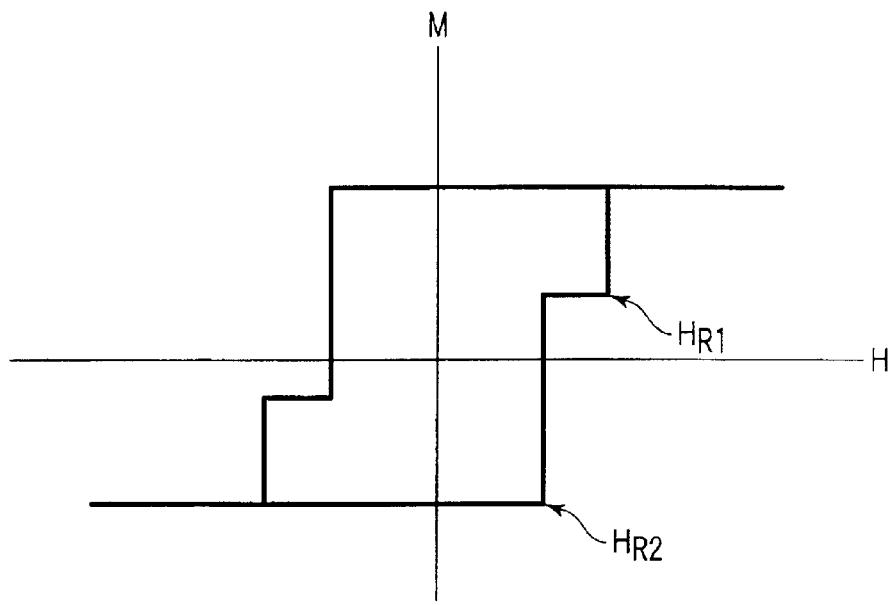
FIG. 24 is a drawing showing an example of hysteresis loop of the exchange coupled two-layered film.

Such a medium exhibits a hysteresis loop as shown in FIG. 24. Where a hysteresis loop as shown in FIG. 24 is obtained, changing points $H_{R1}$ and $H_{R2}$ of the magnetization can be analytically obtained in accordance with formulas (1) and (2) given below, according to the theory of the exchange coupled two-layered film disclosed in the literature quoted above:

$$H_{R1}=Hc_1-Hw_1=Hc_1-\sigma/2Ms_1t_1 \quad (1)$$

$$H_{R2}=Hc_2+Hw_2=Hc_2+\sigma/2Ms_2t_2 \quad (2)$$

In other words, the layer 1 having a large coercive force receives the function of lowering the coercive force from the layer 2 having a small coercive force via σ.

Figure 25:
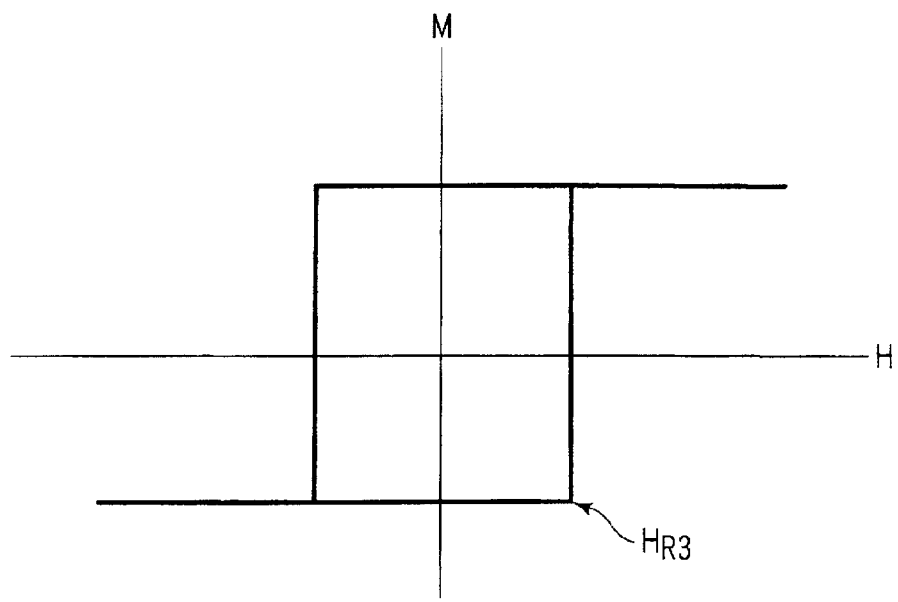
FIG. 25 is a drawing showing another example of hysteresis loop of the exchange coupled two-layered film.

On the other hand, where $Hc_1$ is smaller than $Hw_1$, i.e., $Hc_1 < Hw_1$, the layer 1 is also reversed together with the layer 2 when the layer 2 is subjected to the magnetization reversal by the magnetic field corresponding to $H_{R2}$ shown in FIG. 24 because the exchange force is large. Such a medium exhibits a hysteresis loop as shown in FIG. 25 like the ordinary single layer film. The reversal magnetic field $H_{R3}$ in this case is obtained by formula (3) given below:

$$H_{R3}=(Ms_2t_2Hc_2+Ms_1t_1Hc_1)/(Ms_2t_2+Ms_1t_1) \quad (3)$$

The reversal magnetic field $H_{R3}$ has a value intermediate between $Hc_1$ and $Hc_2$. In other words, the coercive force of the two-layered film in which a layer having a high Ku and another layer having a low Ku are subjected to a ferromagnetic exchange coupling is smaller than the coercive force of a single film.

The present inventors have found it possible to lower the coercive force to a level at which recording can be performed by the magnetic head widely used nowadays by subjecting a layer of a high Ku, which has a high resistance to thermal fluctuation, and a layer of a low Ku to a ferromagnetic exchange coupling by utilizing the theory noted above. Incidentally, the theory itself is known to the art. However, the idea of applying the theory to the problem of the thermal fluctuation of the magnetic recording medium was unknown. It should be noted, however, in view of the conventional common idea of the magnetic recording medium, it was expected that, if the total coercive force of the exchange coupled two-layered film is lowered, the magnetic anisotropy energy coping with the thermal fluctuation would also be lowered.

On the other hand, the present inventors have found through extensive research that, in the exchange coupled two-layered film, the magnetic anisotropy energy as the resistance to the thermal fluctuation, i.e., the physical amount represented by KuV in the single layer magnetic film, is not lowered but is increased. It has also been found that the particular effect is further increased under, particularly, the situation that the layer 1 and the layer 2 are reversed simultaneously, arriving at the present invention. This point will now be described more in detail.

Figure 26:
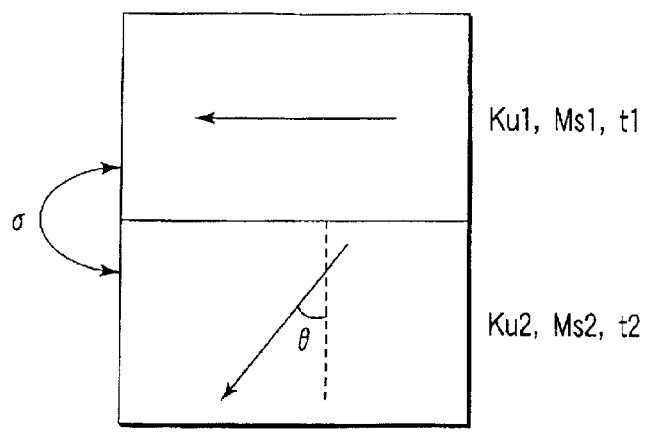
FIG. 26 is a drawing showing physical amounts used for energy calculation of each layer in the exchange coupled two-layered film.

Let us consider the energy potential in the layer 1 included in the exchange coupled two-layered film shown in FIG. 23. In this case, a perpendicular magnetization film is assumed. The depth of the energy potential corresponds to the energy with which the magnetic recording medium including the layer 1 as a recording medium copes with the thermal fluctuation energy $k_BT$. At the bottom of the valley of the energy potential, the layer 1 is immediately before the reversal and its energy is in the highest state. In this case, the spin of the layer 1 alone is directed to the surface of the film by the external force as shown in FIG. 26. If the spin of the layer 1 is directed toward the film surface, the spin of the layer 2 is rotated by an angle θ by the exchange coupling. The angle θ can be obtained as follows.

Specifically, the total energy (area density) $\sigma_2$ of the layer 2 is represented by formula (4) given below:

$$\sigma_2 = t_2 K u_2 \sin^2 \theta - \sigma \cos(90-\theta) \quad (4)$$

The value of θ that minimizes $\sigma_2$ is obtained. If the formula $d\sigma_2/d\theta$ is resolved:

$$\sin \theta = \sigma/(2t_2 K u_2), \text{ where } \sigma/(2t_2 K u_2) < 1, \text{ or}$$

$$\theta = 90°, \text{ where } \sigma/(2t_2 K u_2) > 1$$

It follows that where $\sigma/(2t_2 K u_2) < 1$, the total energy of the layer 2 is:

$$\sigma_2 = -\sigma^2/(4t_2 K u_2) \quad (5)$$

On the other hand, under the lowest energy state shown in FIG. 22, the total energy of the layer 2 can be obtained by substituting θ=0 in formula (4) as follows:

$$\sigma_2 = -\sigma \quad (6)$$

The value of (5)–(6) is the potential required for the transition from the state shown in FIG. 22 to the state shown in FIG. 26. It follows that the potential of the layer 2 can be represented as follows:

$$\sigma - \sigma^2/(4t_2 K u_2) \quad (7)$$

The potential $\sigma_{ECDL}$ of the entire two-layered film is the sum of formula (7) and the potential $t_1 K u_1$ due to the magnetic anisotropy energy of the layer 1 and, thus:

$$\sigma_{ECDL} = t_1 K u_1 + \sigma - \sigma^2/(4t_2 K u_2) \quad (8)$$

On the other hand, where $\sigma/(2t_2 K u_2) > 1$, the potential of the entire two-layered film can be obtained by substituting θ=90° as follows:

$$\sigma_{ECDL} = t_1 K u_1 + t_2 K u_2 \quad (9)$$

In the magnetic recording medium, the magnetic film is formed of columnar magnetic particles extending in the thickness direction of the film. In this case, the energy area density noted above can be converted into the energy amount if multiplied by the bottom area s. In other words, $\sigma_{ECDL} \times s$ is a physical amount resisting to the thermal fluctuation energy.

It follows that, where both layer 1 and layer 2 are simultaneously reversed, $Ku_1 V_1 + Ku_2 V_2$, i.e., the sum of KuV of the two layers, provides the resistance to the thermal fluctuation. Also, in a medium exhibiting a two stage hysteresis loop as shown in FIG. 24, the value of $Ku_1 V_1 + (\sigma - \sigma^2/(4t_2 Ku_2))s$ provides a resistance to the thermal fluctuation. In any case, the energy amount is larger than $Ku_1 V_1$, supporting that the resistance to the thermal fluctuation is improved in the exchange coupled two-layered film. It is also apparent that, where the layer 1 and the layer 2 are simultaneously reversed, the resistance to the thermal fluctuation is further improved. The idea given above was quite unknown in the past and has been clarified for the first time by the present inventors.

In the magnetic recording medium according to the eighth embodiment of the present invention, used is a recording layer having magnetic anisotropy energy density $Ku_{RL}$ of at least $5 \times 10^6$ erg/cc, and the particular recording layer is subjected to a ferromagnetic exchange coupling with a functional layer having magnetic anisotropy energy density $Ku_{FL}$ smaller than $Ku_{RL}$. Although the recording layer having high magnetic anisotropy energy density $Ku_{RL}$ as noted above has sufficient resistance to thermal fluctuation, it is difficult to achieve recording with the magnetic head widely used nowadays, where the recording layer is used as a single layer. However, when the recording layer is combined with the functional layer to provide a ferromagnetically exchange coupled two-layered film, it is possible to lower coercive force of the entire structure so as to obtain a magnetic recording medium capable of recording with the magnetic head widely used nowadays. It should be noted that, if $Ku_{FL}$ of the functional layer is larger than $Ku_{RL}$ of the recording layer, the coercive force of the entire structure is not lowered, making it impossible to achieve recording with the magnetic head widely used nowadays.

The difference between $Ku_{FL}$ and $Ku_{RL}$ is not particularly limited. If the difference between the two is small, the entire Hc reducing effect is small. However, a large value of KuV can be obtained even if the thickness of the functional layer is decreased. On the other hand, if the difference between the two is large, it is certainly possible to obtain a large effect of suppressing Hc. However, it is difficult to obtain the condition of the simultaneous reversal unless the thickness of the functional layer is increased. It follows that the difference between $KU_{FL}$ and $Ku_{RL}$ is determined in accordance with the system using the medium. In the general use of the medium, it is desirable for the difference between $Ku_{FL}$ and $Ku_{RL}$ to be at least 3, preferably at least 5, and most preferably at least 10.

In the magnetic recording medium according to the eighth embodiment of the present invention, the recording layer is constructed such that fine magnetic particles are separated from each other by a nonmagnetic material, and a high-density recording is made possible by preventing the magnetic particles from exerting the exchange coupling each other. On the other hand, the type of the functional layer is not particularly limited. Where the functional layer has a multi-grain structure of the morphology equal to that of the recording layer, it is possible to achieve the recording by using the functional layer as a part of the recording layer, leading to a merit that it is possible to obtain a large output. It is also possible to obtain a merit that the crystallinity and the fine structure of the recording layer can be controlled easily in forming the underlayer, the functional layer and the recording layer.

The domain wall is formed in the functional layer, a magnetic discontinuity is generated in the interface between the functional layer and the recording layer, or a domain wall is formed at the interface between the functional layer and the recording layer in the case where the functional layer has a multi-grain structure, but the size of the magnetic particles is smaller than that for the recording layer, where the functional layer has a multi-grain structure, but the distance between the adjacent magnetic particles is not large enough to completely shield the exchange coupling, or where the functional layer forms a magnetically continuous magnetic thin film within a plane. In this case, the magnetic stability (resistance to thermal fluctuation) is decreased. It should be noted, however, that the degree of decrease in the resistance to the thermal fluctuation is dependent on Ku of the functional layer. Since Ku of the recording layer is several times to about 10 times as much as Ku of the functional layer, the influence of Ku of the functional layer is small in the entire magnetic recording medium. By contraries, it is possible to obtain a merit that the effect of increasing the activation volume V of the recording layer is increased by the structural continuity of the functional layer and the recording layer. It follows that the fine structure of the functional layer is determined depending on the requirements of the system using the medium.

The coercive force of the exchange coupled two-layered film was studied by simulation. The result of the simulation will now be described. Formulas (1) to (3) given previously are approximate formulas in which the inclination of the moment in each layer is not taken into consideration. Also, formula (4) is directed to the difference in energy between the value before the reversal and the value after the reversal and represents an approximate formula covering the case where the exchange coupling energy is infinitely large. For obtaining a practical resolution, it is reasonable to employ the so-called "Energy Minimum" method, in which the moments of the recording layer and the functional layer are slightly rotated independently so as to find the condition under which the energy is most stabilized.

The magnetic recording medium constructed as shown in FIG. 21 was used as the object of the simulation. Where a ferromagnetic exchange coupling is formed between the recording layer and the function layer and, for example, each of the recording layer and the functional layer is a perpendicular magnetization film, the direction of the spin for each layer is as shown in FIG. 22. The reversal magnetic field was calculated by adding a magnetic field in the reversal direction to the ferromagnetically exchange coupled two-layered film and by performing the calculation to minimize the energy, with the result as shown in a graph of FIG. 27.

Figure 27:
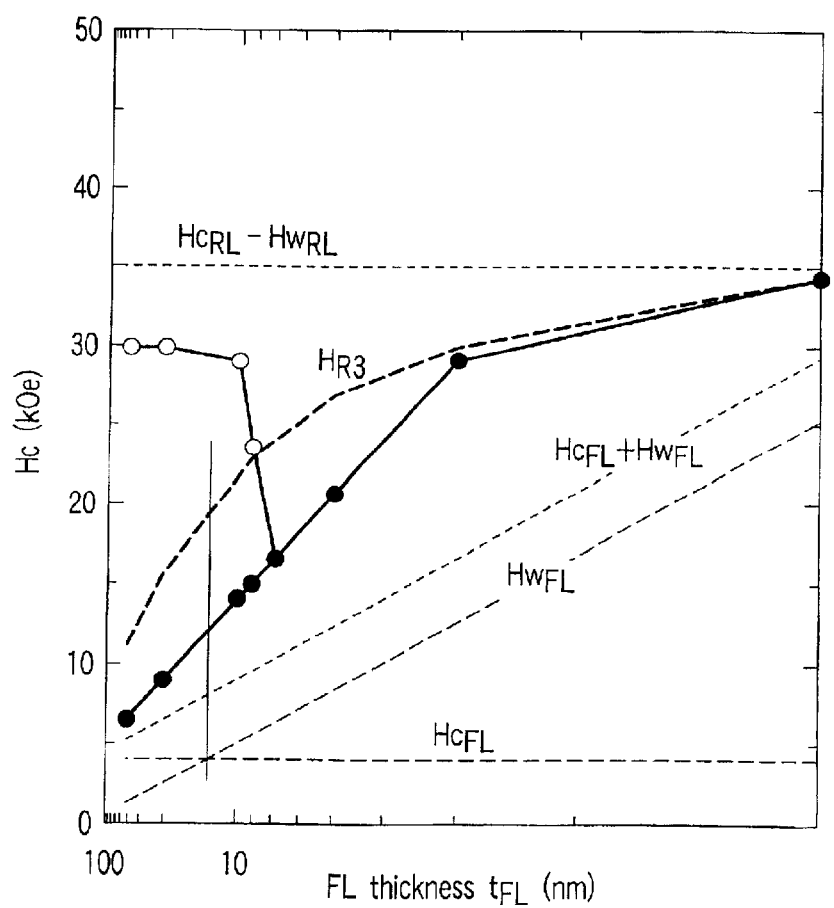
FIG. 27 is a drawing showing a result of calculation of inversion magnetic field of the exchange coupled two-layered film.

In the graph of FIG. 27, the upper limit of Hc is represented by a broken line of $Hc_{RL}-Hw_{RL}$, and the lower limit of Hc is represented by a broken line of $Hc_{FL}+Hw_{FL}$, $Ku_{RL}$ denotes Ku of the recording layer, $Ku_{FL}$ denotes Ku of the functional layer, $Hc_{RL}$ denotes Hc of the recording layer, $Hc_{FL}$ denotes Hc of the functional layer, $Hw_{RL}$ denotes the exchange magnetic field felt by the recording layer, $Hw_{FL}$ denotes the exchange magnetic field felt by the functional layer, σ denotes the exchange coupling energy (area density order), $H_{R3}$ denotes the reversal magnetic field calculated by formula (3), $t_{RL}$ denotes the thickness of the recording layer, and $t_{FL}$ denotes the thickness of the functional layer. The parameters used for the calculation are: $Ku_{RL}$: $10^7$ erg/cc; $Ku_{FL}$: $10^6$ erg/cc; $t_{RL}$: 10 nm; Ms of the recording layer ($Ms_{RL}$): 500 emu/cc; Ms of the functional layer ($Ms_{FL}$): 500 emu/cc (and, thus, $Hc_{RL}$ is 40 kOe and $Hc_{FL}$ is 4 kOe); and σ: 5 erg/cm².

In the graph of FIG. 27, the open circle symbols denote the reversal magnetic field in the portion of the recording layer, and the filled circle symbols denote the reversal magnetic field in the portion of the functional layer. Also, the region in which the open circle and the filled circle overlap each other implies that the two layers were reversed simultaneously.

As apparent from FIG. 27, the exchange coupled two-layered film can be reversed with a magnetic field smaller than the reversal magnetic field $H_{R3}$ obtained by formula (3), which is an effect that cannot be expected from the conventional theory. In the conventional theory, the two-stage loop separated into $Hc_{RL}-Hw_{RL}$ and $Hc_{RL}+Hw_{RL}$ are exhibited under a large $t_{FL}$. It is expected that, when $t_{FL}$ is decreased to reach the film thickness of $Hc_{RL}=Hw_{RL}$ denoted by a vertical solid line in the graph, the curve of the reversal magnetic field $H_{R3}$ is obtained. However, the result of the simulation differed from the estimation given above, and the situation was transferred to the simultaneous reversal in the region where $t_{FL}$ is thicker than $Hc_{RL}=Hw_{RL}$. Also, the transfer from the two-stage loop into the simultaneous reversal is moderate. It is considered reasonable to understand that the energy is moderated by the tilt of the moment of each layer. Such a behavior has been clarified for the first time by the simulation. FIG. 27 shows that the coercive force of the exchange coupled two-layered film is decreased to about 16 kOe in spite of the fact that the recording layer has a high value of Ku, i.e., $10^7$ erg/cc (coercive force of 40 koe).

Further, the similar calculations were performed by changing the magnetic characteristics of each layer, with the results as shown in FIGS. 28 to 33. In these drawings too, the upper limit of Hc is represented by a broken line of $Hc_{RL}-Hw_{RL}$, and the lower limit of Hc is represented by a broken line of $Hc_{FL}+Hw_{FL}$.

FIG. 28 covers the case where the saturation magnetization of the functional layer was changed. As apparent from FIG. 28, if the saturation magnetization of the functional layer is increased, it is possible to decrease the thickness of the functional layer capable of obtaining the effect of decreasing the coercive force and to further decrease the coercive force. It should be noted, however, that the diamagnetic field is increased with increase in the saturation magnetization, giving rise the problems that the recording resolution is lowered in the case of the longitudinal magnetic recording medium and that the domain of the opposite direction is formed so as to increase the noise in the case of the perpendicular magnetic recording medium. It follows that the suitable value of the saturation magnetization of the functional layer is determined depending on the requirements of the system.

FIG. 29 shows the result covering the case where the saturation magnetization of the recording layer was changed. As apparent from FIG. 29, the effect of decreasing the coercive force is increased with increase in the saturation magnetization of the recording layer. It should be noted, however, that the thickness of the functional layer capable of obtaining the effect of decreasing the coercive force is increased, leading to the problem of a high manufacturing cost. It follows that the suitable value of the saturation magnetization of the recording layer is determined depending on the requirements of the system.

Figure 30:
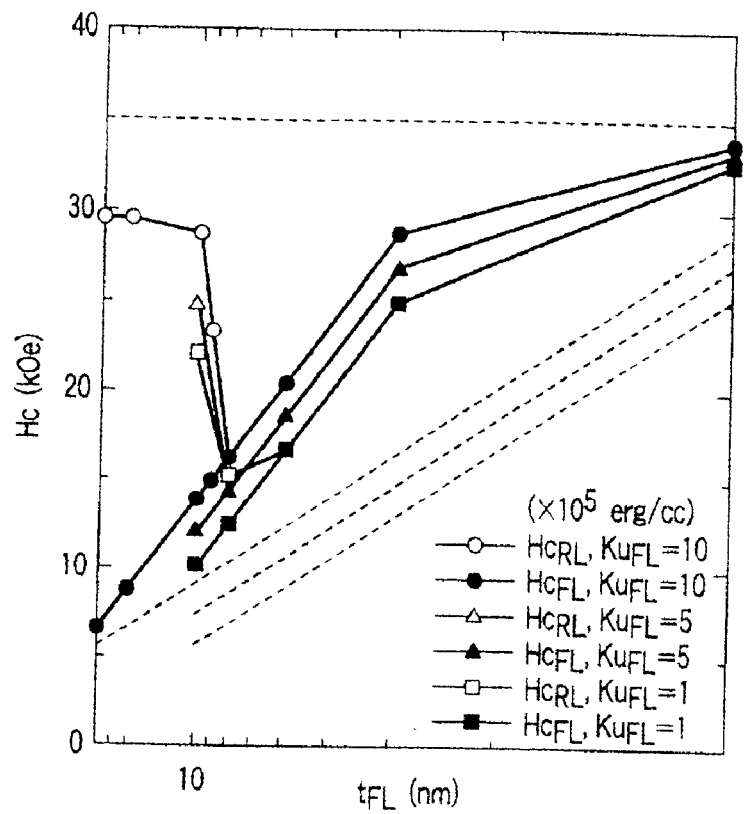
FIG. 30 is a drawing showing a result of calculation of inversion magnetic field of the exchange coupled two-layered film.

FIG. 30 shows the result covering the case where the magnetic anisotropy energy of the functional layer was changed. As apparent from FIG. 30, the effect of decreasing the coercive force is increased with increase in the magnetic anisotropy energy density of the functional layer. It is apparent that the thickness of the functional layer capable of obtaining the effect of decreasing the coercive force not to be changed significantly. It should be noted, however, that, since the thermal fluctuation resistance KuV of the entire system is not appreciably increased, a problem is generated that the degree of improvement in the resistance to the thermal fluctuation is small. It follows that the suitable value of the magnetic anisotropy energy of the function layer is determined depending on the requirements of the system.

Figure 31:
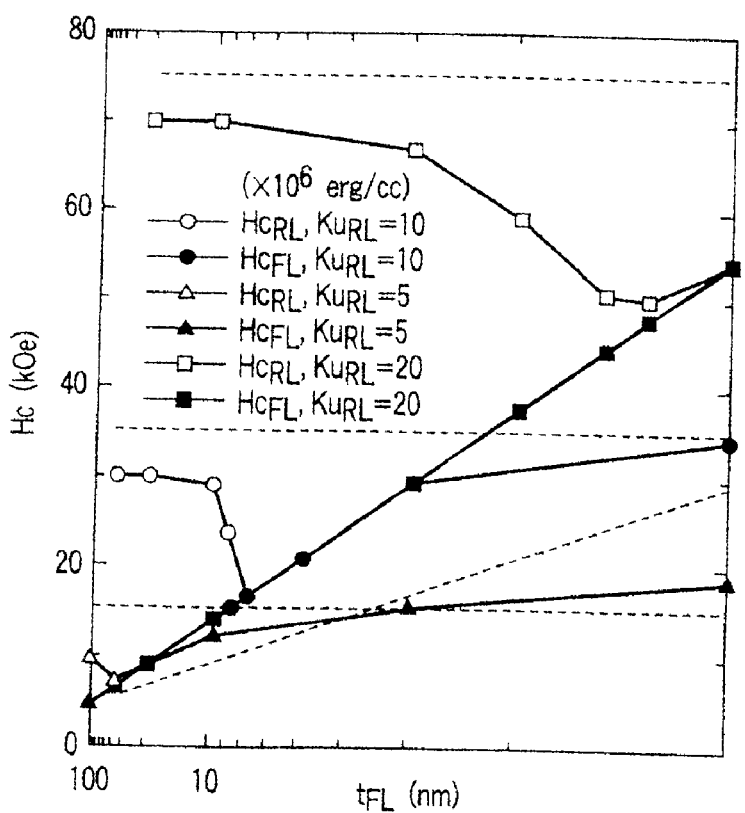
FIG. 31 is a drawing showing a result of calculation of inversion magnetic field of the exchange coupled two-layered film.

FIG. 31 shows the result, covering the case where the magnetic anisotropy energy density of the recording layer was changed. As apparent from FIG. 31, the coercive force is lowered regardless of the magnetic anisotropy energy of the magnetic layer. Therefore, it is possible to select the recording layer having the largest value of Ku and having a high thermal stability in view of the specified values required by the system. It is also possible to obtain the merit that the thickness of the functional layer capable of obtaining the effect of decreasing the coercive force can be diminished with increase in the magnetic anisotropy energy density of the recording layer. It should be noted, however, that, since the coercive force is increased as a whole, it is impossible to increase Ku of the recording layer limitlessly. It follows that the suitable value of the magnetic anisotropy energy density of the recording layer is determined depending on the requirements of the system.

FIG. 32 shows the result, covering the case where the exchange coupling energy area density was changed. As apparent from FIG. 32, the effect of decreasing the coercive force is increased with increase in the exchange coupling energy area density. It should be noted, however, that, since the thickness of the functional layer capable of obtaining the effect of decreasing the coercive force is increased, a problem is generated that the manufacturing cost is increased. It follows that the suitable value of the exchange coupling energy area density is determined depending on the requirements of the system.

FIG. 33 shows the result, covering the case where the thickness of the recording layer is changed. As apparent from FIG. 33, the effect of decreasing the coercive force is increased with decrease in the thickness of the recording layer. It should be noted, however, that, since the thickness of the functional layer capable of obtaining the effect of decreasing the coercive force is increased, a problem is generated that the manufacturing cost is increased. It follows that the suitable thickness of the recording layer is determined depending on the requirements of the system.

In the calculations described above, the effect of decreasing the coercive force was obtained only in the case where Ku of the functional layer is smaller than Ku of the recording layer. It follows that, in order to obtain the effect of decreasing the coercive force, it is necessary for the magnetic anisotropy energy density $Ku_{FL}$ of the functional layer to be smaller than the magnetic anisotropy energy density $Ku_{RL}$ of the recording layer.

It is possible for the analysis described above to be equivalent to the result produced by the magnetic layer having a thickness of $t_{RL}+t_{FL}$ where Ku of the recording layer and Ku of the functional layer are averaged. Detailed analysis is required for verifying this possibility and it is impossible to perform such an analysis nowadays. It should be noted, however, that, even if the assumption is correct, the magnetic recording medium according to the eighth embodiment of the present invention produces the merits as summarized below:

(1) It is generally difficult to obtain a material having an optional value of Ku. It should be noted in this connection that it is necessary to control the grain size and the crystallinity in the magnetic recording medium. However, the particular control is strongly dependent on the materials. On the other hand, in the magnetic recording medium according to the eighth embodiment of the present invention, used are a material having a high Ku and a material having a low Ku, making it possible to obtain arbitrary KuV and a diamagnetic field by adjusting the parameters such as the thickness, the exchange coupling energy and the saturation magnetization, which can be controlled by the dilution with, for example, the added element of the material, for each layer.

(2) In general, in the magnetic recording medium of the multi-gain system, the grain tends to be enlarged if the film thickness of the same material is increased. This is considered to be derived from the stress moderation or the stress generation owing to the increase in the film thickness. Such being the situation, in the magnetic recording medium according to the eighth embodiment of the present invention, the recording layer is formed before the grains are coarsened in accordance with the growth of the functional layer, with the result that it is possible to suppress the stress moderation or the stress generation so as to prevent the grain sizes from being increased. The particular effect can be further promoted by repeatedly laminating the functional layer/recording layer structure several times so as to decrease the effective thickness of each layer.

In the simulation described above, the diamagnetic field is not taken into consideration. This implies that the simulation was performed on the premise that the magnetic recording medium is a longitudinal magnetic recording medium. However, it is also possible to apply the particular simulation to the perpendicular magnetic recording medium. The diamagnetic field can be represented by N×4 Ms, where N represents the diamagnetic field coefficient. In the case of the perpendicular magnetic recording medium, N is 1 where the medium includes a continuous magnetic film. However, it is difficult to determine the value of N in the case of the practical multi-grain medium. In any case, however, the diamagnetic field is exerted in the direction of lowering Ku and, thus, it is reasonable to apply the simulation described above to the perpendicular magnetic recording medium, too, if Ku is considered with the diamagnetic field taken into account. Also, in evaluating Ku in general, Ku is determined in the form of including the diamagnetic field. Therefore, the same effect can be obtained if an effective Ku that can be practically obtained is used in place of the pure Ku as the Ku in the simulation described above.

From the results shown in FIGS. 28 to 33, it is possible to estimate the preferred range of each parameter as follows. In this case, the basic parameters are set as follows: $Ku_{RL}=10^7$ erg/cc; $Ku_{FL}=10^6$ erg/cc; $t_{RL}=10$ nm; $Ms_{RL}=500$ emu/cc; $Ms_{FL}=500$ emu/cc; and $\sigma_{FL}=5$ erg/cm². Let us consider the case where $Ms_{RL}$, $Ku_{RL}$, $\sigma_{FL}$ or $t_{RL}$ is adjusted. In this case, satisfactory characteristics can be obtained if the thickness $t_{FL}$ of the functional layer is set to fall between the open circles and the filled circles shown in the graphs of FIGS. 34A to 34D. The range of $t_{FL}$ shown in these graphs cannot be estimated by the conventional theory and produces a large effect of decreasing the coercive force. Needless to say, it is preferable to use the effective Ku, with the diamagnetic field taken into account, for Ku in this case. Of course, it is possible to use intrinsic Ku in the case where the influence of the diamagnetic field is small in design and the system.

In the magnetic recording medium according to the ninth embodiment of the present invention, the recording layer may be formed of a magnetic artificial lattice. The magnetic artificial lattice is prepared by laminating several times to scores of times a unit structure comprising a ferromagnetic thin film such as Co and a nonmagnetic layer such as Pd or Pt. It is known that the magnetic artificial lattice produces magnetic anisotropy energy of at least $10^7$ erg/cc and has an axis of anisotropy perpendicular to the film surface. By using the magnetic artificial lattice for forming the recording layer, it is possible to obtain the effects that described above in conjunction with the magnetic recording medium according to the eighth embodiment of the present invention. The magnetic anisotropy energy not lower than $10^7$ erg/cc can be obtained under the conditions that the nonmagnetic layer is formed of Pt, Pd or an alloy containing these elements as a main component and that the thickness of the nonmagnetic layer is not larger than 2 nm.

In the magnetic recording medium according to the eighth embodiment of the present invention, it is possible for each of the functional layer and the recording layer to be a perpendicular magnetization film. In this case, if the functional layer and the recording layer are stacked one upon the other in a manner to exert exchange coupling interaction, the axes of the anisotropy are aligned so as to make it possible to increase exchanging coupling energy. In the magnetic recording medium according to the eighth embodiment of the present invention, the effect of decreasing the coercive force is increased with increase in the exchange coupling energy, making it possible to use a material having a high value of Ku for forming the recording layer. Incidentally, each of the recording layer and the functional layer need not be a perfect perpendicular magnetization film in which in-plane hysteresis does not appear. Of course, a perfect perpendicular magnetization film is desirable. However, it is possible to obtain the effect of increasing the exchange coupling energy under the conditions that the remanent magnetization substantially remains in the perpendicular component, too.

In the magnetic recording medium according to the eighth embodiment of the present invention, it is possible for the recording layer and the functional layer to be alternately stacked one upon the other to form a multi-layered film. Particularly, if there is a region of the stacked structure comprising functional layer/recording layer/functional layer, the exchange magnetic field applied to the recording layer is rendered two times as high as that in the case of the two-layered film so as to improve the effect of suppressing Hc of the material having a high Ku. It is possible for a plurality of such regions to be present in the magnetic recording medium.

In the magnetic recording medium according to the eighth embodiment of the present invention, it is possible for the functional layer to include a plurality of magnetic layers. Where these plural magnetic layers are stacked one upon the other in a manner to form an exchange coupling in the antiferromagnetic direction, it is possible to diminish the effective saturation magnetization. In some cases, the effective saturation magnetization can be made completely zero. In this case, it is possible to diminish the amount of magnetization of the magnetic recording medium as a whole. It follows that it is possible to suppress reduction in the recording resolution caused by the diamagnetic field in the case of the longitudinal magnetic recording medium. It is also possible to obtain the effect of suppressing increase in the medium noise caused by the reverse domain generation in the case of the perpendicular magnetic recording medium. It is possible to use the functional layer made of the material and having the structure described previously as the particular functional layer.

In the magnetic recording medium according to the eighth embodiment of the present invention, it is desirable for the recording layer to include a magnetic material selected from the group consisting of Fe—Pt, Fe—Pd, Co—Pt and Co—Pd each comprising Cu added thereto in an amount of at most 50 atomic %. Also, it is desirable for the functional layer to contain a magnetic material selected from the group consisting of Pt—Fe, Fe—Pd, Co—Pt and Co—Pd each comprising Ag and/or Al added thereto in an amount of at most 50 atomic % or substantially comprising no additive.

Ordered alloys such as Fe—Pt, Fe—Pd, Co—Pt and Co—Pd are magnetic materials having a high Ku. In these ordered alloys, the largest value of Ku can be obtained in the case where the ratio of the magnetic material to the noble metal is substantially 1:1. However, a high Ku can be obtained even in the case where the ratio noted above falls within a range of between 1:3 and 3:1. These ordered phases cannot be obtained as deposited by a simple sputtering operation, and can be obtained by applying annealing. In general, the annealing temperature is set at 500 to 600° C. It has been found, however, that the annealing temperature can be lowered with using a suitable additive element. The element most effectively lowering the annealing temperature is Cu. In the case of using Ag or Al, it is impossible to obtain the effect of lowering the annealing temperature. It follows that it is possible to selectively increase Ku of the recording layer alone, if an ordered phase alloy comprising at most 50 atomic % of Cu is used as the recording layer and an ordered phase alloy comprising at most 50 atomic % of Ag and/or Al, or not comprising such an additive, is used for forming the functional layer, and if the annealing temperature is set at a region in which the recording layer can be ordered and the functional layer is not ordered. It should also be noted that, since both the functional layer and the recording layer are formed of the materials of the same series, it is possible to control easily the crystal orientation and the particle size in not only the functional layer but also the recording layer by adjusting the underlayer and the process.

EXAMPLES

Example 1

A magnetic recording medium according to the first embodiment of the present invention, which is constructed as shown in FIG. 1, was prepared. Specifically, on a glass substrate having a diameter of 2.5 inches, an SiN underlayer having a thickness of 50 nm, a $Tb_{0.19}(Fe_{0.75}Co_{0.25})$ base layer having a thickness of 25 nm, an SiN switching layer having a thickness of 2 nm, a CoPtCr—O recording layer having a thickness of 20 nm and a carbon protective layer having a thickness of 3 nm were successively formed by sputtering, followed by coating with a lubricant.

In this case, a sputter etching was applied to the SiN underlayer for 1 minute with an RF of 100W, followed by depositing the base layer on the underlayer without breaking vacuum. As a result, it was possible to remove the free oxygen from the SiN underlayer, the base layer and the interface between the SiN underlayer and the base layer so as to improve the durability of the base layer. Concerning the magnetic characteristics of the base layer, the coercive force Hc at ambient temperature was found to exceed the measurable limit (15 kOe) of VSM so as to form a so-called "compensation composition". Also, the Curie temperature of the base layer was found to be 350° C.

The fine structure of the recording layer was examined with TEM. It has been found that CoPtCr columnar magnetic crystal particles having a diameter of about 7 nm were separated from each other with a distance of 2 nm by nonmagnetic material comprising amorphous Co–O and traces of Cr. Concerning the magnetic properties of the recording layer, an easy axis of magnetization was formed in the perpendicular direction, and the coercive force at ambient temperature, which was measured with VSM, was found to be 4.5 kOe. From the results of the static evaluation such as a ΔM method and MFM measurement of the fine domain, it has been confirmed that exchange coupling interaction is scarcely observed among the magnetic particles.

Figure 35:
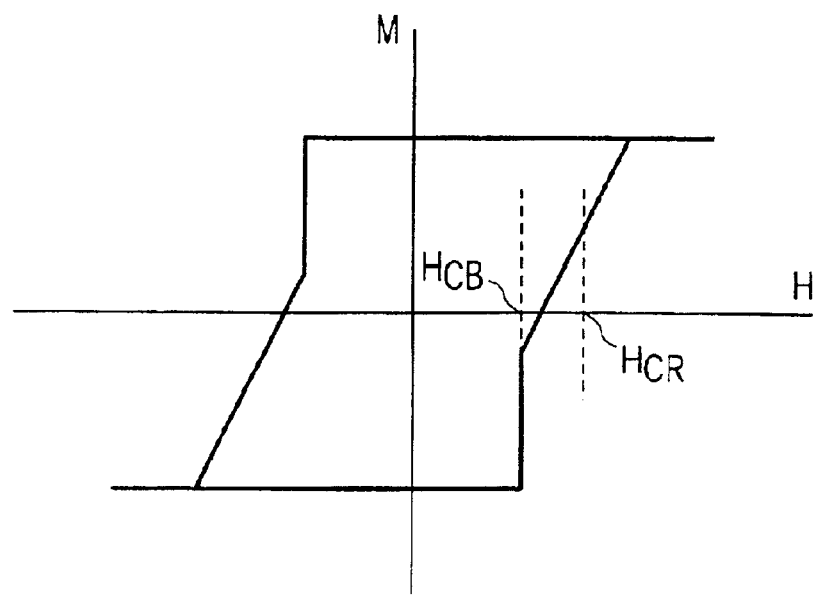
FIG. 35 is a drawing showing magnetic properties at ambient temperature in respect of the magnetic recording medium in Example 1.

The temperature dependency of the magnetic characteristics was examined under the state that the base layer, the switching layer and the recording layer were stacked one upon the other. As a result, the magnetic characteristics schematically shown in FIG. 35 were obtained in the range from ambient temperature to 150° C. To be more specific, exchange coupling was not found between the base layer and the recording layer, and these layers exhibited independent hysteresis. Also, the base layer and the recording layer were found to be different from each other in Hc, as denoted by HcB and HcR. However, the separation of the hysteresis as shown in FIG. 35 did not occur when the temperature exceeded 150° C. so as to cause HcB and HcR to be coincident. It is considered reasonable to understand that exchange coupling interaction began to be exerted from 150° C. In the case of the stacked film, it is impossible to examine the exchange force Hexg directly from the hysteresis loop unless an interfacial domain wall is formed between the two layers. It is also impossible to know directly the change in Lexg. Such being the situation, the change with temperature in the activation moment VIsB was examined by performing time waiting measurement with VSM while changing temperatures in an attempt to estimate the temperature dependency of the activation volume, i.e., the volume Va of the magnetization reversal unit. As a result, Va exhibited the change with temperature similar to that schematically shown in FIG. 3, and the temperature Tsw at which exchange coupling begins to be exerted was estimated at about 150° C. as in the estimation from the change in the hysteresis loop.

The dynamic characteristics of the above magnetic recording medium were evaluated by using a recording/reproducing evaluation apparatus for HDD. The rotating speed of the recording medium was set at 4500 rpm. A recording head having a recording gap of 200 nm was used, and a reproducing head having a GMR element and a reproducing gap of 110 nm was used. The magnetic spacing was estimated at about 10 nm from the flying height and the thickness of the lubricant. On the other hand, a laser having a wavelength of 633 nm and an external low floating lens were arranged on the back surface of the substrate. It was designed that an SIL lens would be formed by both the external low floating lens and the substrate so as to allow the laser beam to be focused in the regions of the base layer/switching layer/recording layer. A local heating was applied by adjusting the diameter of the laser spot at about 500 nm with FWHM. In this case, the head was driven by a precise piezo element so as to allow the illuminating position of light to be coincident with the gap position of the recording head.

In the first step, the magnetic recording was attempted without irradiation with the laser beam. The reproduced signal was found to consist essentially of noise, indicating that a sufficient recording was not performed. This is a natural result, judging from the coercive force of the recording layer and from the recording capability of the recording head.

Then, recording was performed while irradiating with a laser light. By obtaining in advance the relationship between the irradiating power and the temperature elevation of the medium by another experiment and simulation, the medium temperature dependency of the CN ratio (CNR) of the reproduced signal was examined from the irradiating laser power.

Figure 36:
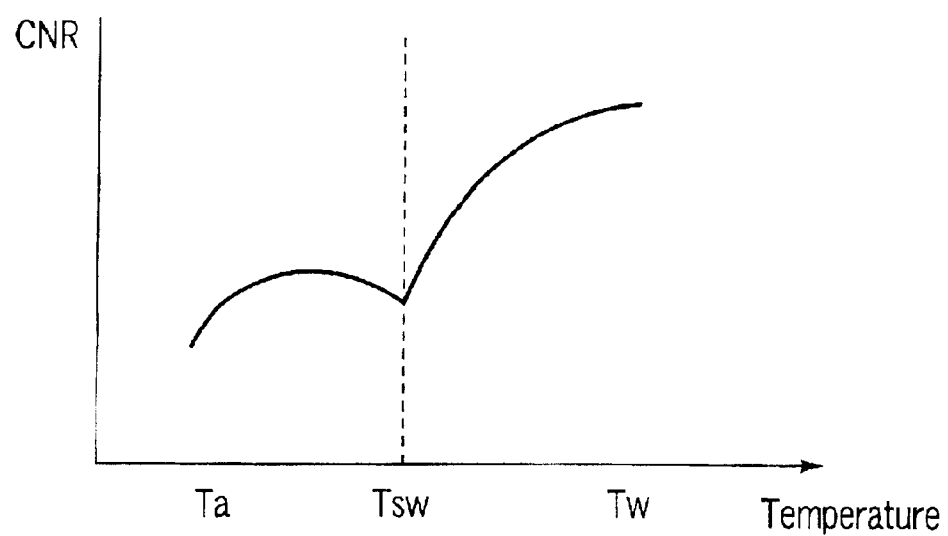
FIG. 36 is a graph showing recording temperature dependency of CNR in respect of the magnetic recording medium in Example 1.

FIG. 36 schematically shows the result of the single frequency recording with 400 kfci. The recording was possible even in the case where the medium temperature was not higher than Tsw, and obtained was a result that the CNR was increased with elevation of the medium temperature. This is because Hc was lowered by the elevation of the medium temperature, with the result that the recording was coming to be made possible even with the magnetic field generated from the head. However, the SN ratio was low. When the medium temperature was further elevated, CNR began to be lowered by contraries. It is considered reasonable to estimate that, while the coercive force was lowered so as to facilitate the magnetization reversal of the medium, the magnetization was reversed again by the acceleration of the thermal fluctuation caused by the medium heating. However, when the temperature exceeded Tsw, CNR began to be increased again so as to make it possible to obtain the maximum CNR under temperatures lower than the Curie temperature TcB (250° C.) of the base layer. It is considered reasonable to understand that, since Va was increased by the exchange coupling interaction between the base layer and the recording layer, the magnetic re-reversal ceased to take place. The recording frequency dependency was examined with the optimum recording temperature (power) thus obtained. The frequency dependency curve has characteristics similar to those of the ordinary magnetic recording system. It has been confirmed that the recording can be performed up to 1000 kfci by reflecting the high Ku characteristics of the recording layer.

Comparative Example 1

Figure 37:
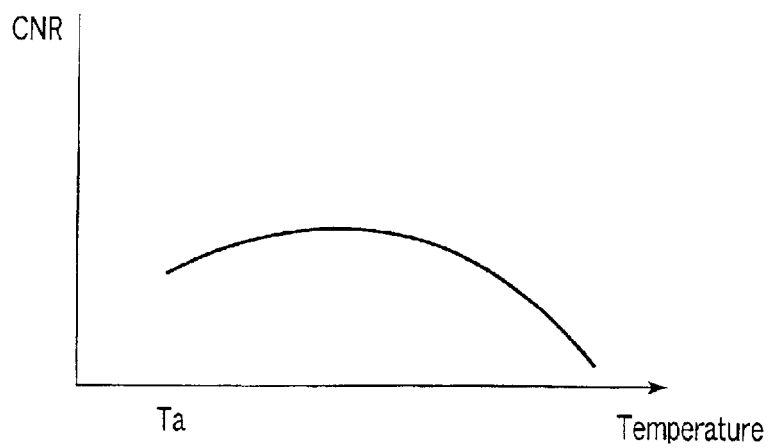
FIG. 37 is a graph showing recording temperature dependency of CNR in respect of the magnetic recording medium in Comparative Example 1.

A magnetic recording medium was prepared as in Example 1, except that the thickness of the SiN switching layer was set at 6 nm. FIG. 37 schematically shows the result of the evaluation of the dynamic characteristics, which was performed as in Example 1. The increase in CNR as observed in FIG. 36 is not observed in FIG. 37, and CNR was lowered with the medium temperature. It is considered reasonable to understand that, since exchange coupling did not take place between the base layer and the recording layer, magnetization was reversed again by acceleration of thermal fluctuation caused by medium heating.

Example 2

Figure 38:
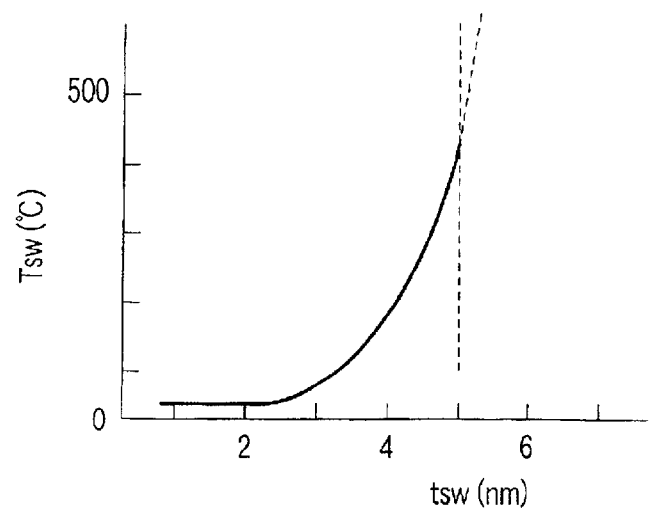
FIG. 38 is a graph showing a relationship between a temperature Tsw at which exchange coupling between the base layer and the recording layer is started and the thickness tsw of the switching layer in respect of the magnetic recording medium in Example 2.

A magnetic recording medium was prepared as in Example 1, except that the thickness tsw of the SiN switching layer was changed from 0.5 nm to 6 nm. Tsw of these magnetic recording mediums were examined, with the result as shown in FIG. 38. If tsw is 1 nm or less, exchange coupling is achieved even at ambient temperature so as to increase Va. It should be noted that, if the medium has the recording resolution required by the system, it is possible to use the medium as the magnetic recording medium of the present invention. What should be noted is that the lower limit of tsw differs depending on the system design and requirements of the magnetic recording medium. It is difficult to evaluate Tsw in the case where tsw is in the vicinity of 6 nm. This is because Tsw is high and, thus, the structure of the recording layer is changed in the static evaluation using VSM, resulting in failure to perform the measurement satisfactorily. If tsw exceeds 6 nm, required as Tw is a high temperature far exceeding 500° C. This is undesirable in view of the power consumption and the heat generation of the magnetic recording medium.

Example 3

A magnetic recording medium, which was constructed as schematically shown in FIG. 1, was prepared. Specifically, on a glass substrate, an underlayer formed of an NiAl film having a thickness of 5 nm and a Cr film having a thickness of 50 nm, a FeCr base layer having a thickness of 75 nm, a Ru switching layer having a thickness of 1.5 nm, a CoPt—$SiO_2$ recording layer having a thickness of 20 nm, and a carbon protective layer having a thickness of 3 nm were successively formed by sputtering in the order mentioned, followed by coating with a lubricant, thereby preparing a magnetic recording medium. CoPt—$SiO_2$ is a so-called "granular medium" having a fine structure that CoPt magnetic particles are dispersed in the $SiO_2$ matrix. The ratio by volume of CoPt to $SiO_2$ was 45% by volume. The particular medium can be prepared by using a composite target or by co-sputtering using CoPt and $SiO_2$, which is carried out while applying a bias to the substrate. The FeCr base layer exhibited ferromagnetic properties by the evaluation of the magnetic properties in a single layer.

The fine structure of the recording layer was examined by using a TEM, finding that the recording layer was constructed such that columnar magnetic particles having a diameter of about 6 nm were separated by the amorphous $SiO_2$ matrix. Concerning the magnetic characteristics, the easy axis of magnetization was found in the perpendicular direction, and the coercive force Hc measured with VSM at ambient temperature was 6 kOe. The distance between the adjacent magnetic particles, i.e., the length of the nonmagnetic portion interposed between the adjacent magnetic particles, was found to be 2 nm. It was confirmed from the result of the static evaluation such as ΔM method and MFM measurement of the fine domain that the exchange coupling interaction was scarcely exerted among the magnetic particles. The base layer was found to have a polycrystalline structure similar to that of the recording layer. The crystal grain size was small, i.e., about 7 nm, because of the effect of the NiAl/Cr underlayer. The morphology of the crystal grain was substantially maintained in the recording layer via the Ru switching layer. Concerning the magnetic properties of the base layer at ambient temperature, Hc was 1 kOe and the Curie temperature was 150° C. The evaluation similar to that in Example 1 was performed, with the result that Tsw was 120° C.

The recording/reproducing evaluation similar to that in Example 1 was applied to the magnetic recording medium for Example 3. The various parameters of the evaluation apparatus were equal to those in Example 1. The result of the single frequency recording with 400 kfci was similar to that schematically shown in FIG. 36. However, from the result of the simulation, it was possible to obtain a sufficiently large CNR even in the case where Tw was 200° C. that exceeded TcB. It is considered reasonable to understand that Va was increased by exchange coupling interaction between the base layer and the recording layer during the gradual cooling process after the recording and, thus, the magnetic re-reversal did not take place. The frequency dependency at Tw of 200° C. was compared with that at Tw of 140° C. by changing the recording temperature (power) The frequency at which output becomes ½ relative to DC was larger under the condition that Tw was set at 200° C. It is considered reasonable to understand that, since Va was diminished in the recording step, the recording resolution was improved.

Example 4

Figure 39:
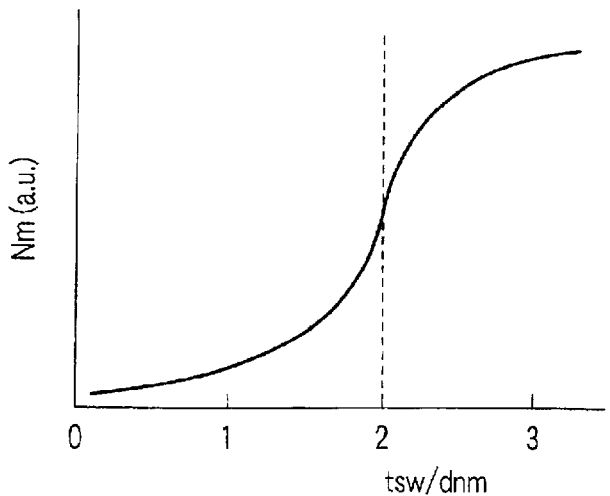
FIG. 39 is a graph showing a relationship between tsw/d and medium noise power in respect of the magnetic recording medium in Example 4.

A magnetic recording medium was prepared as in Example 3, except that the thickness of the Ru switching layer was changed and that the volume ratio of CoPt to $SiO_2$ in the recording layer was changed by changing the power ratio of the CoPt target and the $SiO_2$ target in the step of preparing the recording layer. The distance of the $SiO_2$ nonmagnetic portion separating the CoPt magnetic particles was obtained from the TEM observation of each sample. In this fashion, prepared were samples differing from each other in the ratio of the distance d [nm] of the nonmagnetic portion magnetically separating the magnetic particles to tsw and comparison in the medium noise was performed in the signal of 100 kfci recorded with the optimum laser power. FIG. 39 is a graph schematically showing the result. In the graph of FIG. 39, the noise power in an arbitrary unit is plotted on the ordinate, with tsw/d being plotted on the abscissa. As shown in the graph, the medium noise was rapidly increased when tsw/d exceeded 2. It is considered reasonable to understand that, by the heating of the medium, Lexg was increased so as to cause the exchange coupling to be formed between the magnetic particles within the recording layer before the exchange coupling is formed between the recording layer and the base layer, thereby forming a large magnetic cluster and increasing the disturbance of the magnetization transition, leading to the medium noise generation.

The increase in the medium noise was not recognized from the point of tsw/d=1. It should be noted in this connection that the coupling positions between the magnetic particles form point contact on the average. On the other hand, the coupling positions between the recording layer and the base layer form area-to-area contact. Therefore, the exchange coupling between the recording layer and the base layer is considered to be stronger relative to the same increase in Lexg. It is also considered reasonable to understand that the morphology of the base layer-switching layer-recording layer is substantially maintained as described previously, and the conditions of a very sharp and close to the area-to-area contact are realized in the interface between the adjacent layers.

Example 5

A magnetic recording medium according to the second embodiment of the present invention, which was constructed as shown in FIG. 5, was prepared. Specifically, on a glass substrate having a diameter of 2.5 inches, an underlayer made of NiAl layer having a thickness of 5 nm and a Cr layer having a thickness of 50 nm, a base layer made of a Co—$SiO_2$ granular film having a thickness of 75 nm, a recording layer made of CoPt—$SiO_2$ and having a thickness of 20 nm and a protective layer made of carbon and having a thickness of 3 nm were successively formed by sputtering, followed by coating with a lubricant so as to prepare a magnetic recording medium.

The recording layer was adjusted to have a similar structure to that in Example 3. In the Co—$SiO_2$ granular film forming the base layer, the volume ratio of Co to $SiO_2$ was set at 50% by volume. Also, the substrate bias power was adjusted to permit the diameters of the Co particles to be about 3.5 nm on the average. In the case of this volume ratio of Co, the medium exhibited superparamagnetic properties under ambient temperature. The changes with temperature in the magnetic properties of the Co—$SiO_2$ layer were examined, finding that the ferromagnetic properties can be exhibited under temperatures not lower than about 130° C. (Tf=130° C.). The reason for this phenomenon is that, since Lexg is increased with temperature to become larger than the distance between the adjacent Co particles, exchange coupling occurs between the Co particles to increase the activation volume, with the result that the magnetic anisotropy energy becomes larger than the thermal fluctuation energy so as to be converted into ferromagnetic.

In this case, if tsw in FIG. 3 is made equal to Tf, which is 130° C., it is possible to obtain a magnetic recording medium producing the effects similar to those produced in Example 3. To be more specific, if the medium is heated to temperatures higher than Tsw, the base layer is allowed to exhibit ferromagnetic properties and, at the same time, Va of the magnetic particles in the recording layer, which form the exchange coupling, is increased as shown in FIG. 3. As a result, it is possible to suppress the magnetic re-reversal. In this case, the relationship in magnitude between the recording temperature of the base layer and Tw is not particularly limited as described previously.

The recording/reproducing evaluation as in Example 1 was applied to the magnetic recording medium described above. The various parameters of the evaluation apparatus were equal to those in Example 1. The result of the single frequency recording at 400 kfci was similar to that schematically shown in FIG. 36. When the recording frequency dependency was examined with the optimum recording temperature (power), it has been confirmed that the recording can be performed up to 1000 kfci.

Example 6

A magnetic recording medium according to the third embodiment of the present invention, which was constructed as shown in FIG. 5, was prepared. Specifically, on a glass substrate having a diameter of 2.5 inches, an underlayer made of SiN and having a thickness of 50 nm, a base layer made of $Tb_{0.18}(Fe_{0.9}Co_{0.1})$ and having a thickness of 25 nm, a recording layer made of $(Co_{0.75}Pt_{0.2}Cr_{0.05})$—O and having a thickness of 20 nm, and a protective layer made of carbon and having a thickness of 3 nm were successively formed by sputtering, followed by coating with a lubricant.

In the above process, a sputter etching treatment was applied to the SiN underlayer for one minute with an RF of 100W so as to stack the base layer without breaking vacuum. As a result, it was possible to remove free oxygen from the SiN underlayer, the base layer and the interface between these layers so as to improve the durability of the base layer. Concerning the magnetic characteristics of the base layer alone, the coercive force at ambient temperature was about 5 kOe, and the Curie temperature was about 200° C.

The fine structure of the recording layer was examined with TEM, finding that the columnar magnetic crystal grains made of CoPtCr and having a diameter of about 7 nm were separated from each other at an interval of 2 nm by the nonmagnetic material comprising amorphous Co—O and traces of Cr. Concerning the magnetic properties of the recording layer, the easy axis of magnetization was formed in the perpendicular direction, and the coercive force Hc measured by VSM was estimated at about 4.5 kOe at ambient temperature. It has been confirmed from the result of the static evaluation such as the ΔM method and the MFM measurement of the fine domain that exchange coupling interaction was scarcely recognized among the magnetic particles. It was impossible to identify the Curie temperature because of the change in the film structure. However, the Curie temperature was estimated at about 250° C. by extrapolation from the change with temperature up to 200° C. It is considered reasonable to understand that, since the diameter of the magnetic grains in the recording layer is small, the influence of the thermal fluctuation becomes large.

The dynamic characteristics of the magnetic recording medium were evaluated by using the recording/reproducing apparatus for HDD. The rotating speed of the recording medium was set at 4,500 rpm. A recording head having a recording gap of 200 nm was used, and a reproducing head having a GMR element and a reproducing gap of 110 nm was used. The magnetic spacing was estimated at about 10 nm from the flying height and the thickness of the lubricant. On the other hand, a laser having a wavelength of 633 nm and an external low floating lens were arranged on the back surface of the substrate. It was designed that an SIL lens would be formed by both the external low floating lens and the substrate so as to allow the laser beam to be focused in the regions of the base layer/switching layer/recording layer. A local heating was applied by adjusting the diameter of the laser spot at about 500 nm with FWHM. In this case, the head was driven by a precise piezo element so as to allow the illuminating position of light to be coincident with the gap position of the recording head.

In the first step, the magnetic recording was attempted without irradiation with the laser beam. The reproduced signal was found to consist essentially of noise, indicating that a sufficient recording was not performed. This is a natural result, judging from the coercive force of the recording layer and from the recording capability of the recording head.

Then, recording was performed while irradiating with a laser light. By obtaining in advance the relationship between the irradiating power and the temperature elevation of the medium by another experiment and simulation, the medium temperature dependency of the CN ratio (CNR) of the reproduced signal was examined from the irradiating laser power.

FIG. 40 is a graph schematically showing the result of the single frequency recording with 400 kfci. As apparent from the graph, the recording can be performed at Tw falling within a range of between 100° C. and 300° C. CNR at the limit of the recording capability is low, i.e., about 10 dB, and, thus, it is impossible to use the medium in the actual HDD system. However, the value is sufficient for confirming the principle of the recording method of the present invention. Also, it is sufficiently possible to improve CNR by lowering the recording frequency or by adjusting the magnetic properties of the recording layer.

A similar experiment was conducted by using a sample in which the ratio of Fe to Co in the recording medium was changed, with the result as shown in the graph of FIG. 41. The absolute value of TcB−Tw is plotted in the abscissa of the graph, with the maximum CNR obtained under the particular condition being plotted on the ordinate. As apparent from the graph, it is possible to expect CNR of about 20 dB under the condition of |TcB−Tw|<100K, to expect CNR of about 40 to 50 dB under the condition of |TcB−Tw|<50K, and to expect CNR of about 50 to 60 dB under the condition meeting |TcB−Tw|<30K. As apparent from FIG. 41, the similar recording can be performed under the condition of TcB>Tw, provided that it is possible to satisfy the condition of |TcB−Tw|<100K. From the experiment shown in FIG. 40, in which Tw was changed, it has also been found possible to perform the recording similarly even under the condition of TcB<Tw.

The composition of the base layer was changed to $Tb_{0.22}(Fe_{0.9}Co_{0.1})$. The Curie temperature of the base layer was equal to that described above. However, the base layer has a RE rich composition and exhibits the compensating temperature close to 100° C. The recording characteristics similar to those shown in FIG. 40 were obtained in the case of using this base layer.

A similar recording experiment was conducted by using a magnetic recording medium comprising an underlayer made of vanadium and having a thickness of 50 nm and a base layer made of $(Co_{0.8}Pt_{0.2})$—$SiO_2$ and having a thickness of 30 nm. When a cross section of the medium was observed with TEM, it was found that the base layer was constructed such that columnar magnetic crystal grains of CoPt and having a diameter of about 10 nm were separated from each other by the nonmagnetic portion of amorphous $SiO_2$. Also, the magnetic particles in the recording layer were found to grow on the CoPt particles. The result with this medium was similar to that shown in FIG. 40. However, since the medium noise was lowered, CNR was increased by 3 to 5 dB. It is considered reasonable to understand that, since the change in the magnetization transition after the recording was small, the jitter was small so as to increase CNR.

A similar recording experiment was conducted by preparing a medium comprising an underlayer made of ZnO and having a thickness of 50 nm and a base layer made of a multi-layered structure of a $(Co_{0.75}Pt_{0.2}Cr_{0.05})$—$SiO_2$ layer having a thickness of 10 nm, a Rh layer having a thickness of 1 nm and a $(Co_{0.75}Pt_{0.2}Cr_{0.05})$—$SiO_2$ layer having a thickness of 10 nm. When a cross section of the medium was observed with TEM, it was found that the base layer was constructed such that columnar magnetic crystal grains of CoPtCr and having a diameter of about 7 nm were separated from each other by the nonmagnetic portion of the amorphous $SiO_2$. Also, the magnetic particles were found to be of a columnar structure substantially continuous to the recording layer. The result with this medium was similar to that which is shown in FIG. 40. However, since the medium noise was lowered, CNR was increased by 5 to 7 dB. It is considered reasonable to understand that, since the change in the magnetization transition after the recording was small, the jitter was small so as to increase CNR.

Example 7

A magnetic recording medium according to the fourth embodiment of the present invention, which was constructed as shown in FIG. 1, was prepared. Specifically, on a glass substrate having a diameter of 2.5 inches, an underlayer made of SiN and having a thickness of 50 nm, a base layer made of $Tb_{0.18}(Fe_{0.75}Co_{0.25})$ and having a thickness of 25 nm, a switching layer made of $(Gd_{0.5}Tb_{0.5})_{0.18}(Fe_{0.98}Co_{0.02})$ and having a thickness of 10 nm, a recording layer made of $(Fe_{0.49}Pt_{0.49}Ta_{0.02})$—SiN and having a thickness of 20 nm, and a protective layer made of carbon and having a thickness of 3 nm were successively formed by sputtering, followed by coating with a lubricant.

In this case, a sputter etching was applied to the SiN underlayer for 1 minute with an RF of 100W, followed by laminating the base layer on the underlayer without breaking vacuum. As a result, it was possible to remove free oxygen from the SiN underlayer, the base layer and the interface between these layers so as to improve the durability of the base layer. Concerning the magnetic characteristics of the base layer alone, the coercive force Hc at ambient temperature was found to be about 5.5 kOe and the Curie temperature was found to be about 400° C. On the other hand, concerning the magnetic characteristics of the switching layer alone, the coercive force at ambient temperature was found to be about 3 kOe, and the Curie temperature was found to be about 150° C.

The fine structure of the recording layer was examined with TEM. It has been found that the magnetic crystal grains having a diameter of about 6 nm, most of which was formed of a FePt ordered phase, were separated from each other with a distance of 2 nm by the nonmagnetic amorphous SiN. Concerning the magnetic properties of the recording layer alone, an easy axis of magnetization was formed in the perpendicular direction, and the coercive force at ambient temperature, which was measured with VSM, was estimated at about 8 kOe. From the results of the static evaluation such as a ΔM method and the MFM measurement of the fine domain, it has been confirmed that the exchange coupling interaction is scarcely recognized among the magnetic particles. It was impossible to identify the Curie temperature because of the change in the film structure. However, the Curie temperature was estimated at about 300° C. by extrapolation from the change with temperature up to 200° C.

The evaluation of the dynamic characteristics as in Example 6 was applied to the magnetic recording medium. The relationship between Tw and CNR was examined by changing the irradiating power of the laser light, with the result as shown in the graph of FIG. 42. The result was similar to that shown in FIG. 40. However, where Tw was lower than TcS (Tw<TcS), the value of CNR was low because of the marked increase in noise. The reason for the particular result is considered to reside in that Ku of the entire system or the recording coercive force was not in a state of performing sufficient recording. It can be seen from FIG. 42 that the recording can be performed under the state that Tw falls within a range of between 150° C. and 250° C. The value of CNR at the limit of the recording capability was low, i.e., about 10 dB, making it impossible to use the medium in an actual HDD system. However, the value was sufficient for confirming the principle of the recording method of the present invention. Also, it is sufficiently possible to improve CNR by lowering the recording frequency or by adjusting the magnetic properties of the recording layer.

A similar experiment was conducted by using a sample in which the ratio Fe:Co was changed in the base layer, with the result as shown in a graph of FIG. 43. The value (K) of Tw−TcS is plotted on the abscissa of the graph, with the maximum CNR obtained under the particular condition being plotted on the ordinate. The case where Tw is lower than TcS (Tw<TcS) was not examined. As apparent from the graph, it is possible to expect the value of CNR of about 20 dB under the condition of |Tw−TcS|<100K, to expect CNR of about 40 to 50 dB under the condition of |Tw−TcS|<50K, and to expect the value of CNR of about 50 to 60 dB under the condition meeting |Tw−TcS|<30K.

The composition of the base layer was changed to $Tb_{0.22}(Fe_{0.9}Co_{0.1})$. The Curie temperature of this base layer was equal to that described above. However, the base layer has a RE rich composition and exhibits the compensating temperature close to 100° C. The recording characteristics similar to those shown in FIG. 42 were obtained in the case of using this base layer.

The composition of the switching layer was changed to $(Gd_{0.5}Tb_{0.5})_{0.22}(Fe_{0.98}Co_{0.02})$. The Curie temperature of this switching layer was equal to that described above. However, the switching layer has a RE rich composition and exhibits the compensating temperature close to 100° C. The recording characteristics similar to those shown in FIG. 42 were obtained in the case of using this switching layer.

These results are derived from the fact that the function of the magnetic recording medium of this embodiment is produced by the exchange coupling between the base layer and the recording layer with the switching layer interposed therebetween. In principle, the RE components of the base layer and the switching layer are irrelevant to the function of the magnetic recording medium of the present invention.

A similar experiment was conducted by preparing a medium comprising an underlayer made of Cr and having a thickness of 50 nm and a base layer made of $(Co_{0.8}Pt_{0.2})$—$SiO_2$ and having a thickness of 30 nm. In forming the base layer, RF bias sputtering was performed by applying RF power of 200W to the substrate. A cross section of the medium was observed with TEM, finding that the base layer was constructed such that CoPt columnar magnetic crystal grains having a diameter of about 10 nm were separated from each other by nonmagnetic amorphous $SiO_2$. Since the switching layer was formed of amorphous RE-TM, the continuity of the crystallinity was not recognized between the base layer and the recording layer. A result similar to that shown in FIG. 42 was obtained with this medium, too.

The switching layer was formed of $((Co_{0.8}Pt_{0.2})Cr_{0.14})$—$SiO_2$ and had a thickness of 10 nm. The switching layer was equal in composition to the base layer. However, the Curie temperature was lowered to about 130° C. by the addition of Cr. An RF bias was not applied in forming the base layer. A cross section of the medium was observed with TEM. It has been found the crystal grains having a diameter of about 5 nm was formed continuously to extend from a part of the underlayer to reach the recording layer through the base layer and the switching layer. The recording characteristics similar to those shown in FIG. 42 were obtained with the use of this medium. However, CNR was increased by about 5 dB because the medium noise was decreased. It is considered reasonable to understand that the particular phenomenon was derived from the fact that the jitter was decreased because the change in the magnetization transition after the recording was small. The CNR evaluation with 600 kfci was also applied to this medium. CNR was certainly decreased by about 5 dB. However, it was possible to obtain a result similar to the result shown in FIG. 42. It is considered reasonable to understand that, since the base layer was of a multi-grain structure, the transition point of the recording layer was not changed so as to achieve a high-density recording.

In this Example, the combination of the base layer and the switching layer included a combination of RE-TM and RE-TM, a combination of a multi-grain film and RE-TM, and a combination of a multi-grain film and a multi-grain film. In view of the operating principle and function of the magnetic recording medium of this Example, it is apparent that the similar effect can be obtained in the case of the combination of RE-TM and a multi-grain film.

Example 8

A magnetic recording medium according to the fifth embodiment of the present invention, which was constructed as shown in FIG. 9, was prepared. Specifically, on a glass substrate having a diameter of 2.5 inches, an underlayer made of Cr and having a thickness of 50 nm, a functional layer made of an IrMn antiferromagnetic material and having a thickness of 25 nm, a recording layer made of CoPtCr—O and having a thickness of 20 nm, and a protective layer made of carbon and having a thickness of 3 nm were successively formed by sputtering in the order mentioned, followed by coating with a lubricant.

The fine structure of the recording layer was examined with TEM. It has been found that columnar magnetic crystal grains having a diameter of about 7 nm were separated from each other by a nonmagnetic material comprising amorphous Co—O and traces of Cr. Concerning the magnetic characteristics of the recording layer, an easy axis of magnetization was formed in the longitudinal direction, and the coercive force Hc measured by VSM at ambient temperature was estimated at about 5 kOe. It was impossible to identify accurately the Curie temperature because of the plastic change in the film structure. However, the Curie temperature was estimated at about 300° C. by extrapolation from the temperature dependency up to 200° C. It is considered reasonable to understand that, since the particle size of the magnetic particle is small, the influence of the thermal fluctuation was rendered large. The MH loop of a sample in which the functional layer and the recording layer were stacked one upon the other was measured with VSM, with the result that TcE was about 200° C.

The dynamic characteristics of the magnetic recording medium thus prepared were evaluated by using a recording/reproducing evaluation apparatus for HDD. The rotating speed of the recording medium was set at 4500 rpm. A recording head having a recording gap of 200 nm was used, and a reproducing head having a GMR element and a reproducing gap of 110 nm was used. The magnetic spacing was estimated at about 30 nm from the flying height and the thickness of the lubricant. On the other hand, a laser having a wavelength of 633 nm and an external low floating lens were arranged on the back surface of the substrate. It was designed that an SIL lens would be formed by both the external low floating lens and the substrate so as to allow the laser beam to be focused in the regions of the functional layer and the recording layer. A local heating was applied by adjusting the diameter of the laser spot at about 500 nm with FWHM. In this case, the head was driven by a precise piezo element so as to allow the illuminating position of light to be coincident with the gap position of the recording head.

In the first step, the magnetic recording was attempted without irradiation with the laser beam. The reproduced signal was found to consist essentially of noise, indicating that a sufficient recording was not performed. This is a natural result, judging from the coercive force of the recording layer and from the recording capability of the recording head.

Then, recording was performed while irradiating with a laser light. By obtaining in advance the temperature elevation of the medium by changing the laser power in another experiment and simulation, the relationship between the laser power and the recording temperature Tw was examined. Also, the relationship between the recording temperature Tw and the CN ratio of the reproduced signal (CNR) was examined by performing the recording while changing the laser power and, then, reproducing the recorded information.

FIG. 44 schematically shows the result of the single frequency recording with 400 kfci. As shown in FIG. 44, the recording is possible in the case where the value of Tw falls within a range of between 100° C. and 300° C. Since the value of CNR under the condition of the recording limit was unduly low, i.e., about 10 dB, it was impossible to use the medium in the actual HDD system. However, CNR was high enough to confirm the principle of the magnetic recording medium according to the fifth embodiment of the present invention. Also, it is possible to improve CNR by lowering the recording frequency or by adjusting the magnetic characteristics of the medium.

Magnetic recording mediums having the structure substantially equal to that shown in FIG. 9 were prepared by using functional layers formed under various conditions and made of various materials. To be more specific, the functional layers were formed of FeMn (TcE: 130 to 180° C.), IrMn (TcE: 150 to 250° C.) and CrMnPt (TcE: 230 to 420° C.). Experiments similar to that described above were conducted by using these magnetic recording mediums, with the result as shown in the graph of FIG. 45. The absolute value (K) of TcE−Tw is plotted on the abscissa of the graph, with the maximum CNR obtained under the particular condition plotted on the ordinate of the graph. As apparent from the graph, it is possible to obtain CNR of about 20 dB under the condition of |TcE−Tw|<100K, to obtain CNR of about 30 under the condition of |TcE−Tw|<50K, and to obtain CNR of about 40 dB under the condition of |TcE−Tw|<30K. As apparent from FIG. 45, the recording can be performed under the condition of TcE>Tw, provided that it is possible to satisfy the condition of |TcE−Tw|<100K. FIG. 45 also shows that the recording can be performed under the condition of TcE<Tw.

Example 9

A magnetic recording medium according to the sixth embodiment of the present invention, which was schematically constructed as shown in FIG. 9, was prepared. Specifically, on a glass substrate having a diameter of 2.5 inches, a soft magnetic underlayer made of FeTaC and having a thickness of 50 nm, a Ti shielding layer having a thickness of 5 nm, a Pt underlayer having a thickness of 10 nm, a stacked functional layer having a thickness of 18.8 nm, a stacked recording layer having a thickness of 15 nm and a protective layer made of carbon and having a thickness of 3 nm were successively formed by sputtering in the order mentioned, followed by coating with a lubricant so as to prepare the magnetic recording medium.

The stacked functional layer was prepared by repeatedly depositing seven times a unit of [Co 2 nm/Ru 0.8 nm] as schematically shown in FIG. 17. Co layers in this stacked functional layer are antiferromagnetically coupled. The functional layer exhibited ferrimagnetic properties having a magnetization for one Co layer. Also, the functional layer and the recording layer exhibited an antiferromagnetic coupling.

The stacked recording layer was prepared by repeatedly depositing seven times a unit of [Co 0.3 nm/Pd 1.8 nm]. The fine structure of the recording layer was examined with TEM. It has been found that the Co magnetic crystal grains having a diameter of about 7 nm were separated from each other by the amorphous nonmagnetic material that was assumed to be CoO. Concerning the magnetic characteristics of the recording layer, an easy axis of magnetization was formed in the perpendicular direction, and the coercive force Hc measured by VSM at ambient temperature was about 8 kOe. The Curie temperature TcR of the recording layer was estimated at about 300° C. from the measurement with VSM.

The MH loop of the sample, in which the functional layer and the recording layer were stacked one upon the other, was measured with VSM. TcE was found to be higher than the Curie temperature of the recording layer.

A recording/reproducing evaluation as in Example 8 was applied to the magnetic recording medium described above. Specifically, the relationship between the recording temperature Tw and the CN ratio of the reproduced signal (CNR) was examined by recording information while changing the laser power, followed by reproducing the recorded information. The result exhibited a tendency close to that shown in FIG. 39. However, the relevancy of the recording temperature Tw exhibiting a peak of CNR to TcR or TcE was not recognized. The particular result is considered to be derived simply from the combination of [A] and [B] given below, i.e., [A] the coercive force of the recording layer is lowered with elevation of the temperature so as to relatively increase the recording capacity, and [B] the thermal fluctuation is accelerated with elevation of the temperature so as to lower CNR.

Example 10

A magnetic recording medium according to the seventh embodiment of the present invention, which was constructed as shown in FIG. 13, was prepared. Specifically, on a glass substrate having a diameter of 2.5 inches, an underlayer made of Cr and having a thickness of 50 nm, a second functional layer made of an FeMn antiferromagnetic material and having a thickness of 15 nm, a first functional layer having a stacked structure 18.8 nm thick, a switching layer made of $(Gd_{0.5}Dy_{0.5})_{0.22}(Fe_{0.98}Co_{0.22})$ and having a thickness of 10 nm, a recording layer made of CoCrPtTaB and having a thickness of 17 nm, and a protective layer made of carbon and having a thickness of 3 nm were successively formed by sputtering in the order mentioned, followed by coating with a lubricant.

The first functional layer was formed by repeatedly depositing seven times a unit structure of [Co 2 nm/Ru 0.8 nm] as schematically shown in FIG. 17. Co layers included in the first functional layer are antiferromagnetically coupled. The first functional layer exhibited ferrimagnetic properties having a magnetization for one Co layer. Since the first functional layer formed an exchange coupling with the second functional layer, anisotropy was found in the longitudinal direction. The shift amount of the hysteresis loop in this sample was found to be about 300 Oe.

The switching layer was an amorphous longitudinal magnetization film. The Curie temperature of the switching layer was found to be 150° C.

The fine structure of the recording layer was examined with TEM. It has been found that the columnar magnetic crystal grains having a diameter of about 7 nm, which were formed of CoPtCr, were separated from each other by a nonmagnetic material that was assumed to include amorphous Co, B and Cr. Concerning the magnetic characteristics of the recording layer alone, an easy axis of magnetization was formed in the longitudinal direction, and the coercive force Hc measured by VSM at ambient temperature was estimated at about 6 kOe. It was impossible to identify accurately the Curie temperature because of the plastic change in the film structure. However, the Curie temperature was estimated at about 350° C. by extrapolation from the temperature dependency up to 200° C.

The MH loop of the sample, in which the functional layer, the switching layer and the recording layer were stacked one upon the other, was measured with VSM, with the result that TcE was about 150° C.

Figure 46:
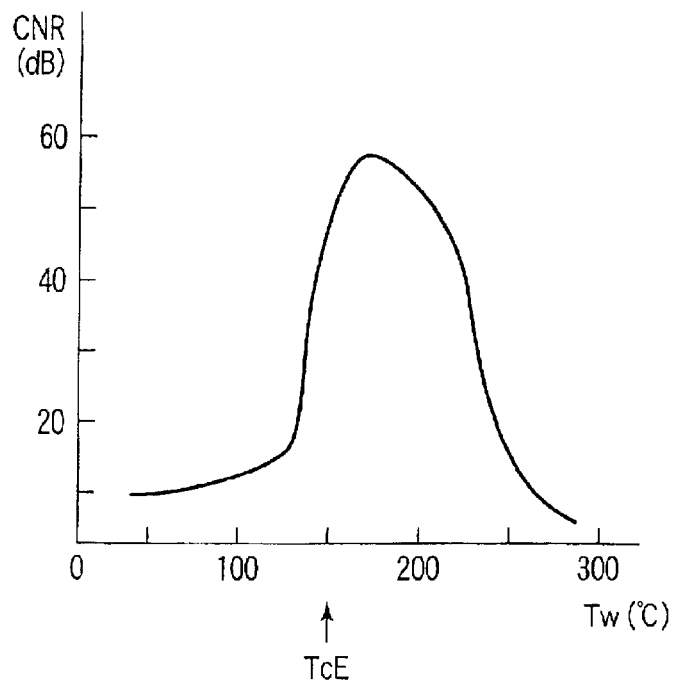
FIG. 46 is a graph showing recording temperature dependency of CNR in respect of the magnetic recording medium in Example 10.

A recording/reproducing evaluation as in Example 8 was applied to the magnetic recording medium described above. Specifically, the relationship between the recording temperature Tw and the CN ratio (CNR) of the reproduced signal was examined by recording information while changing the laser power, followed by reproducing the recorded information. FIG. 46 is a graph showing the result. It was possible to obtain a large CNR value in a region substantially meeting the relationship of Tw>TcE. The reason for the particular result is considered to reside in that the exchange coupling between the functional layer and the recording layer was effectively broken in a region exceeding the Curie temperature of the switching layer. However, the recording was possible even under the temperature lower by 100K than TcE, though CNR was about 10 dB. In other words, it has been found that the recording can be performed in the case where Tw falls within a range of between 150° C. and 250° C. The value of CNR under the condition of the recording limit was unduly low, i.e., about 10 dB, making it impossible to use the medium in the actual HDD system. However, the value of CNR was sufficient for confirming the principle of the magnetic recording medium according to the seventh embodiment of the present invention. Also, it is possible to improve CNR by lowering the recording frequency or by adjusting the magnetic properties of the medium. Particularly, since the influence of the thermal fluctuation is small in a region of Tw<TcE, the condition is considered to be adapted for the system allowing a low CNR or the system of the severe environmental conditions.

Figure 47:
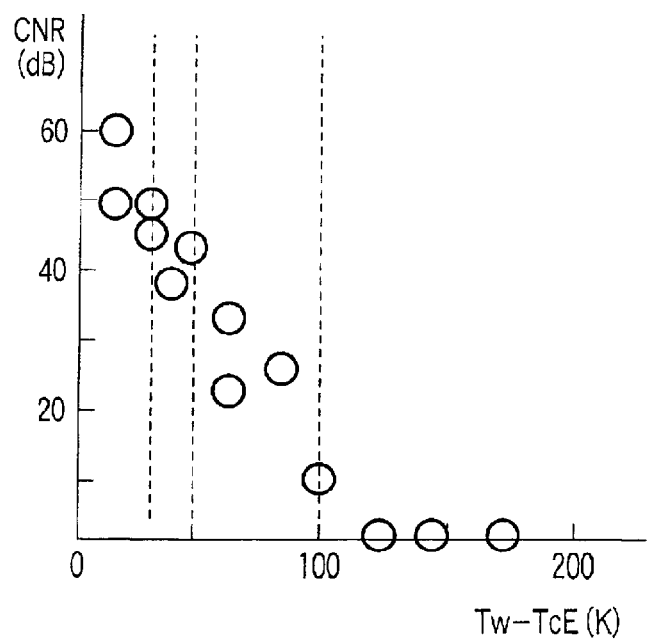
FIG. 47 is a graph showing a relationship between CNR and Tw−TcE in respect of the magnetic recording medium in Example 10.

Then, various magnetic recording mediums each constructed substantially as shown in FIG. 13 were prepared by using switching layers having various ratio of Fe:Co. Since these switching layers differ from each other in the Curie temperature, it is possible to change TcE. An experiment similar to that described above was conducted by using these magnetic recording mediums, with the result as shown in a graph of FIG. 47. The value (K) of Tw–TcE is plotted on the abscissa of the graph, with the maximum CNR obtained under the particular condition being plotted in the ordinate. As apparent from the graph of FIG. 47, the value of CNR was about 20 dB in the case where the value of Tw–TcE was less than 100K, the value of CNR was about 40 to 50 dB in the case where the value of Tw–TcE was less than 50K, and the value of CNR was about 50 to 60 dB in the case where the value of Tw–TcE was less than 20K.

Example 11

A magnetic recording medium constructed as shown in FIG. 21 was prepared. Specifically, on a glass substrate having a diameter of 3.5 inches, a seed layer made of Ti and having a thickness of 5 m and an underlayer made of Ru and having a thickness of 50 nm were successively deposited, followed by laminating a functional layer made of $Co_{78}Cr_{19}Pt_3$ and having a thickness of 15 nm, a recording layer made of $(Fe_{55}Pt_{45})Cu_{10}$ and having a thickness of 10 nm, and a protective layer made of carbon and having a thickness of 3 nm were successively formed by sputtering on the underlayer in the order mentioned and subsequently applying coating of a lubricant. In the sputtering step, the substrate was kept heated to 250° C.

The recording layer, in which a remanent magnetization was also found in the perpendicular component, exhibited magnetic characteristics having a distribution of the magnetic anisotropy at random in a three dimensional direction. The value of $Ku_{RL}$ of the FePtCu recording layer was about $3 \times 10^7$ erg/cc, which was because a $Fe_{50}Pt_{50}$ ordered phase was formed in the recording layer by the heating of the substrate in the sputtering step. On the other hand, the value of $Ku_{FL}$ of the CoCrPt functional layer was about $2 \times 10^6$ erg/cc.

It was difficult to perform the recording because the coercive force of the FePtCu recording layer exceeds 15 kOe. In this medium, however, the coercive force of the entire medium was 8 kOe because a ferromagnetic exchange coupling is formed between the CoCrPt functional layer and the FePtCu recording layer, making it possible to perform the recording sufficiently even with the ordinary magnetic head. This medium exhibited a single stage hysteresis loop, as shown in FIG. 25. The value of $KuV/k_BT$ of this medium was about 200 and, thus, the thermal stability was sufficient.

The value of the coercive force noted above was smaller than the value obtained by the calculation. The small coercive force is considered to be brought about by, for example, the influence of the diamagnetic field, the random distribution of the magnetic anisotropy, the formation of the initial layer, and the influence of the impurity in the film. However, it was possible to obtain a magnetic recording medium having high thermal stability and small coercive force by using a recording layer material having a high Ku value on the basis of calculation.

Example 12

A magnetic recording medium constructed as shown in FIG. 21 was prepared. Specifically, on a glass substrate having a diameter of 3.5 inches, a seed layer made of NiAl and having a thickness of 5 m and an underlayer made of CrMo and having a thickness of 50 nm were successively deposited, followed by laminating a functional layer made of $Co_{83}Cr_{12}Ta_8$ and having a thickness of 10 nm, a recording layer made of $Co_{74}Cr_{22}Ta_4$ and having a thickness of 15 nm, and a protective layer made of carbon and having a thickness of 3 nm were successively formed by sputtering on the underlayer in the order mentioned and subsequently applying coating of a lubricant. Each of the functional layer and the recording layer was a longitudinal magnetization film and, thus, obtained was a longitudinal recording medium.

The value of $Ku_{RL}$ of the $Co_{74}Cr_{22}Ta_4$ recording layer was about $3 \times 10^7$ erg/cc, and the value of $KU_{FL}$ of the $Co_{83}Cr_{12}Ta_8$ functional layer was about $1 \times 10^6$ erg/cc.

It was impossible to perform the recording with the ordinary magnetic head for the longitudinal magnetic recording medium because the coercive force of the $Co_{74}Cr_{22}Ta_4$ recording layer alone had large coercive force of about 8 kOe. In the medium of this Example, however, ferromagnetic exchange coupling is formed between the $Co_{74}Cr_{22}Ta_4$ recording layer and the $Co_{83}Cr_{12}Ta_8$ functional layer so as to lower the coercive force of the entire medium to about 4 kOe, making it possible to perform the recording sufficiently even with the ordinary magnetic head. This medium exhibited a single stage hysteresis loop, as shown in FIG. 25. The diameter of the magnetic particles within the recording layer was about 8 nm. Also, the value of $KuV/k_BT$ of this medium was about 150 and, thus, the thermal stability was sufficient.

Example 13

A magnetic recording medium constructed as shown in FIG. 21 was prepared. Specifically, on a glass substrate having a diameter of 2.5 inches, an underlayer made of Cr and having a thickness of 50 nm was deposited, followed by laminating a functional layer made of $Co_{77}Cr_{20}Ta_3$ and having a thickness of 15 nm, a recording layer made of $(Co_{80}Pt_{20})$—$(SiO_2)$ and having a thickness of 15 nm, and a protective layer made of carbon and having a thickness of 3 nm were successively formed by sputtering on the underlayer in the order mentioned and subsequently applying coating of a lubricant. In forming the recording layer, an RF bias was applied to the substrate.

The recording layer was a so-called "granular medium" in which CoPt magnetic particles of high Ku were dispersed in a $SiO_2$ matrix. The volume ratio of CoPt to $SiO_2$ was 50:50. Each of the recording layer and the functional layer was a perpendicular magnetization film exhibiting high remanent magnetization in the perpendicular direction.

The value of $Ku_{RL}$ of the $(Co_{80}Pt_{20})$—$Si_2$ recording layer was about $3 \times 10^7$ erg/cc, and the value of $Ku_{FL}$ of the $Co_{77}Cr_{20}Ta_3$ functional layer was about $6 \times 10^5$ erg/cc.

It was difficult to perform the recording because the coercive force of the $(Co_{80}Pt_{20})$—$(SiO_2)$ recording layer had a large coercive force of about 6 kOe. In the medium of this Example, however, a ferromagnetic exchange coupling is formed between the $(Co_{80}Pt_{20})$—$(SiO_2)$ recording layer and the $Co_{77}Cr_{20}Ta_3$ functional layer so as to lower the coercive force of the entire medium to about 3 kOe, making it possible to perform the recording sufficiently even with the ordinary magnetic head. Since exchange coupling was formed between the perpendicular magnetization films, the exchange coupling energy was increased so as to obtain a larger effect of decreasing the coercive force. This medium exhibited a single stage hysteresis loop, as shown in FIG. 25.

The diameter of the magnetic particles within the recording layer was about 10 nm. Also, the value of $KuV/k_BT$ of this medium was about 200 and, thus, the thermal stability was sufficient.

Example 14

Prepared as in Example 11 was a magnetic recording medium having a three-layered structure comprising a $Co_{78}Cr_{19}Pt_3$ functional layer having a thickness of 8 nm, a $(Fe_{55}Pt_{45})Cu_{10}$ recording layer having a thickness of 10 nm and another $Co_{78}Cr_{19}Pt_3$ functional layer having a thickness of 7 nm.

The coercive force of the entire magnetic recording medium was about 5 kOe. In other words, the coercive force was further lowered, compared with Example 11.

Example 15

Prepared was a magnetic recording medium constructed as shown in FIG. 21 and comprising a recording layer formed of a magnetic artificial lattice. Specifically, on a glass substrate having a diameter of 2.5 inches, an underlayer made of Cr and having a thickness of 50 nm was deposited, followed by laminating a functional layer made of $Co_{77}Cr_{20}Ta_3$ and having a thickness of 15 nm, a recording layer made of $[Co\ (0.3\ nm)/Pd\ (0.7\ nm)]_{10}$ and having a thickness of 10 nm, and a protective layer made of carbon and having a thickness of 3 nm were successively formed by sputtering on the underlayer in the order mentioned and subsequently applying coating of a lubricant.

Each of the recording layer and the functional layer was a perpendicular magnetization film exhibiting high remanent magnetization in the perpendicular direction. The recording layer was a magnetic artificial lattice prepared by repeating 10 times the period of Co (0.3 nm)/Pd (0.7 nm), and exhibited $Ku_{RL}$ of about $1 \times 10^7$ erg/cc. On the other hand, the value of $Ku_{FL}$ of the $Co_{77}Cr_{20}Ta_3$ functional layer was about $6 \times 10^5$ erg/cc.

It was difficult to perform the recording because the coercive force of the magnetic artificial lattice recording layer had a large coercive force of about 9 kOe. In the medium of this Example, however, a ferromagnetic exchange coupling is formed between the magnetic artificial lattice recording layer and the $Co_{77}Cr_{20}Ta_3$ functional layer so as to lower the coercive force of the entire medium to about 4 kOe, making it possible to perform the recording sufficiently even with the ordinary magnetic head. This medium exhibited a single stage hysteresis loop, as shown in FIG. 25.

Prepared was a magnetic recording medium having the structure substantially equal to that described above, except that included in the medium were an underlayer made of Pt and having a thickness of 30 nm and a functional layer comprising a magnetic artificial lattice made of $[Co\ (0.7\ nm)/Pd\ (0.7\ nm)]_8$.

The magnetic recording medium thus prepared was high in the perpendicular orientation, small in the disturbance of the magnetization transition, and capable of recording with high density, compared with the magnetic recording medium described previously. The reason for the prominent effect is considered to reside in that, since the functional layer and the recording layer have the same morphology, the crystallinity control and the grain size control performed by the Pt underlayer were exerted not only on the functional layer but also on the recording layer. Also, since it was possible to form each of the functional layer and the recording layer by using a Co target and a Pd target, it was possible to lower the manufacturing cost.

It should also be noted that the coercive force of the entire magnetic recording medium was 3 kOe. In other words, it was possible to obtain a greater effect of lowering the coercive force, compared with the medium described previously.

Example 16

Prepared was a magnetic recording medium substantially equal to that for Example 11, except that used was a functional layer made of $Co_{78}Cr_{19}Pt_3$ (0.8 nm)/Ru (0.8 nm)/$Co_{78}Cr_{19}Pt_3$ (3 nm). This functional layer is a so-called "stacked ferrimagnetic film" in which two magnetic layers formed an antiferromagnetic coupling with a Ru layer interposed therebetween. It should be noted that the $Co_{78}Cr_{19}Pt_3$ layer of the functional layer on the side of the recording layer forms a ferromagnetic coupling with the recording layer.

The coercive force of the entire magnetic recording layer was about 6 kOe and, thus, the effect of lowering the coercive force was higher than that of Example 11. The result qualitatively coincides with the result of calculation shown in FIG. 28. In the case of using the magnetic recording medium, it was possible to achieve a magnetic recording of high resolution (high density), compared with Example 11. It is considered reasonable to understand that the amount of the magnetic moment of the functional layer was effectively lowered so as to produce the prominent effect described above.

Example 17

A magnetic recording layer constructed as shown in FIG. 21 was prepared. Specifically, on a glass substrate having a diameter of 2.5 inches, an underlayer made of MgO and having a thickness of 50 nm was deposited, followed by successively forming a functional layer made of $(Fe_{55}Pt_{45})Al_{10}$ and having a thickness of 8 nm, a recording layer made of $(Fe_{55}Pt_{45})Cu_{10}$ and having a thickness of 10 nm, and a protective layer made of carbon and having a thickness of 3 nm by sputtering in the order mentioned on the underlayer, and subsequently applying coating with a lubricant. During the sputtering process, the substrate was kept heated to 250° C.

Since the underlayer was formed of MgO and the substrate was heated during the sputtering step, each of the recording layer and the functional layer was formed as a perpendicular magnetized film exhibiting high remanent magnetization in the perpendicular direction unlike Example 11. It should be noted that the $Fe_{50}Pt_5O$ ordered layer was formed in the recording layer. However, an ordered layer was not formed in the functional layer. This is because Cu was added to the recording layer, whereas, Al was added to the functional layer, leading to the difference noted above. The value of $Ku_{RL}$ for the recording layer was about $3 \times 10^7$ erg/cc. On the other hand, the value of $Ku_{FL}$ for the functional layer was about $5 \times 10^5$ erg/cc.

Since the coercive force of the FePtCu recording layer exceeded 15 kOe, it was difficult to perform the recording. In the medium of this Example, however, a ferromagnetic coupling was formed between the FePtAl function layer and the FePtCu recording layer so as to lower the coercive force of the entire recording medium to about 5 kOe. As a result, it was sufficiently possible to perform the recording even with the ordinary magnetic head. It should also be noted that exchange coupling was formed between the perpendicular magnetized films, the exchange coupling force was large so as to produce a large effect of lowering the coercive force. The medium exhibited a single stage hysteresis loop as shown in FIG. 25.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium, comprising:
   a substrate;
   a base layer formed on the substrate and comprising a magnetic material;
   a switching layer formed on the base layer and comprising a nonmagnetic material; and
   a recording layer formed on the switching layer and having a structure comprising magnetic particles and a nonmagnetic wall buried between the magnetic particles;
   wherein the medium meets the following condition:

$TcB > Tsw$ where TcB is a Curie temperature of the base layer, and Tsw is a temperature at which the recording layer and the base layer begin to exert exchange coupling interaction where the base layer, the switching layer and the recording layer are stacked to exert exchange coupling interaction at Tsw.

2. The magnetic recording medium according to claim 1, wherein the base layer comprises a ferrimagnetic material.

3. The magnetic recording medium according to claim 1, wherein a thickness of the switching layer is not larger than 5 nm.

4. The magnetic recording medium according to claim 1, wherein a distance between magnetic particles contained in the recording layer is not smaller than ½ of the thickness of the switching layer.

5. A magnetic recording medium, comprising:
   a substrate;
   a base layer formed on the substrate and comprising a material that is superparamagnetic under an ambient temperature and becomes ferromagnetic at higher temperature; and
   a recording layer formed on the base layer and having a structure comprising magnetic particles and a nonmagnetic wall buried between the magnetic particles;
   wherein the transition temperature Tf from superparamagnetic to ferromagnetic of the base layer is made to be higher than a reproducing temperature.

6. The magnetic recording medium according to claim 5, wherein the base layer has a structure in which magnetic particles with a size that exhibits superparamagnetic properties under an ambient temperature are dispersed in a nonmagnetic material.

7. The magnetic recording medium according to claim 5, wherein an average distance between magnetic particles contained in the base layer is not larger than 5 nm.

8. A magnetic recording apparatus, comprising:
   a magnetic recording medium comprising a substrate, a base layer formed on the substrate and comprising a material that is superparamagnetic under an ambient temperature and exhibiting transition to ferromagnetic at higher temperature, and a recording layer formed on the base layer and having a structure comprising magnetic particles and a nonmagnetic wall buried between the magnetic particles;
   a heater locally heating a part of the magnetic recording medium; and
   a magnetic head applying a magnetic field to the magnetic recording medium.

9. The magnetic recording apparatus according to claim 8, wherein the apparatus meets the following condition:

$Tw > Tf$ where Tw is a recording temperature of the locally heated recording layer, and Tf is a superparamagnetic-to-ferromagnetic transition temperature of the base layer.

10. A magnetic recording medium, comprising:
    a substrate;
    a base layer formed on the substrate and comprising a magnetic material;
    a switching layer formed on the base layer and comprising a magnetic material; and
    a recording layer formed on the switching layer and having a structure comprising magnetic particles and a nonmagnetic wall buried between the magnetic particles;
    the base layer, the switching layer and the recording layer being stacked to exert exchange coupling interaction,
    wherein structures of the base layer, the switching layer and the recording layer are set to meet the following condition:

$TcS < TcB$ where TcS is a Curie temperature of the switching layer, and TcB is a Curie temperature of the base layer.

11. The magnetic recording medium according to claim 10, wherein each of the switching layer and the base layer comprises an amorphous rare earth-transition metal alloy.

12. The magnetic recording medium according to claim 10, wherein each of the switching layer and the base layer has a structure comprising magnetic particles and a nonmagnetic wall buried between the magnetic particles.

13. A magnetic recording apparatus, comprising:
    a magnetic recording medium comprising a substrate, a base layer formed on the substrate and comprising a magnetic material, a switching layer formed on the base layer and comprising a magnetic material, and a recording layer formed on the switching layer and having a structure comprising magnetic particles and a nonmagnetic wall buried between the magnetic particles, the base layer, the switching layer and the recording layer being stacked to exert exchange coupling interaction;
    a heater locally heating a part of the magnetic recording medium; and
    a magnetic head applying a magnetic field to the magnetic recording medium wherein structures of the base layer, the switching layer and the recording layer are set to meet the following condition:

$TcS < TcB$ where TcS is a Curie temperature of the switching layer, and TcB is a Curie temperature of the base layer.

14. The magnetic recording apparatus according to claim 13, wherein the apparatus meets the following conditions:

$$TcS<TcB \text{ and } 0<Tw-TcS<100K$$

where Tw is a recording temperature of the locally heated recording layer, TcS is a Curie temperature of the switching layer, and TcB is a Curie temperature of the base layer.

15. A magnetic recording medium, comprising:
a substrate;
a functional layer formed on the substrate and comprising an antiferromagnetic or ferrimagnetic material; and
a recording layer formed on the functional layer and having a structure comprising magnetic particles and a nonmagnetic wall buried between the magnetic particles;
the functional layer and the recording layer being stacked to exert exchange coupling interaction under an ambient temperature,
wherein the magnetic recording medium meets the following condition:

$$TcR>TcE$$

where TcR is a Curie temperature of the recording layer, and TcE is a temperature at which the exchange coupling interaction between the functional layer and the recording layer disappears.

16. The magnetic recording medium according to claim 15, wherein the functional layer has a multi-layered structure including at least one unit comprising a nonmagnetic layer having a thickness not larger than 5 nm and a magnetic layer.

17. The magnetic recording medium according to claim 15, wherein the functional layer includes a first functional layer having a multi-layered structure including at least one unit comprising a nonmagnetic layer having a thickness not larger than 5 nm and a magnetic layer, and a second functional layer comprising an antiferromagnetic or ferrimagnetic material, and the first functional layer and the second functional layer are stacked to exert exchange coupling interaction under an ambient temperature.

18. The magnetic recording medium according to claim 16, wherein the nonmagnetic layer forming the functional layer comprises at least one element selected from the group consisting of Ru, Re, Rh, Ir, Tc, Au, Ag, Cu, Mn, Si, and Cr.

19. A magnetic recording apparatus, comprising:
a magnetic recording medium comprising a substrate, a functional layer formed on the substrate and comprising an antiferromagnetic or ferrimagnetic material, and a recording layer formed on the functional layer and having a structure comprising magnetic particles and a nonmagnetic wall buried between the magnetic particles, the functional layer and the recording layer being stacked to exert exchange coupling interaction under an ambient temperature;
a heater locally heating a part of the magnetic recording medium; and
a magnetic head applying a magnetic field to the magnetic recording medium;
wherein the apparatus meets the following condition:

$$TcR>TcE$$

where TcR is a Curie temperature of the recording layer, and TcE is a temperature at which the exchange coupling interaction between the functional layer and the recording layer disappears.

20. The magnetic recording apparatus according to claim 19, wherein the apparatus meets the following conditions:

$$TcR>TcE \text{ and } |TcE-Tw|<100K$$

where Tw is a recording temperature of the locally heated recording layer, TcR is a Curie temperature of the recording layer, and TcE is a temperature at which the exchange coupling interaction between the functional layer and the recording layer disappears.

21. A magnetic recording medium, comprising:
a substrate;
a functional layer formed on the substrate and comprising an antiferromagnetic or ferrimagnetic material;
a switching layer formed on the functional layer and comprising a magnetic material; and
a recording layer formed on the switching layer and having a structure comprising magnetic particles and a nonmagnetic wall buried between the magnetic particles;
the functional layers, the switching layer and the recording layer being stacked to exert exchange coupling interaction under an ambient temperature,
wherein the magnetic recording medium meets the following condition:

$$TcR>TcE$$

where TcR is a Curie temperature of the recording layer, and TcE is a temperature at which exchange coupling interaction between the switching layer and the recording layer disappears.

22. A magnetic recording apparatus, comprising:
a magnetic recording medium comprising a substrate, a functional layer formed on the substrate and comprising an antiferromagnetic or ferrimagnetic material, a switching layer formed on the functional layer and comprising a magnetic material, and a recording layer formed on the switching layer and having a structure comprising magnetic particles and a nonmagnetic wall buried between the magnetic particles, the functional layer, the switching layer and the recording layer being stacked to exert exchange coupling interaction under an ambient temperature;
a heater locally heating a part of the magnetic recording medium; and
a magnetic head applying a magnetic field to the magnetic recording medium.

23. The magnetic recording apparatus according to claims 22, wherein the apparatus meets the following conditions:

$$TcR>TcE \text{ and } |TcE-Tw|<100K$$

where Tw is a recording temperature of the locally heated recording layer, TcR is a Curie temperature of the recording layer, and TcE is a temperature at which exchange coupling interaction between the switching layer and the recording layer disappears.

24. A magnetic recording medium, comprising:
substrate;
a functional layer formed on the substrate and comprising a magnetic material; and
a recording layer formed on the functional layer and having a structure comprising magnetic particles and a nonmagnetic wall buried between the magnetic particles;

the functional layer and the recording layer being stacked to exert a ferromagnetic exchange interaction under an ambient temperature, wherein the magnetic anisotropic energy density $Ku_{RL}$ of the recording layer is not lower than $5 \times 10^6$ erg/cc and higher than the magnetic anisotropic energy density $KU_{FL}$ of the functional layer, and wherein another functional layer is formed on the recording layer that is formed on the functional layer and these three layers are stacked to exert ferromagnetic exchange interaction.

25. A magnetic recording medium, comprising:

a substrate;

a functional layer formed on the substrate and comprising a magnetic material; and a recording layer formed on the functional layer and having a structure comprising magnetic particles and a nonmagnetic wall buried between the magnetic particles;

the functional layer and the recording layer being stacked to exert a ferromagnetic exchange interaction under an ambient temperature, wherein the magnetic anisotropic energy density $Ku_{RL}$ of the recording layer is not lower than $5 \times 10^6$ erg/cc and higher than the magnetic anisotropic energy density $KU_{FL}$ of the functional layer, and wherein the functional layer comprises a plurality of magnetic layers and these plural magnetic layers are stacked to exert exchange coupling in an antiferromagnetic direction.

26. A magnetic recording medium, comprising:

a substrate;

a functional layer formed on the substrate and comprising a magnetic material; and a recording layer formed on the functional layer and having a structure comprising magnetic particles and a nonmagnetic wall buried between the magnetic particles;

the functional layer and the recording layer being stacked to exert a ferromagnetic exchange interaction under an ambient temperature, wherein the magnetic anisotropic energy density $Ku_{RL}$ of the recording layer is not lower than $5 \times 10^6$ erg/cc and higher than the magnetic anisotropic energy density $Ku_{FL}$ of the functional Layer, and wherein the recording layer comprises a magnetic material selected from the group consisting of Fe—Pt, Fe—Pd, Co—Pt and Co—Pd each comprising Cu added thereto in an amount of at most 50 atomic %, and the functional layer comprises a magnetic material selected from the group consisting of Fe—Pt, Fe—Pd, Co—Pt and Co—Pd each comprising Ag and/or Al added thereto in an amount of at most 50 atomic % or substantially comprising no additive.

27. A magnetic recording apparatus, comprising:

a magnetic recording medium comprising a substrate, a base layer formed on the substrate and comprising a magnetic material, a switching layer formed on the base layer and comprising a nonmagnetic material, and a recording layer formed on the switching layer and having a structure comprising magnetic particles and a nonmagnetic wall buried between the magnetic particles;

a heater locally heating a part of the magnetic recording medium; and a magnetic head applying a magnetic field to the magnetic recording medium, wherein the apparatus meets the following conditions:

$$Tw > Tsw \text{ and } TcB > Tsw$$

where Tw is a recording temperature of the locally heated recording layer, TcB is a Curie temperature of the base layer, and Tsw is a temperature at which the recording layer and the base layer begin to exert exchange coupling interaction.

28. The magnetic recording apparatus according to claim 27, wherein the distance between the magnetic recording medium and the magnetic head applying a magnetic field to the magnetic recording medium is set to be smaller than 100 nm.

29. A magnetic recording medium, comprising:

a substrate;

a base layer formed on the substrate and comprising a magnetic material; and a recording layer formed on the base layer and having a structure comprising magnetic particles and a nonmagnetic wall buried between the magnetic particles;

the base layer and the recording layer being stacked to exert exchange coupling interaction, and wherein structures of the base layer and the recording layer are set to meet the following condition:

$$|TcB - Tw| < 100K$$

where Tw is a recording temperature of the locally heated recording layer, and TcB is a Curie temperature of the base layer, and wherein the base layer comprises an amorphous rare earth-transition metal alloy.

30. The magnetic recording medium according to claim 29, wherein the base layer has a structure comprising magnetic particles and a nonmagnetic wall buried between the magnetic particles.

31. A magnetic recording apparatus, comprising:

a magnetic recording medium comprising a substrate, a base layer formed on the substrate and comprising a magnetic material, and a recording layer having a structure comprising magnetic particles and a nonmagnetic wall buried between the magnetic particles, the base layer and the recording layer being stacked to exert exchange coupling interaction;

a heater locally heating a part of the magnetic recording medium; and a magnetic head applying a magnetic field to the magnetic recording medium, wherein the base layer comprises an amorphous rare earth-transition metal alloy.

32. The magnetic recording apparatus according to claim 31, wherein the apparatus meets the following condition:

$$|TcB - Tw| < 100K$$

where Tw is a recording temperature of the locally heated recording layer, and TcB is a Curie temperature of the base layer.

* * * * *